US011085470B2

(12) United States Patent
Leutwyler et al.

(10) Patent No.: US 11,085,470 B2
(45) Date of Patent: Aug. 10, 2021

(54) FLOW CONDITIONING ASSEMBLY

(71) Applicant: KALSI ENGINEERING, INC., Sugar Land, TX (US)

(72) Inventors: Zachary W Leutwyler, Richmond, TX (US); Manmohan S Kalsi, Houston, TX (US)

(73) Assignee: KALSI ENGINEERING, INC., Sugar Land, TX (US)

(*) Notice: Subject to any disclaimer, the term of this patent is extended or adjusted under 35 U.S.C. 154(b) by 0 days.

(21) Appl. No.: 16/843,616

(22) Filed: Apr. 8, 2020

(65) Prior Publication Data
US 2020/0378414 A1 Dec. 3, 2020

Related U.S. Application Data

(60) Provisional application No. 62/921,126, filed on May 31, 2019.

(51) Int. Cl.
F15D 1/04 (2006.01)
F15D 1/00 (2006.01)
F15D 1/06 (2006.01)

(52) U.S. Cl.
CPC ............ F15D 1/04 (2013.01); F15D 1/0025 (2013.01); F15D 1/06 (2013.01)

(58) Field of Classification Search
CPC . F15D 1/04; F15D 1/06; F15D 1/0025; F15D 1/00; F16L 43/00; F16L 55/027
USPC ........................................ 138/39, 37, 40, 44
See application file for complete search history.

(56) References Cited

U.S. PATENT DOCUMENTS 1,827,727 A * 10/1931 Blizard .................... F15D 1/04
138/37
4,080,997 A 3/1978 Biornstad
5,189,790 A 3/1993 Streubel et al.
5,323,661 A 6/1994 Cheng
(Continued)

FOREIGN PATENT DOCUMENTS

EP 0667460 B1 8/1995

OTHER PUBLICATIONS

International Search Report and Written Opinion for related PCT application PCT/US2020/030990, dated Feb. 24, 2021.

Primary Examiner — Patrick F Brinson
(74) Attorney, Agent, or Firm — Bracewell LLP; Douglas W. Rommelmann

(57) ABSTRACT

A flow conditioning assembly comprising an integral elbow flow conditioner and a downstream flow conditioner. The elbow flow conditioner includes a pipe elbow with one or more flow conditioning elements. Each flow conditioning element includes one or more turning guides. Each turning guide is generally circular and radially spaced from one another and an inner surface of the elbow. Spaced vanes maintain the radial spacing of the turning guides. The vanes divide the radial space between the turning guides and pipe elbow into a plurality of flow channels that turn in generally the same direction as the inner surface of the pipe elbow. The downstream flow conditioner comprises a flow conditioning structure within a pipe element. The flow conditioning structure includes one or more flow guides of generally circular form radially spaced from one another and the pipe element. Spaced support vanes maintain the radial spacing of the flow guides.

106 Claims, 20 Drawing Sheets

(56) References Cited

U.S. PATENT DOCUMENTS

| | | | |
|---|---|---|---|
| 5,455,097 | A * | 10/1995 | Machida ................ B01J 35/04 |
| | | | 428/116 |
| 5,456,965 | A * | 10/1995 | Machida ................ B01J 35/04 |
| | | | 428/116 |
| 5,529,084 | A * | 6/1996 | Mutsakis ................ F15D 1/04 |
| | | | 137/13 |
| 5,529,093 | A | 6/1996 | Gallagher et al. |
| 5,531,484 | A | 7/1996 | Kawano |
| 5,596,152 | A | 1/1997 | Bergervoet et al. |
| 5,605,440 | A | 2/1997 | Bocoviz et al. |
| 5,762,107 | A | 6/1998 | Laws |
| 5,924,673 | A | 7/1999 | Welker |
| 6,145,544 | A | 11/2000 | Dutertre et al. |
| 6,644,132 | B1 | 11/2003 | Baumoel |
| 6,651,514 | B2 | 11/2003 | Zanker |
| 7,281,436 | B1 | 10/2007 | Orleskie |
| 7,661,261 | B2 | 2/2010 | Julliard et al. |
| 7,730,907 | B2 | 6/2010 | Richter |
| 7,780,408 | B2 | 8/2010 | Lazzarato et al. |
| 8,215,345 | B2 | 7/2012 | Clever |
| 8,322,381 | B1 | 12/2012 | Glanville et al. |
| 8,443,842 | B2 | 5/2013 | Sonnenberg |
| 8,480,461 | B2 | 7/2013 | Gruenberg |
| 8,806,955 | B2 | 8/2014 | Wible et al. |
| 8,839,821 | B2 | 9/2014 | Pinkerton |
| 8,938,971 | B2 | 1/2015 | Poyyapakkam et al. |
| 8,978,705 | B2 | 3/2015 | Marica |
| 9,010,994 | B2 | 4/2015 | McQueen et al. |
| 9,157,454 | B2 | 10/2015 | Perrollaz |
| 9,297,489 | B2 | 3/2016 | Sawchuk et al. |
| 9,334,886 | B2 | 5/2016 | Sawchuk et al. |
| 9,453,746 | B2 | 9/2016 | Brugger et al. |
| 9,476,531 | B2 | 10/2016 | McMillan |
| 9,541,107 | B2 | 1/2017 | Sawchuk et al. |
| 9,605,695 | B2 | 3/2017 | Sawchuk et al. |
| 9,625,293 | B2 | 4/2017 | Sawchuk |
| 9,700,903 | B2 | 7/2017 | Kawamori et al. |
| 9,732,775 | B2 | 8/2017 | Ellsworth |
| 9,829,016 | B2 | 11/2017 | Gurr et al. |
| 9,874,234 | B2 | 1/2018 | Brown |
| 9,885,375 | B2 | 2/2018 | Reiss |
| 10,260,537 | B2 | 4/2019 | Sawchuk |
| 10,309,432 | B2 | 6/2019 | Reckner et al. |
| 10,365,138 | B1 | 7/2019 | McClintock |
| 10,378,566 | B2 | 8/2019 | Kumar |
| 10,458,446 | B1 * | 10/2019 | Schmidt ................ B01F 5/0659 |
| 2009/0218000 | A1 * | 9/2009 | Pfau ................ F16L 55/02763 |
| | | | 138/39 |
| 2010/0224275 | A1 | 9/2010 | Pinkerton |
| 2014/0338771 | A1 | 11/2014 | Brown |
| 2017/0306994 | A1 | 10/2017 | Schmidt et al. |
| 2017/0370385 | A1 | 12/2017 | Reckner et al. |
| 2020/0378414 | A1 | 12/2020 | Leutwyler et al. |

\* cited by examiner

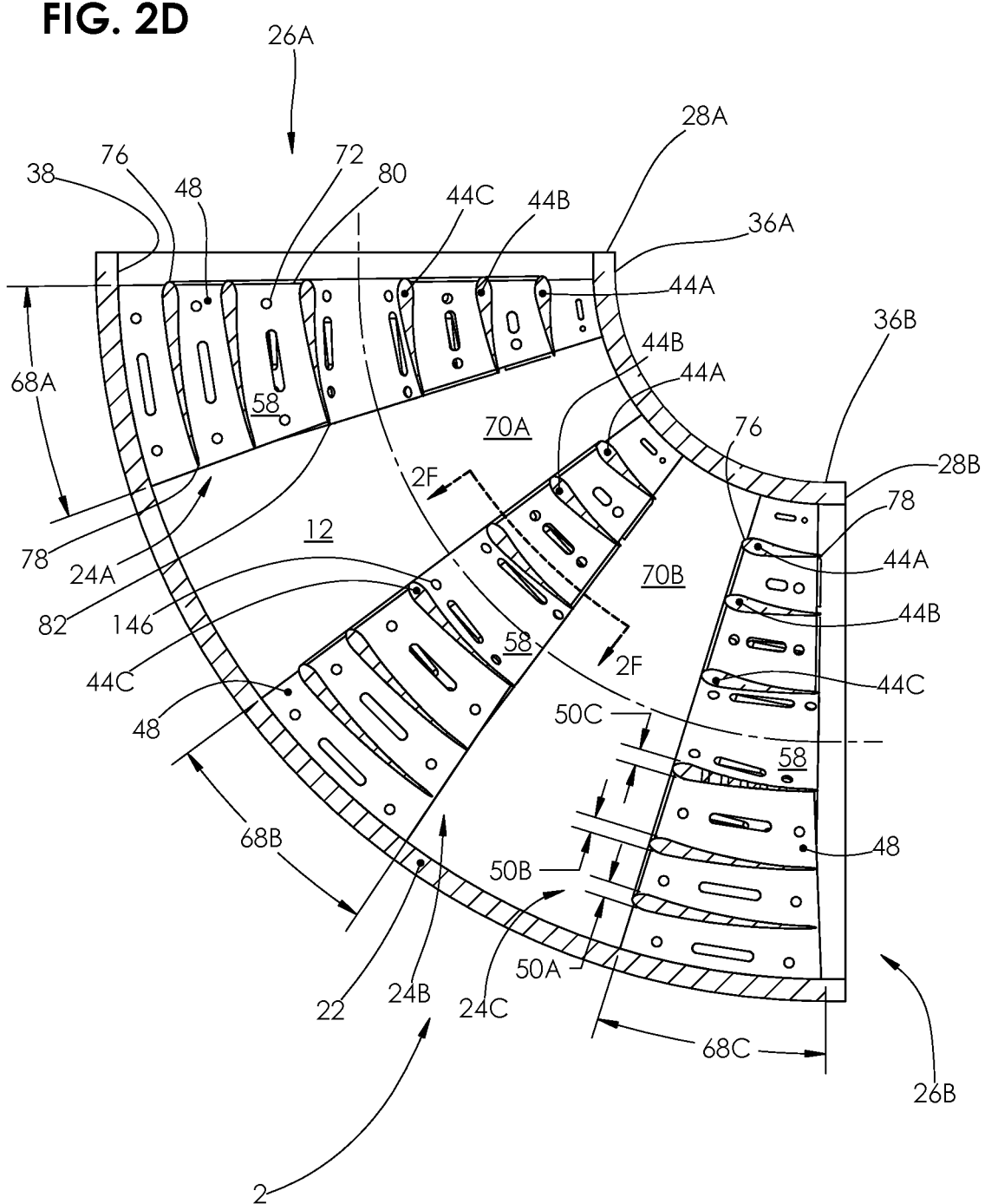

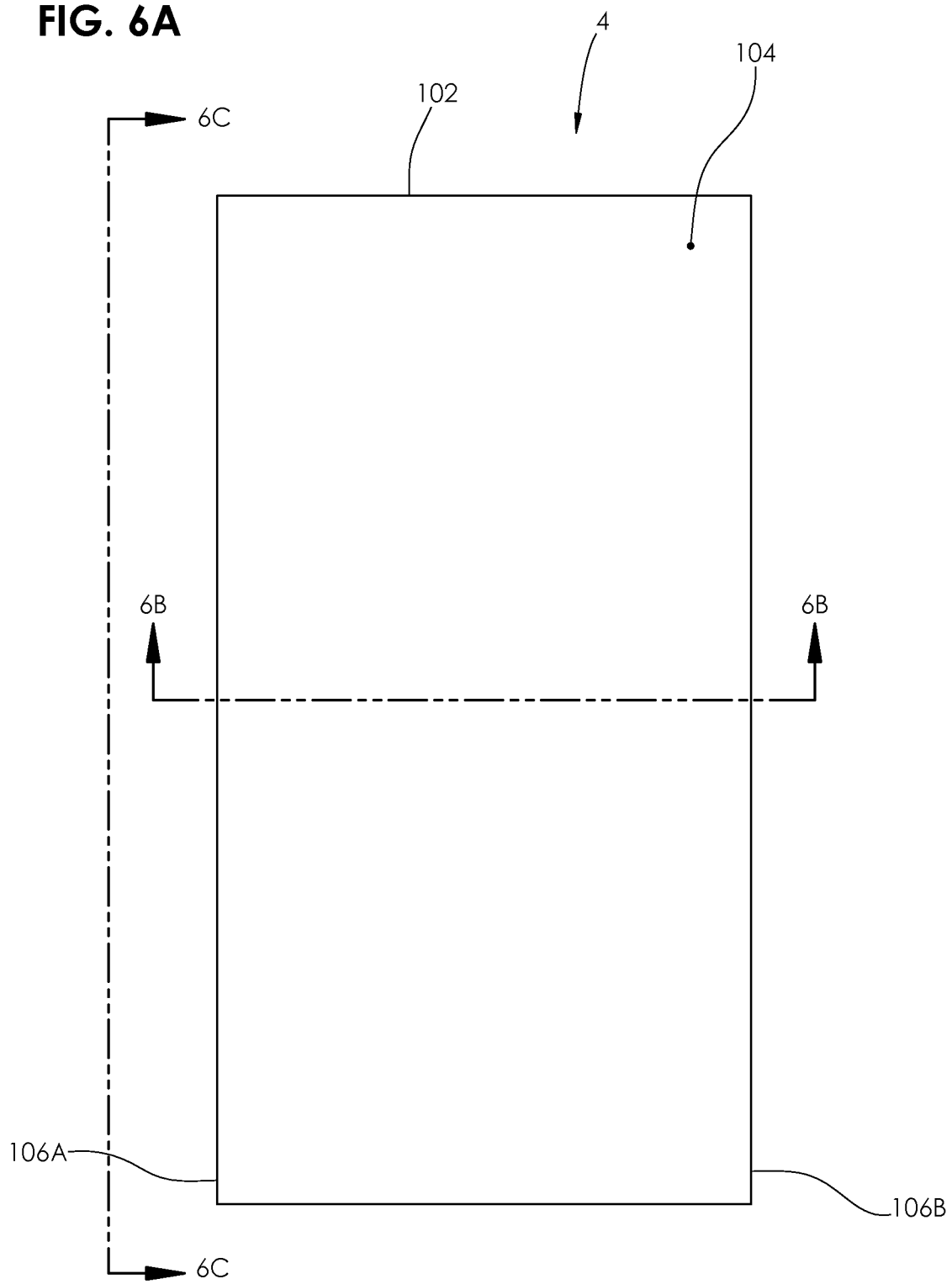

FLOW CONDITIONING ASSEMBLY

CROSS-REFERENCE TO RELATED APPLICATIONS

This application claims the benefit of U.S. Provisional Application Ser. No. 62/921,126 filed on May 31, 2019, by Zachary W. Leutwyler and Manmohan S. Kalsi, entitled "Flow Conditioners and Straightener Designed Integral with Piping Bends and Designed for Installation Downstream of Flow Disturbances or Upstream of Pump Inlets and Designed Integral with Flow Metering Devices." Applicant incorporates by reference herein Application Ser. No. 62/921,126 in its entirety.

STATEMENT REGARDING FEDERALLY SPONSORED RESEARCH OR DEVELOPMENT

This invention was made with Government support under Agreement No. N00014-19-9-001, awarded by ONR (Office of Naval Research). The Government therefore has certain rights in this invention.

BACKGROUND OF THE INVENTION

1. Field of the Invention

The present invention relates generally to a flow conditioning assembly within piping, and more particularly, to a fluid flow conditioning assembly that improves the velocity profile of the approach flow leading to a downstream device such as a flow meter or pump intake.

2. Description of the Related Art

The accuracy of flow meters and the performance of pumps, valves, and other mechanical equipment can be adversely affected when the velocity profile of the approach flow deviates from that of a fully developed profile, especially when high asymmetry (or skew) in the velocity profile or strong swirl is present. Achieving well-conditioned flow (by the application of a flow conditioner) improves the accuracy of flow meters and the performance of pumps, valves, and other mechanical equipment.

As an example, orifice plate flow meters, and other differential pressure (DP) flow meters, utilize a flow coefficient (defined based on Reynolds number) and the measured DP across the orifice to determine the flow rate. Standard flow coefficients are developed using pipe configurations and test conditions that produce a fully developed velocity profile upstream of the flow meter. As such, an increase in error or uncertainty in calculated flow rate (based on measured DP and flow coefficient) can result when the actual velocity profile deviates from that of a fully developed velocity profile.

Piping components such as pumps, elbows, tees, and valves disturb the flow emerging from these devices. The disturbed flow is often described as velocity profile distortion (or skew) and swirl. When disturbed flow passes through a sufficiently long, straight section of pipe, viscous diffusion acts on the fluid and reduces the asymmetry in the velocity profile and diminishes the intensity of the swirling flow (flow acting tangential to the pipe axis velocity vector). The restoration of the fully developed velocity profile and elimination of swirl can take between 20 pipe diameters and 120 pipe diameters. The exact length of downstream pipe required to reestablish a fully developed profile depends on the level of distortion introduced by the upstream disturbance. For example, two elbows, rotated out of plane, and in close proximity can act in conjunction with each other to greatly increase the distortion and swirl introduced in the downstream flow.

Flow conditioners are devices that act to diminish the amount of skew in the velocity profile and swirl intensity caused by flow disturbances. From a fundamental fluid mechanics perspective, the velocity profile defines the distribution of fluid momentum across the flow area (cross-sectional plane with normal vector parallel to the pipe axis). Velocity distortion causes a change in the distribution of fluid momentum across the flow area from that of a fully developed velocity profile. Current, well performing, flow conditioning devices act to reduce velocity distortion by developing a pressure gradient upstream of the conditioner that acts perpendicular to the downstream-pipe axis. The pressure gradient causes flow in regions of excessive fluid momentum to move to regions deficient in fluid momentum, thus helping to reduce the velocity skew. The pressure gradient that causes the flow redirection is generated either using substantial area blockage due to the design of the face of the conditioner, using substantial viscous drag forces within the flow passages, or using these two in conjunction. Current conditioners are not designed to minimize pressure drop, noise, and cavitation.

SUMMARY OF THE INVENTION

The present invention is a flow conditioning assembly that can be comprised of conditioning elements that are integral with the pipe elbow (or pipe bend) and multiple downstream conditioning elements. The conditioning elements in the pipe bend are referred to as an integral conditioner and the downstream conditioner elements are collectively referred to as a multistage flow conditioner.

Briefly, the invention is a series of guide elements that are categorized as vanes and turning guides or flow guides. Vanes are oriented generally along radial paths. Turning guides and flow guides have a generally circular cross-section and are oriented such that the path defined by the center of the turning guide runs generally along the direction of the pipe axis. The vanes and turning guides are of hydrodynamic (or aerodynamic) shape which are integrated into pipe bends (such as elbows) that guide flow through the pipe bend and into the downstream pipe.

The vanes and turning guides or flow guides have a leading edge that is rounded and the foil thickness gradually increases along its span until it reaches a location of maximum thickness, the location of maximum thickness near the leading edge, a continuously narrowing thickness following the location of maximum thickness, and a defined trailing edge that can be sharp or blunt but is smaller in thickness than the leading edge. Flow vents allowing fluid from one side of the vane, turning guide, or flow guide to the other may be present along the span of the vane, turning guide, or flow guide. The flow vents may be local holes or slots or may be complete separations that span the entire length or width of the vane, turning guide, or flow guide.

The vanes, turning guides, and flow guides connect to form smaller flow channels. The radial location of the center of each flow guide and circumferential location of each vane is selected to achieve a desired effective flow area and effective resistance of each flow channel. The flow resistance inherent to each flow passage can be modified to alter the momentum at the flow passage outlet. The flow resistance of the passages can be altered by eccentrically offsetting the turning guides or flow guides, using an uneven circumferential spacing of the vanes, and/or causing the inlet and outlet areas to differ.

The present invention is also distinguishable from prior art in that not only does it use area blockage and viscous forces to develop back pressure and condition flow, but it also uses area changes between the inlet and outlet of the flow channels formed by the vanes, turning guides, and flow guides. The area changes along the flow passage provide the means to use Bernoulli's principle to better condition the flow. To further explain, the flow area of the flow channels along the outer bend of an elbow can be reduced by offsetting the center of the turning guides (at both the inlet and outlet) and thereby narrow the flow area. The decrease in area provides an increase in viscous drag forces along the outer bend, which in turn increase the pressure gradient on the upstream end of the conditioner and more strategically helps redistribute flow. Alternatively, the center of the turning guides at the inlet can be offset in the direction of the outer bend without offsetting the turning guide center at the outlet. In this case, the flow channels are both narrower along the outer bend at the inlet and increase in flow area at the outlet. Both features greatly reduce the velocity just along the outer bend and provide substantial improvement in the flow emerging from the elbow.

The present invention concerns the utilization of vanes and turning guides to efficiently guide flow through pipe bends or elbows and to precondition the flow before it enters the downstream pipe. The present invention also concerns the integration of hydrofoils (or airfoils) into straight pipe sections to more effectively condition flow downstream of other flow disturbances, such as valves and fittings. The present invention provides flow conditioning while minimizing the production of noise and cavitation by using vanes and turning guides or flow guides that are of a hydrodynamic (or of an aerodynamic) shape. The present invention also reduces pressure drop associated with the flow conditioner.

The first stage in the multistage flow conditioner assembly is located just downstream of the pipe elbow/bend (or other flow disturbance). The number and design of the downstream flow conditioner stages that are integrated in a multistage downstream conditioner are based on several factors including the allowable pressure drop requirements, installation package size allowed by the application, flow condition requirements, and acceptable levels of cavitation and noise. In applications that require highly conditioned flow, several stages, six or more for example, may be required to achieve the desired velocity profile within a short distance downstream of the flow disturbance.

The benefit of using the multistage downstream conditioner is that the stages of which it is comprised can be selected based on the defined requirements of the end user. For example, it is beneficial for the first stage to be designed to reduce swirl without generating cavitation while producing minimal noise. It is also beneficial for the first stage to be designed to minimize the internal pressure drop. As an additional example, it is beneficial for the final stage of the downstream conditioner to be designed to sculpt the velocity and promote the desired velocity profile. The number of intermediate stages (and their design)—installed between the first and last stage in the downstream conditioner—are selected based on the severity of the upstream disturbance, allowable installation package size, and flow conditioning requirements. Upstream flow disturbances that create highly distorted flow require more intermediate stages than upstream flow disturbances that create minimally distorted flow.

The following first stage design features are implemented to reduce cavitation potential and noise. The leading edges of the flow guides are delayed with respect to each other such that the leading edge of the outer most guide precedes the leading edge of the middle flow guide; and the leading edge of the middle flow guide precedes the inner most flow guide. Also, the leading edge of the radial vanes spanning the gap between two flow guides is delayed compared to the leading edge of both flow guides. The delay in the leading edges of the flow guides and vanes serves to more gradually alter the direction of the flow and thus prevent flow separation from the foils. The delay in the leading edges of the vanes and flow guides is referred to as "delayed start". These features are of increasing importance if utilizing an integral conditioner in the upstream pipe bend/elbow is not possible.

The designs of the first, last and intermediate stages are similar in that they all rely on the implementation of flow passages or channels to develop a nearly symmetric velocity profile at the discharge of the final stage. The design, number and distribution of radial and support vanes as well as turning guides and flow guides are selected to develop the necessary back pressure through each flow passage/channel in a conditioner stage to cause a pressure gradient along the inlet side of the conditioner stages so that the flow through the conditioner is more balanced and the velocity profile of the discharge flow is more symmetric.

Because high swirl and skew is often present at the discharge of the upstream disturbance, the use of the delayed start of the first stage is especially important when sufficient space is not available to provide flow conditioning within the pipe bend/elbow or if flow conditioning downstream of flow disturbances—like valves and pipe tees—is required or if flow conditioning at a pump inlet is required.

A preferred embodiment of the present invention is a flow conditioning assembly comprising an integral elbow flow conditioner and one or more downstream flow conditioners positioned downstream from the integral elbow flow conditioner. Additionally, the flow conditioning assembly (or as a simplification, just the integral elbow flow conditioner or just the downstream flow conditioner) can be used downstream of flow disturbances in piping to condition and smooth the flow ahead of devices that benefit from conditioned flow.

The integral elbow flow conditioner includes a pipe elbow for conducting and turning the flow of a fluid. The pipe elbow is an annular conduit having first and second openings and defining a radially inwardly facing inner surface in intermediate location to the first and second openings that turns in at least one direction and forms at least a portion of a curved fluid passageway extending through the pipe elbow.

The integral elbow flow conditioner includes at least a first flow conditioning element; however, any suitable number may be used. The first flow conditioning element includes at least a first turning guide, however any suitable number may be used. The first turning guide has a generally circular form when viewed in transverse cross-section, is located at least partially within the pipe elbow, and is radially spaced from the pipe elbow by a radial space. The first turning guide has a guide leading edge and a guide trailing edge. The guide leading edge is closer than the guide trailing edge to the first opening. Preferably, the first turning guide turns in generally the same at least one direction as the inner surface of the pipe elbow.

The first flow conditioning element includes a plurality of vanes situated at least partially within the radial space between the pipe elbow and the first turning guide. The vanes locate the first turning guide relative to the pipe elbow and have vane leading and trailing edges. The vane leading edge is closer than the vane trailing edge to the first opening and the vane trailing edge is closer than the vane leading edge to the second opening. The vanes are circumferentially spaced from each other and circumferentially distributed around the first turning guide. The vanes divide the radial space between the pipe elbow and the first turning guide into a plurality of flow channels that preferably turn in generally the same at least one direction as the inner surface of the pipe elbow.

If desired, the first flow conditioning element may include a second turning guide having a generally circular form when viewed in transverse cross-section. The second turning guide is located at least partially within the first turning guide. The second turning guide is radially spaced from the first turning guide by a radial space. Preferably, the second turning guide turns in generally the same at least one direction as the inner surface of the pipe elbow. A plurality of vanes situated at least partially within the radial space between the first and second turning guides locate the second turning guide. These vanes are circumferentially spaced from each other and circumferentially distributed around the second turning guide. These vanes divide the radial space between the first and second turning guides into a plurality of flow channels that preferably turn in generally the same at least one direction as the inner surface.

If desired, the first flow conditioning element may include a third turning guide having a generally circular form when viewed in transverse cross-section. The third turning guide is located at least partially within the second turning guide and is radially spaced from the second turning guide by a radial space. Preferably, the third turning guide turns in generally the same at least one direction as the inner surface of the pipe elbow. A plurality of vanes situated at least partially within the radial space between the second and third turning guides locate the third turning guide. These vanes are circumferentially spaced from each other and circumferentially distributed around the third turning guide, dividing the radial space between the second and third turning guides into a plurality of flow channels that preferably turn in generally the same at least one direction as the inner surface of the pipe elbow. Preferably, the third turning guide has an inner guide surface facing generally radially inward that turns in generally the same at least one direction as the inner surface of the pipe elbow.

Preferably, the first, second and third turning guides have a foil shape, wherein the guide leading edge is thicker and more rounded than the guide trailing edge, and the guide trailing edge is thinner (narrower, slenderer) and more pointed than the guide leading edge.

Preferably, the aforementioned vanes have a foil shape, wherein the vane leading edge is thicker than the vane trailing edge and the vane trailing edge is thinner (narrower, slenderer) than the vane leading edge. Preferably, at least some of the vanes turn in generally the same at least one direction as the inner surface of the pipe elbow.

Preferably, the turning guides have an inner guide surface facing generally radially inward and an outer guide surface facing generally radially outward toward the pipe elbow. If desired, at least one guide vent can be incorporated to form a through passage that passes in a generally radial direction from the inner guide surface to the outer guide surface. If desired, the guide vent may also cut through from the guide leading edge to the guide trailing edge.

If desired, at least one of the aforementioned vanes can have at least one vane vent forming a hole that passes in a generally circumferential direction through the vane.

If desired, the turning guides can be substantially concentric to the inner surface of the pipe elbow. If desired, the turning guides can be eccentric to the inner surface of the pipe elbow. If desired, the guide leading edge of the turning guides can be eccentric to the inner surface of the pipe elbow and the guide trailing edge of the turning guides can be less eccentric to the inner surface of the pipe elbow.

If desired, the guide leading edge of the turning guides can be eccentric to the inner surface of the pipe elbow and the guide trailing edge of the turning guides can be substantially concentric to the inner surface of the pipe elbow.

The junctures between the vanes and the first turning guide form vane inner corners that are inside corners and have a curved length that extends from the vane leading edge to the vane trailing edge. If desired, at least some vanes with vane inner corners having a longer curved length can be spaced circumferentially closer together than at least some vanes with vane inner corners having a shorter curved length. If desired, uneven circumferential vane spacing can also be used with the vanes that locate the second and third turning guides.

The vane leading edge and the vane trailing edge of each of the vanes locating the first turning guide are separated by a straight line distance, at least some of the vanes having a longer straight line distance separating the vane leading edge from the vane trailing edge compared to other of the vanes having a shorter straight line distance between the vane leading edge and the vane trailing edge. If desired, at least some of the vanes having the longer straight-line distance separating the vane leading edge from the vane trailing edge can be spaced closer together than some of the vanes having the shorter straight-line distance between the vane leading edge and the vane trailing edge.

If desired, the integral elbow flow conditioner can include a second flow conditioning element located at least partially within the pipe elbow. The second flow conditioning element includes at least a first turning guide, however any suitable number may be used. The first turning guide has a generally circular form when viewed in transverse cross-section and is located at least partially within and radially spaced from the pipe elbow and turns in generally the same at least one direction as the inner surface of the pipe elbow. A plurality of vanes situated between the pipe elbow and the first turning guide locate the first turning guide relative to the pipe elbow. These vanes are circumferentially spaced from each other and circumferentially distributed around the first turning guide, and divide the radial space between the pipe elbow and the first turning guide into a plurality of flow channels that preferably turn in generally the same at least one direction as the inner surface of the pipe elbow.

If desired, the second flow conditioning element can include second turning guide having a generally circular form when viewed in transverse cross-section and located at least partially within the first turning guide. This second turning guide is radially spaced from the first turning guide and preferably turns in generally the same at least one direction as the inner surface of the pipe elbow. A plurality of vanes situated between the first and second turning guides locates the second turning guide. These vanes are circumferentially spaced from each other and circumferentially distributed around the second turning guide and divide the radial space between the first and second turning guide into a plurality of flow channels that preferably turn in generally the same at least one direction as the inner surface of the pipe elbow. Preferably, whenever the second flow conditioning element is used, a fluid settling chamber is located within the pipe elbow between the first and second flow conditioning elements.

The downstream flow conditioner includes a pipe element for conducting the flow of the fluid. The pipe element is an annular conduit having first and second axial ends. The pipe element defines a radially inwardly facing inner peripheral surface forming at least a portion of an axially oriented fluid passageway extending generally axially through the pipe element from a first end opening to a second end opening. The first axial end of the pipe element faces generally toward the second opening of the pipe elbow and the second axial end of the pipe element faces away from the second opening of the pipe elbow and faces away from the first axial end of the pipe element.

The downstream flow conditioner includes at least a first flow guide; however, any suitable number may be used. The first flow guide has generally circular form when viewed in transverse cross-section and is located at least partially within the pipe element and radially spaced from the pipe element by a radial space. The first flow guide has upstream and downstream guide ends. The upstream guide end is closer than the downstream guide end to the first axial end of the pipe element and the downstream guide end is closer than the upstream guide end to the second axial end of the pipe element. Preferably, the first flow guide has generally the same axial orientation as the inner peripheral surface of the pipe element.

The downstream flow conditioner includes a plurality of support vanes situated at least partially within the radial space between the pipe element and the first flow guide. The support vanes locate the first flow guide relative to the pipe element. The support vanes are circumferentially spaced from each other and circumferentially distributed around the first flow guide. The support vanes have vane upstream and downstream ends. The vane upstream end is closer than the vane downstream end to the first axial end of the pipe element and the vane downstream end is closer than the vane upstream end to the second axial end of the pipe element.

If desired, the downstream flow conditioner may also include a second flow guide having generally circular form when viewed in transverse cross-section. The second flow guide is located at least partially within the first flow guide and is radially spaced from the first flow guide by a radial space. The second flow guide has upstream and downstream guide ends. The upstream guide end is closer than the downstream guide end to the first axial end of the pipe element and the downstream guide end is closer than the upstream guide end to the second axial end of the pipe element. Preferably, the second flow guide has generally the same axial orientation as the inner peripheral surface of the pipe element. A plurality of support vanes situated at least partially within the radial space between the first and second flow guides locate the second flow guide. These support vanes are circumferentially spaced from each other and circumferentially distributed around the second flow guide.

Preferably, the first and second flow guides have a foil shape when viewed in longitudinal cross-section, wherein the downstream guide end is thinner (narrower, slenderer) than the upstream guide end.

Preferably, at least some of the support vanes have a foil shape, wherein the vane upstream end is thicker than the vane downstream end and the vane downstream end is thinner (narrower, slenderer) than the vane upstream end.

If desired, the downstream flow conditioner may include a third flow guide having a generally circular form when viewed in transverse cross-section located at least partially within and radially spaced from the second flow guide by a radial space. Preferably, the third flow guide has generally the same axial orientation as the inner peripheral surface. The third flow guide has upstream and downstream guide ends. The upstream guide end is closer than the downstream guide end to the first axial end of the pipe element. Preferably, the downstream guide end of the third flow guide is thinner (narrower, slenderer) than the upstream guide end of the third flow guide.

Preferably, the third flow guide has a guide inner surface facing generally radially inward and having generally the same axial orientation as the inner peripheral surface of the pipe element.

Preferably, the first, second, and third flow guides are generally conical. Preferably, the upstream guide end of the first flow guide is closer than the downstream guide end of the first flow guide to the pipe element and the upstream guide end of the second flow guide is closer than the downstream guide end of the second flow guide to the pipe element.

Preferably, at least some of the support vanes have generally the same axial orientation as the inner peripheral surface.

Preferably, the first flow guide has a guide inner surface facing generally radially inward and has a guide outer surface facing generally radially outward toward the pipe element, and the first flow guide preferably has at least one flow guide vent forming a passage in the first flow guide passing in a generally radial direction through the first flow guide from the guide outer surface to the guide inner surface. If desired, the flow guide vent can form a passage cutting in a generally axial direction through the first flow guide from the upstream guide end to the downstream guide end. If desired, the second flow guide and third flow guide may also incorporate one or more flow guide vents.

Preferably, the upstream guide end of the first flow guide is axially offset from the upstream guide end of the second flow guide, such that the upstream guide end of the second flow guide is more recessed than the upstream guide end of the first flow guide relative to the first axial end of the pipe element. Preferably, the upstream guide end of the second flow guide is axially offset from the upstream guide end of the third flow guide, such that the upstream guide end of the third flow guide is more recessed than the upstream guide end of the second guide relative to the first axial end of the pipe element.

The support vanes locating the first flow guide have an axial length between the vane upstream end and the vane downstream end. The first flow guide has an axial length between the upstream guide end and the downstream guide end. Preferably, the axial length of the first flow guide is longer than the axial length of the support vanes. This same practice can be applied to the second flow guide and the third flow guide.

If desired, the vane upstream end of at least one of the support vanes locating the first flow guide are farther than the upstream guide end of the first flow guide from the first end opening of the pipe element. This same practice can be applied to the second and third flow guides.

If desired, the vane downstream end of at least one of the support vanes locating the first flow guide are farther than the downstream guide end of the first flow guide from the first end opening of the pipe element. This same practice can be applied to the second and third flow guides.

BRIEF DESCRIPTION OF THE SEVERAL VIEWS OF THE DRAWINGS

The aspects, features, and advantages of the embodiments of the invention mentioned above are described in more detail by reference to the drawings, wherein like reference numerals represent like elements having the same basic function, in which:

FIG. 2D is a section view taken along lines 2D-2D in FIG. 2C;

FIG. 6A is a top view of another embodiment of the downstream flow conditioner;

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

FIG. 1

Figure 1:
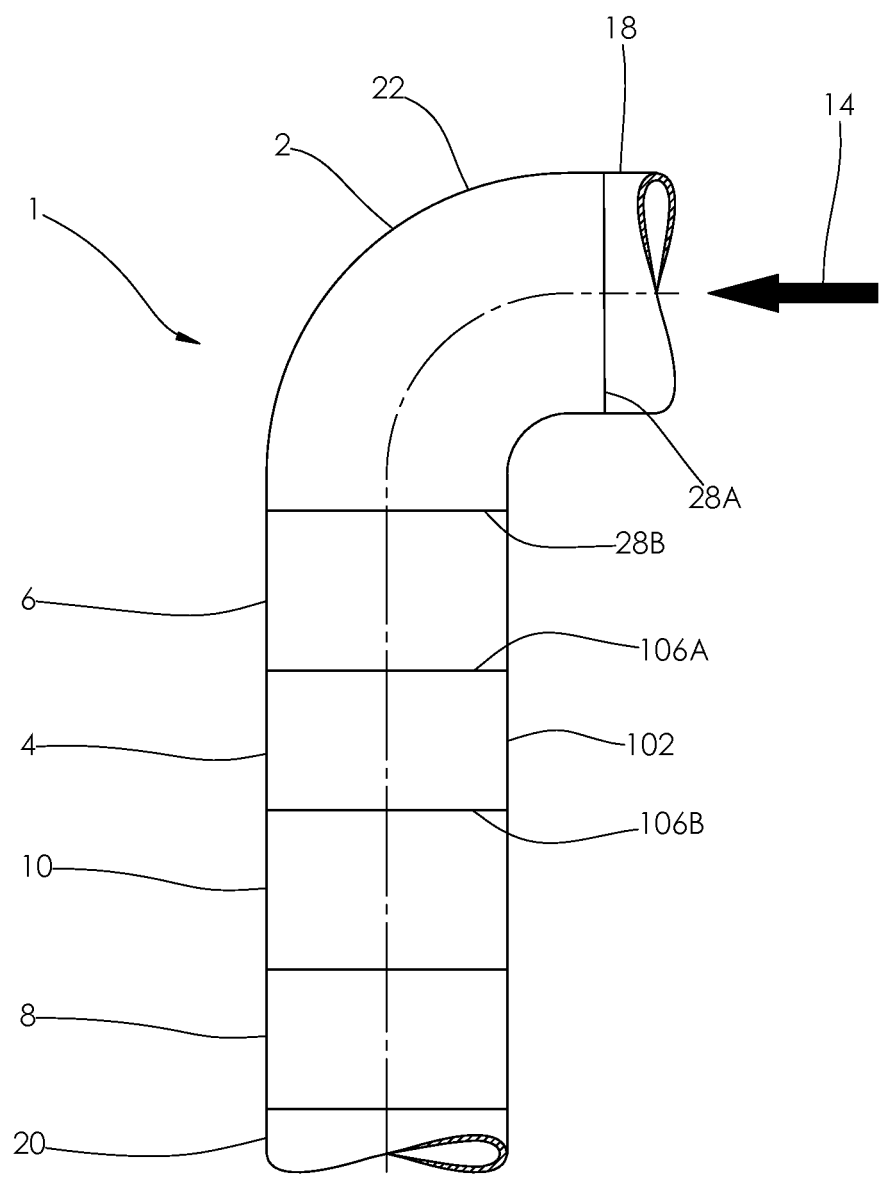
FIG. 1 is a plan view of a flow conditioning assembly according to an embodiment of the present invention.

Referring now to the drawings and first to FIG. 1, a flow conditioning assembly is shown generally at 1. Preferably, the flow conditioning assembly 1 comprises an integral elbow flow conditioner 2 and at least one downstream flow conditioner 4 that are connected to and may be separated from one another by at least one pipe section 6. The geometry of the integral elbow flow conditioner 2 and the at least one downstream flow conditioner 4 are discussed in detail in conjunction with subsequent figures. The at least one pipe section 6 is positioned in intermediate location to the integral elbow flow conditioner 2 and the at least one downstream flow conditioner 4. When used in this specification, the word "intermediate" has the ordinary dictionary meaning of, "occurring in the middle of a . . . series" (Merriam-Webster's Learner's Dictionary).

If desired, the flow conditioning assembly 1 may also include a second downstream flow conditioner 8, wherein the at least one downstream flow conditioner 4 and the second downstream flow conditioner 8 are connected to and may be separated by a second pipe section 10. Preferably, the second pipe section 10 is positioned in intermediate location to the at least one downstream flow conditioner 4 and the second downstream flow conditioner 8. The second downstream flow conditioner 8 may be the same as the first downstream flow conditioner 4, or it may have a different internal configuration. FIG. 1 illustrates two downstream flow conditioners. Any number and selection of downstream flow conditioners can be used to achieve flow conditioning objectives.

Preferably, the at least one pipe section 6 and the second pipe section 10 are conventional pipe; i.e., they are tubes for conducting a fluid. The aforementioned components of the flow conditioning assembly 1 are connected to one another by any suitable means, such as welding, bolt flanges, Victaulic-brand split clamps, etc. Preferably, and for maximum performance of the flow conditioning assembly 1, the fluid flows through the flow conditioning assembly 1 in flow direction 14.

The flow conditioning assembly 1 is illustrated in situ, attached to and positioned in intermediate location to an upstream piping component 18 and a downstream piping component 20. The upstream piping component 18 and downstream piping component 20 can be selected from a variety of piping components, such as valves, pipe, elbows, tees, flow meters, etc. The flow conditioning assembly 1 can be connected to the upstream piping component 18 and downstream piping component 20 by any suitable means, such as welding, bolt flanges, Victaulic-brand split clamps, etc.

The upstream piping component 18 and other upstream components can produce flow disturbances that can have a significant effect on downstream flow and on flow generated noise. Features within the integral elbow flow conditioner 2 produce a well-conditioned flow that may then be further conditioned and quieted by the at least one downstream flow conditioner 4 and by the second downstream flow conditioner 8. If desired, the flow conditioning assembly 1 can be installed downstream of flow disturbances or upstream of equipment benefitting from conditioned flow, such as pumps and flow meters. If desired as a simplification, either the integral elbow flow conditioner 2 or the downstream flow conditioner 4 can be installed downstream of flow disturbances or upstream of equipment benefitting from conditioned flow, such as pumps and flow meters. In other words, as a simplification, the flow conditioning assembly 1 of the present invention can just include the integral elbow flow conditioner 2 or the downstream flow conditioner 4.

Preferably, the downstream flow conditioner 4 includes a pipe element 102 that has a first axial end 106A and a second axial end 106B. The integral elbow flow conditioner 2 includes a pipe elbow 22 that has a first end surface 28A and a second end surface 28B. The first axial end 106A of the pipe element 102 faces generally toward the second end surface 28B of the pipe elbow 22. The second axial end 106B of the pipe element 102 faces away from the second end surface 28B of the pipe elbow 22 and faces away from the first axial end 106A of the pipe element 102.

The integral elbow flow conditioner 2, downstream flow conditioner 4, and second downstream flow conditioner 8 have internal flow conditioning features that define generally longitudinally oriented internal passageways. Because the internal passageways of the integral elbow flow conditioner 2 differ in some respects from the internal passageways of the downstream flow conditioners 4 and 8, it was thought necessary to assign them different names, to distinguish between them. The generally longitudinally oriented internal passageways of the downstream flow conditioners 4 and 8 are herein assigned the name "flow passages" and the generally longitudinally oriented internal passageways of the integral elbow flow conditioner 2 are herein assigned the name "flow channels". These names are adopted in accordance with the principle that an "applicant is entitled to be his or her own lexicographer" (MPEP 2111.01). We mention this to prevent any misunderstanding of the use of the word "channel" in the assigned name "flow channels". The word "channel" has a variety of meanings, some more well-known than others. The Merriam-Webster online dictionary establishes one meaning as an "enclosed passage", and the applicant adopted the word "channel" into the name "flow channels" with this general meaning in mind, however the meaning of the name "flow channels" is established by the specification, rather than by the dictionary meaning of any word within the name.

FIGS. 2A-2F are different views of a preferred embodiment of an integral elbow flow conditioner 2.

FIG. 2A

Figure 2A:
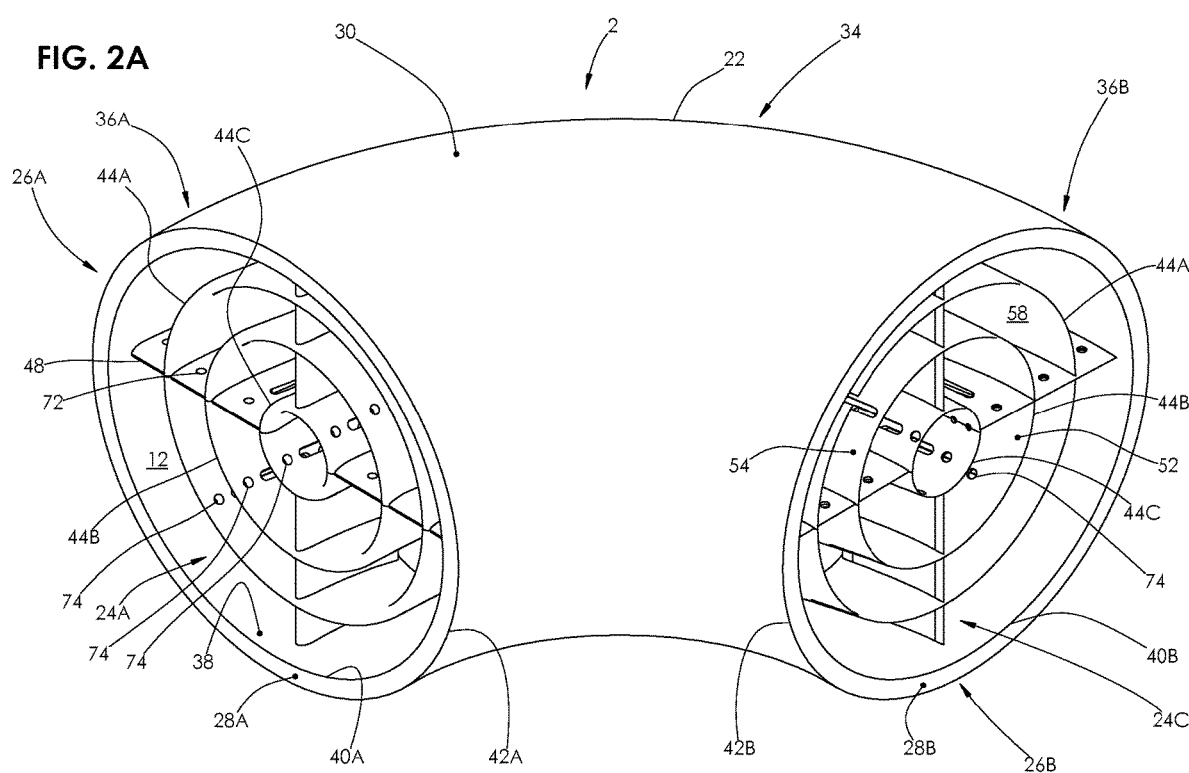
FIG. 2A is a perspective view of an integral elbow flow conditioner according to an embodiment of the present invention.

FIG. 2A is a perspective view of the integral elbow flow conditioner 2 comprising the pipe elbow 22 and at least a first flow conditioning element, shown generally at 24A. The purpose of the pipe elbow 22 is conducting and turning the flow of a fluid 12. The first flow conditioning element 24A is preferably wholly inside the pipe elbow 22.

The pipe elbow 22 is an annular conduit for conducting the fluid 12, wherein a portion thereof is curved. The pipe elbow 22 has generally axially-facing first opening shown generally at 26A and second opening shown generally at 26B. Preferably, the fluid 12 is conducted from the first opening 26A to and through the second opening 26B and has a flow direction from the first opening 26A to the second opening 26B.

The pipe elbow 22 preferably has first and second end surfaces 28A and 28B, respectively, that face in generally axial directions. The first end surface 28A and second end surface 28B are preferably annular, flat, and perpendicular to the flow direction of the fluid 12. It should be understood that, in service, the first end surface 28A and second end surface 28B may be welded to or otherwise connected to other piping elements, such as a pipe, a valve, a tee, or an elbow. For example, the components could be flanged together.

The pipe elbow 22 has an outer surface 30 that is preferably annular and faces radially outward away from the at least one first flow conditioning element 24A. The pipe elbow 22 has a curved section generally at 34 that is positioned in an intermediate location to the first end surface 28A and second end surface 28B. If desired, the pipe elbow 22 may also have a first straight section shown generally at 36A and second straight section shown generally at 36B. Preferably the curved section 34 is positioned in an intermediate location to and joins the first straight section 36A and the second straight section 36B.

The pipe elbow 22 has an inner surface 38 that faces radially inward away from the outer surface 30. The inner surface 38 is exposed to the fluid 12. The inner surface 38 is preferably smooth. Preferably, the first flow conditioning element 24A terminates at and is connected to the inner surface 38. The inner surface 38 turns/curves in at least one direction and forms at least a portion of a curved fluid passageway extending from the first opening 26A to the second opening 26B.

The inner surface 38 preferably intersects with the first end surface 28A and second end surface 28B to form a first inner corner 40A and a second inner corner 40B, respectively. The outer surface 30 preferably intersects with the first end surface 28A and second end surface 28B to form a first outer corner 42A and a second outer corner 42B, respectively. The first inner corner 40A and second inner corner 40B and the first outer corner 42A and second outer corner 42B are external corners and are preferably generally circular.

Lest the reader be confused by terms such as internal corner, inside corner, external corner, and outside corner, the following example is provided. Imagine a large cube-shaped empty box made of opaque material. From a point of observation that is located inside the box, all of the corners that you can see are what are known in the engineering, manufacturing and building trades as internal corners, or inside corners. From a point of observation that is located outside the box, all you can see are what are known in the engineering, manufacturing and building trades as external corners, or outside corners. As a further clarification, a solid cube only has external (outside) corners and has no inside (internal) corners.

It should be understood that in manufactured components external corners can, if desired, be rounded corners or chamfered corners. For example, chamfered corners are often used in preparation for the welds that sometimes connect one piping element to another. For another example, the sharp corners of many machined parts are "broken" after machining to remove burrs, etc., and many machining drawings carry a note something like "Break all sharp edges" and/or "Remove all burrs". Thus, it can be understood that the configuration of an external corner can be selected from a group consisting of sharp corners, rounded corners and chamfered corners.

The first inner corner 40A and second inner corner 40B are located at the inner peripheral edges of the first end surface 28A and second end surface 28B, respectively, and are outside corners. The first outer corner 42A and second outer corner 42B are located at the outer peripheral edges of the first end surface 28A and second end surface 28B, respectively, and are outside corners. The first end surface 28A is preferably positioned in an intermediate location to the first inner corner 40A and the first outer corner 42A. The second end surface 28B is preferably positioned in an intermediate location to the second inner corner 40B and the second outer corner 42B. The first end surface 28A and second end surface 28B are in intermediate locations to the inner surface 38 and outer surface 30 of the pipe elbow 22.

The first flow conditioning element 24A has at least a first turning guide 44A. Also shown in this embodiment are a second turning guide 44B and a third turning guide 44C. Preferably, the first turning guide 44A, second turning guide 44B, and third turning guide 44C are generally circular in form when viewed in transverse cross-section and turn/curve in generally the same at least one direction as the inner surface 38. The first turning guide 44A, second turning guide 44B, and third turning guide 44C are supported and positioned relative to the pipe elbow 22 by a plurality of vanes 48. If desired, the vanes 48 may incorporate vane vents 72 that form holes which penetrate in a generally circumferential direction through the vanes 48. If desired, the first turning guide 44A, second turning guide 44B, and third turning guide 44C may incorporate guide vents 74 that form holes penetrating through the first turning guide 44A, second turning guide 44B, and third turning guide 44C in a generally radial direction.

The pipe elbow 22 has the function of changing the direction of the fluid 12 flowing through the pipe elbow 22 and providing a pressure boundary for the fluid 12. The first end surface 28A and second end surface 28B are typically connected to other piping elements, examples of which include pipe, another elbow, a pipe tee, or a valve.

FIG. 2B

Figure 2B:
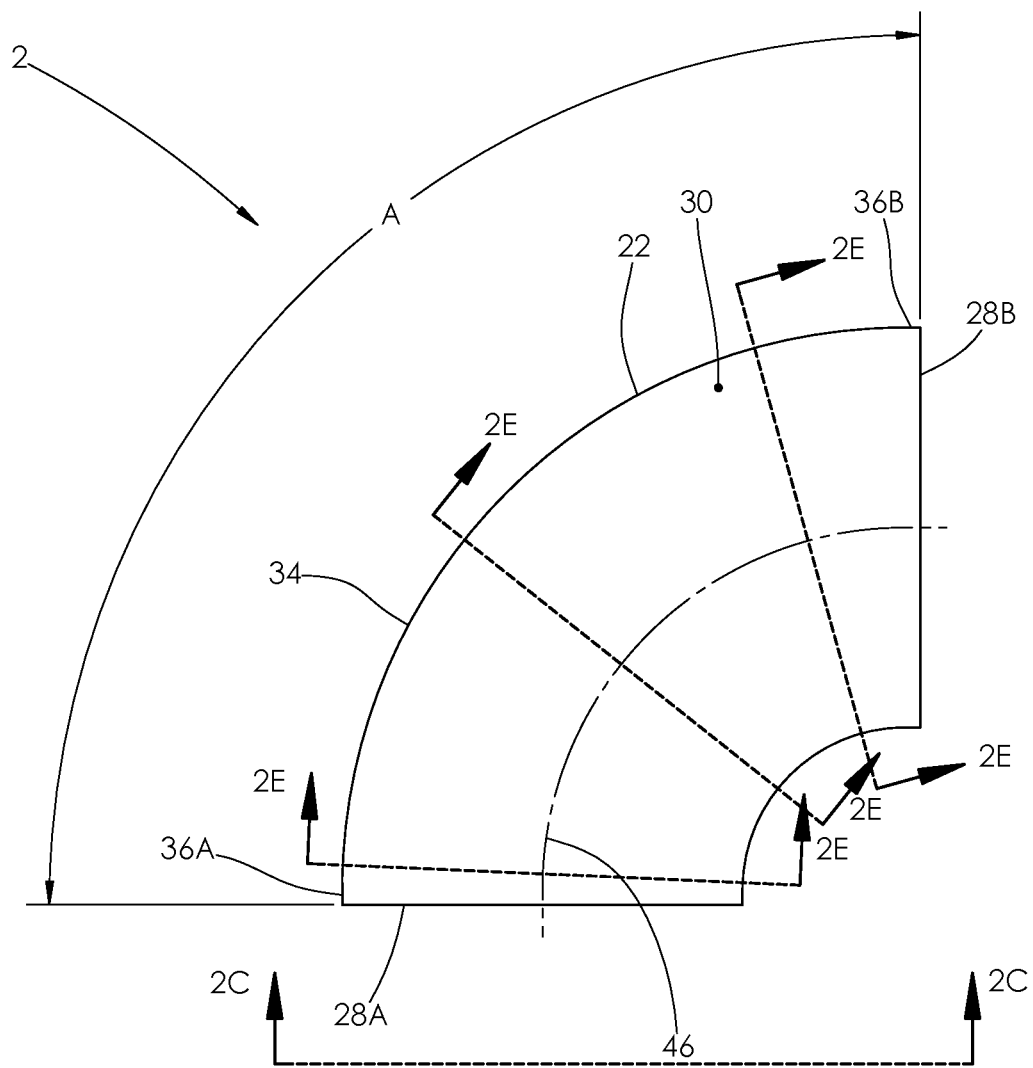
FIG. 2B is a top view of the integral elbow flow conditioner shown in FIG. 2A.
Figure 2C:
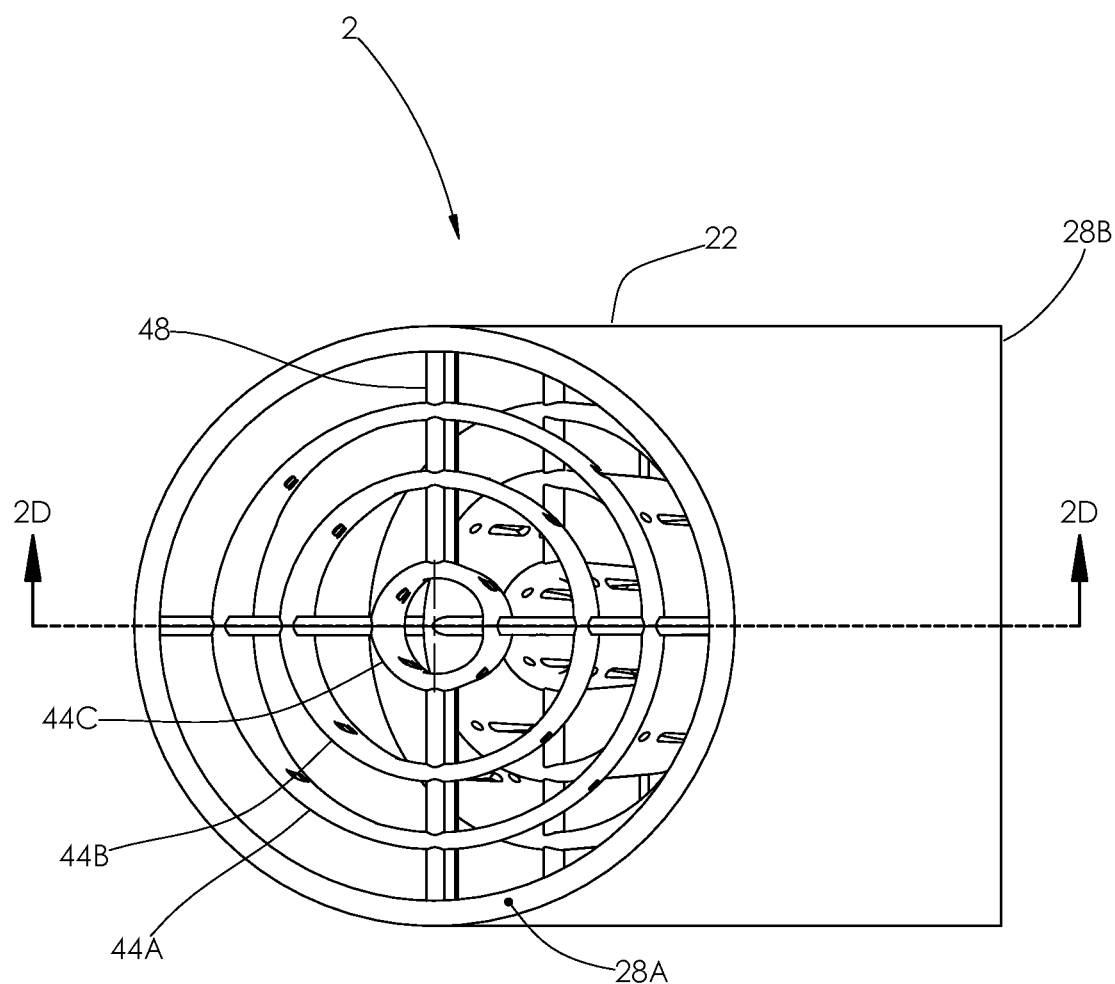
FIG. 2C is a front view of the integral elbow flow conditioner taken along lines 2C-2C in FIG. 2B.
Figure 2E:
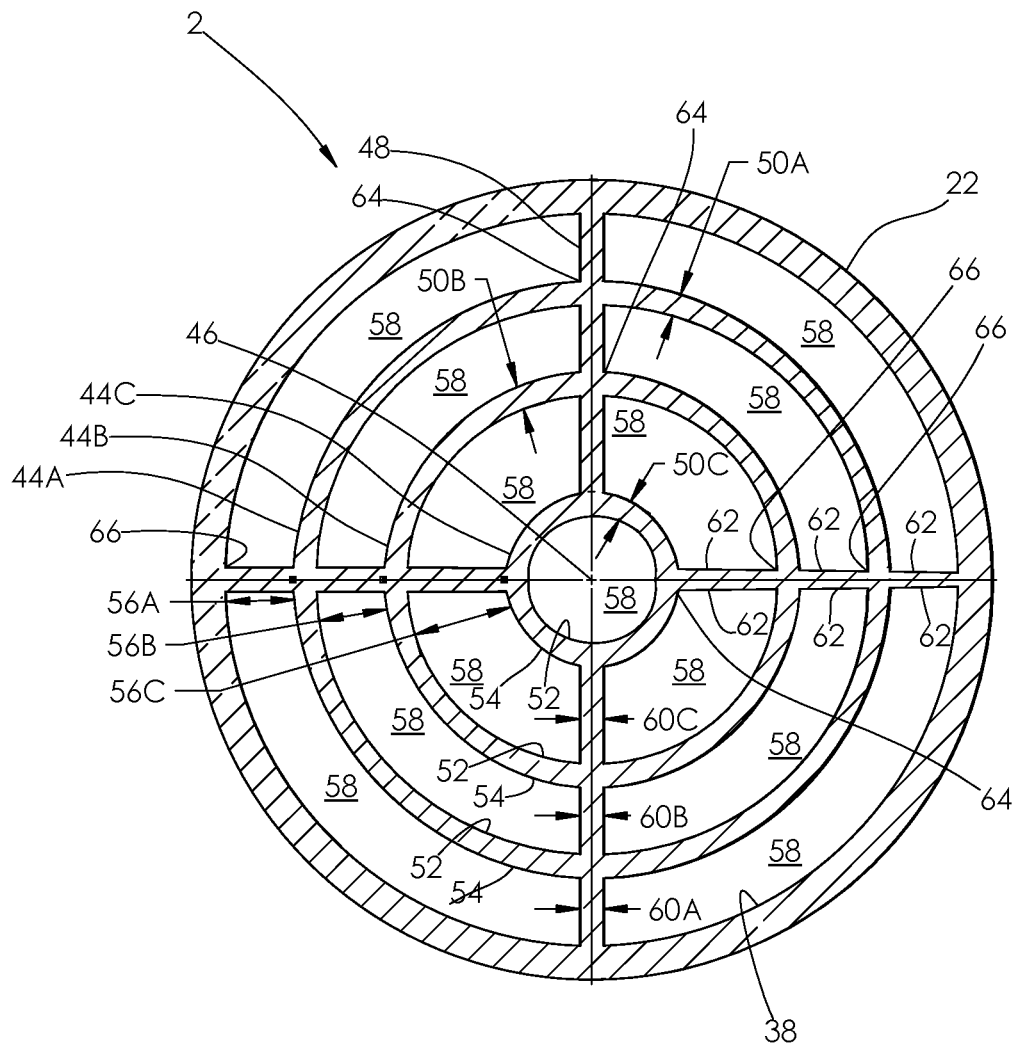
FIG. 2E is a section view taken along lines 2E-2E in FIG. 2B.

FIG. 2B is a top view of the integral elbow flow conditioner 2. This view includes three cutting planes 2E-2E and a view plane 2C-2C. FIG. 2C is representative of the view from view plane 2C-2C. FIG. 2E is representative of the cross-sections at the cutting planes 2E-2E. The pipe elbow 22, first end surface 28A, second end surface 28B outer surface 30, curved section 34, first straight section 36A, and second straight section 36B are labeled for orientation purposes. The curved section 34 is intermediate to the first straight section 36A and the second straight section 36B and between the first end surface 28A and the second end surface 28B. The pipe elbow 22 curves at an angle A, which in this embodiment is 90°. Other angles are possible, 45° being a common example.

The term "axis" is well-understood in mechanical engineering and in the field of drafting and is commonly represented by a centerline or intersecting centerlines. The axis of the pipe elbow 22 is shown at 46.

Preferably, the first end surface 28A and second end surface 28B of the pipe elbow 22 are perpendicular to the axis 46 of the pipe elbow 22. Preferably, the outer surface 30 of the pipe elbow 22 is smooth, annular, curved, and generally circular at any given cross-section that is perpendicular to the axis 46 of the pipe elbow 22. The outer surface 30 faces radially outward and away from the axis 46. As previously described, the pipe elbow 22 may comprise a first straight section 36A and/or second straight section 36B that are generally cylindrical and of a curved section 34.

FIG. 2C

FIG. 2C is a front view of the integral elbow flow conditioner 2 and corresponds to view plane 2C-2C in FIG. 2B. The first end surface 28A and second end surface 28B are labeled for orientation purposes. This view includes cutting plane 2D-2D. FIG. 2D is representative of the cross-section at the cutting plane 2D-2D. The first turning guide 44A, second turning guide 44B, and third turning guide 44C are supported and positioned relative to the pipe elbow 22 by the plurality of vanes 48.

FIG. 2D

FIG. 2D is a longitudinal cross-section view of the integral elbow flow conditioner 2 that represents the cutting plane 2D-2D shown in FIG. 2C. The sectional views herein are intended to be interpreted by the standard conventions of multi and sectional view orthographic drawing projection practiced in the United States and described in ANSI Y14.3-1975, an industry standardization document promulgated by ASME. Section 3-4.2.1 of ANSI Y14.3-1975 has been interpreted to mean that the circumferentially solid portions of the integral elbow flow conditioner 2 (i.e., pipe elbow 22, first turning guide 44A, second turning guide 44B, and third turning guide 44C) should be crosshatched in sectional view, while the vanes 48 should be drawn in outline form without crosshatch lines to avoid conveying a false impression of circumferential solidity.

The vanes 48 have a vane leading edge 80 and a vane trailing edge 82, the vane leading edge 80 being closer than the vane trailing edge 82 to the first opening 26A and the vane trailing edge 82 being closer than the vane leading edge 80 to the second opening 26B. The terms "leading" and "trailing" are based on the preferred direction of flow of the fluid 12. Preferably, at least some of the vanes 48 turn/curve in generally the same at least one direction as the inner surface 38.

If desired the integral elbow flow conditioner 2 may have more than one flow conditioning element, such as the first flow conditioning element 24A, second flow conditioning element 24B, and third flow conditioning element 24C that are shown. Preferably, the second flow conditioning element 24B is spaced apart from the first flow conditioning element 24A and the third flow conditioning element 24C is spaced apart from the second flow conditioning element 24B, the second flow conditioning element 24B being located at least partially within the pipe elbow 22 and positioned in an intermediate location to the first flow conditioning element 24A and the third flow conditioning element 24C.

As with the first flow conditioning element 24A, the second flow conditioning element 24B and third flow conditioning element 24C are preferably composed of a first turning guide 44A, a second turning guide 44B, a third turning guide 44C, and vanes 48. Preferably, the first flow conditioning element 24A, second flow conditioning element 24B, and third flow conditioning element 24C each have a plurality of flow channels 58 that turn in generally the same at least one direction as the inner surface 38 of the pipe elbow 22. As with the first flow conditioning element 24A, the second flow conditioning element 24B and third flow conditioning element 24C are preferably connected to the pipe elbow 22. Preferably, at least some of the vanes 48 turn in generally the same at least one direction as the inner surface 38.

The first flow conditioning element 24A, second flow conditioning element 24B, and third flow conditioning element 24C occur at first location 68A, second location 68B, and third location 68C of the pipe elbow 22, respectively. If desired, a first fluid settling chamber 70A can be located within the pipe elbow 22 and between the first flow conditioning element 24A and the second flow conditioning element 24B and a second fluid settling chamber 70B can be located within the pipe elbow 22 and between the second flow conditioning element 24B and the third flow conditioning element 24C. The first fluid settling chamber 70A is the space within the inner surface 38 and between the first flow conditioning element 24A and second flow conditioning element 24B. The second fluid settling chamber 70B is the space within the inner surface 38 and between the second flow conditioning element 24B and the third flow conditioning element 24C. The fluid 12 has a pressure that may vary in a cross-sectional region due to flow disturbances from upstream piping elements. The first fluid settling chamber 70A allows the pressure of the fluid 12 to somewhat equalize radially and circumferentially after exiting the first flow conditioning element 24A and before entering the second flow conditioning element 24B. The second fluid settling chamber 70B allows the pressure of the fluid 12 to somewhat equalize radially and circumferentially after exiting the second flow conditioning element 24B and before entering the third flow conditioning element 24C. Preferably, the first fluid settling chamber 70A and the second fluid settling chamber 70B are located within the pipe elbow 22.

Preferably, the fluid 12 enters the integral elbow flow conditioner 2 at the first opening 26A, flows through the pipe elbow 22, and then exits at and through the second opening 26B.

Preferably, in this embodiment, once the fluid 12 enters the integral elbow flow conditioner 2 through the first opening 26A, it enters the first flow conditioning element 24A, then passes through the first fluid settling chamber 70A, enters the second flow conditioning element 24B, then passes through the second fluid settling chamber 70B, then flows through the third flow conditioning element 24C, and then exits the integral elbow flow conditioner 2 at the second opening 26B.

Within the illustrated embodiment of the integral elbow flow conditioner 2, the fluid 12 is typically either flowing through the flow channels 58 and in contact with the first turning guide 44A, second turning guide 44B, and third turning guide 44C, vanes 48, and the inner surface 38 of the pipe elbow 22, or the fluid 12 is flowing through a first fluid settling chamber 70A or a second fluid settling chamber 70B and is in contact with only the inner surface 38 of the pipe elbow 22.

In this embodiment where the pipe elbow 22 makes a 90° turn and has a generally cylindrical first straight section 36A and a second straight section 36B, the second flow conditioning element 24B is illustrated as being in the central portion of the pipe elbow 22 at second location 68B. Preferably, the first location 68A and the first flow conditioning element 24A are near the first end surface 28A of the pipe elbow 22. Preferably, the third location 68C and the third flow conditioning element 24C are near the second end surface 28B of the pipe elbow 22.

If desired, the vanes 48 may incorporate vane vents 72 that penetrate in a generally circumferential direction through the vanes 48. The vane vents 72 can be any desired shape, such as the obround and round holes that are shown, or other slot shapes. The vane vents 72 enable the pressure of the fluid 12 to somewhat equalize circumferentially between adjacent flow channels 58.

Referring momentarily back to FIG. 2A, the third flow conditioning element is shown generally at 24C. The first turning guide 44A, second turning guide 44B, and third turning guide 44C of the third flow conditioning element 24C are labeled for orientation purposes. If desired, the first turning guide 44A, second turning guide 44B, and third turning guide 44C may incorporate guide vents 74 that form holes which penetrate the first turning guide 44A, second turning guide 44B, and third turning guide 44C in a generally radial direction. For example, the at least one guide vents 74 in the second turning guide 44B forms a hole in the second turning guide 44B passing in a generally radial direction through the second turning guide 44B from an inner guide surface 52 to an outer guide surface 54. The guide vents 74 can be any desired shape, such as the obround and round holes that are shown, or other slot shapes, such as holes that extend from one vane 48 to another. The guide vents 74 enable the pressure of the fluid 12 to somewhat equalize radially between adjacent flow channels 58. If desired, the guide vents 74 can also be one or more axial slots that extend completely through the axial length of one or more of the turning guides (i.e., first turning guide 44A, second turning guide 44B, third turning guide 44C) such that the turning guides are C-shaped or segmented, rather than annular in form.

If desired, any of the first turning guide 44A, second turning guide 44B, and third turning guide 44C can have a foil shaped cross-section as shown in FIG. 2D. The foil shape is most apparent when the first turning guide 44A, second turning guide 44B, and third turning guide 44C are viewed in longitudinal cross-section. The first turning guide 44A, second turning guide 44B, and third turning guide 44C have guide leading edges 76 and guide trailing edges 78. The terms "leading" and "trailing" are based on the preferred direction of flow of the fluid 12. The guide leading edges 76 are closer than the guide trailing edges 78 to the first opening 26A and the guide trailing edges 78 are closer than the guide leading edges 76 to the second opening 26B. By the term "foil shaped" what is meant herein is that, when viewed in longitudinal cross-section, the guide leading edges 76 are thicker and more rounded than the guide trailing edges 78, and the guide trailing edges 78 are more pointed and thinner (narrower, slenderer) than the guide leading edges 76. Another way of describing the preferred foil shape is that the guide leading edges 76 are rounded and the thickness (i.e., first thickness 50A, second thickness 50B, third thickness 50C) of the turning guides (i.e., first turning guide 44A, second turning guide 44B, third turning guide 44C) gradually increases along the axial length of the turning guide from the guide leading edges 76 toward the guide trailing edges 78 until it reaches a location of maximum thickness near the guide leading edges 76, followed by a continuously narrowing thickness toward the guide trailing edges 78, and defining guide trailing edges 78 that can be sharp or blunt or rounded or chamfered, but in any case smaller in thickness (slenderer) than the location of maximum thickness near the guide leading edges 76.

The first flow conditioning element 24A, second flow conditioning element 24B, and third flow conditioning element 24C are located at least partially within the pipe elbow 22, and (for ease of assembling the integral elbow flow conditioner 2 with other piping components) are preferably located entirely within the pipe elbow 22. The first flow conditioning element 24A, second flow conditioning element 24B, and third flow conditioning element 24C are each comprised of a plurality of vanes 48 and at least a first turning guide 44A. In the illustrated embodiment of FIG. 2D, a first turning guide 44A, a second turning guide 44B, and a third turning guide 44C are illustrated, however, any suitable number can be used.

FIG. 2E

FIG. 2E is a transverse cross-sectional view of the integral elbow flow conditioner 2 that is representative of the three cutting planes 2E-2E on FIG. 2B. By "transverse cross-sectional view," what is meant throughout this specification is the imaginary cutting plane of the cross-sectional view is oriented at right angles to the axis 46. FIG. 2E is a transverse cross-sectional view of the first, second, and third flow conditioning elements.

Preferably, when viewed in transverse cross-section, the first turning guide 44A, second turning guide 44B, and third turning guide 44C are generally circular. The first turning guide 44A, second turning guide 44B, and third turning guide 44C each have an inner guide surface 52 that faces generally radially inward toward the axis 46. The first turning guide 44A, second turning guide 44B, and third turning guide 44C each have an outer guide surface 54 that faces generally radially outward toward the inner surface 38 of the pipe elbow 22 and generally away from the axis 46. Preferably, these inner guide surfaces 52 and outer guide surfaces 54 turn in generally the same at least one direction as the inner surface 38.

Preferably, the first turning guide 44A, second turning guide 44B, and third turning guide 44C are located at least partially within the pipe elbow 22 and turn/curve in generally the same at least one direction as the inner surface 38 of the pipe elbow 22. Preferably, the second turning guide 44B is located radially inward of and at least partially within the first turning guide 44A. Preferably, the third turning guide 44C is located radially inward of and at least partially within the second turning guide 44B. In this embodiment, the first turning guide 44A is radially inward of, encircled by, and wholly within the pipe elbow 22, the second turning guide 44B is radially inward of, encircled by, and wholly within the first turning guide 44A, and the third turning guide 44C is radially inward of, encircled by, and wholly within the second turning guide 44B. In this embodiment, the first turning guide 44A, second turning guide 44B, and third turning guide 44C are shown as being concentric with each other and with the inner surface 38 of the pipe elbow 22. For the purposes of this specification, the definition of concentric is, "having a center in common" (Collins Dictionary). However, if desired, the first turning guide 44A, second turning guide 44B, and third turning guide 44C may be eccentric with respect to each other and/or with respect to the pipe elbow 22. For example, the first turning guide 44A, second turning guide 44B, and third turning guide 44C may be offset relative to the pipe elbow 22 and relative to each other if desired for a specific effect on the fluid 12. For the purposes of this specification, the definition of eccentric is, "not having the same center, as two circles one inside the other" (Collins Dictionary).

The first turning guide 44A, second turning guide 44B, and third turning guide 44C have a first thickness 50A, second thickness 50B, and third thickness 50C, respectively. The first thickness 50A is the radial distance between the inner guide surface 52 and the outer guide surface 54 of the first turning guide 44A. The second thickness 50B is the radial distance between the inner guide surface 52 and the outer guide surface 54 of the second turning guide 44B. The third thickness 50C is the radial distance between the inner guide surface 52 and the outer guide surface 54 of the third turning guide 44C. These thicknesses can vary if desired, and need not all be the same.

The inner guide surface 52 of the turning guides (i.e., first turning guide 44A, second turning guide 44B, third turning guide 44C, collectively 44A-C) faces generally radially away from inner surface 38 and generally radially inward toward the axis 46 and contacts the fluid 12. The outer guide surface 54 of the turning guides 44A-C faces radially outward toward the inner surface 38 of the pipe elbow 22 and contacts the fluid 12. The inner guide surface 52 and the outer guide surface 54 of any given turning guide 44A-C may be concentric with respect to one another, or eccentric with respect to one another, as may be desired for the resulting effect on the fluid 12.

Preferably, a first radial space 56A produces an annular region that is located radially between the inner surface 38 of the pipe elbow 22 and the first turning guide 44A. The first turning guide 44A is radially spaced from the pipe elbow 22 by the first radial space 56A. Preferably, the first radial space 56A is generally circular.

Preferably, there is a second radial space 56B that produces an annular region that is located radially between the first turning guide 44A and the second turning guide 44B. The second turning guide 44B is radially spaced from the first turning guide 44A by the second radial space 56B. Preferably, the second radial space 56B is generally circular.

Preferably, there is a third radial space 56C that produces an annular region that is located radially between the second turning guide 44B and the third turning guide 44C. The third turning guide 44C is radially spaced from the second turning guide 44B by the third radial space 56C. Preferably, the third radial space 56C is generally circular. Preferably, the first radial space 56A, second radial space 56B, and third radial space 56C are each subdivided into flow channels 58 by the vanes 48. The vanes 48 serve to reduce the swirl of the flow of the fluid 12 that is caused by upstream piping elements such as elbows, valves, tees, etc.

There is also a flow channel 58 created by and radially inward of the inner guide surface 52 of the third turning guide 44C. The flow channels 58 conduct the fluid 12. The flow channels 58 have an open end facing upstream and an open end facing downstream. Preferably, the upstream open end of the flow channels 58 face toward and in the same general direction as the first opening 26A, and the downstream open end of the flow channels 58 face toward and in the same general direction as the second opening 26B.

There are a plurality of vanes 48. Preferably, some of the vanes 48 are in (or at least partially within) the first radial space 56A, are oriented generally radially between and adjoin with or attach to the inner surface 38 of the pipe elbow 22 and the first turning guide 44A, and locate the first turning guide 44A relative to the pipe elbow 22. The term "adjoins" means, "to lie next to or in contact with" (Merriam-Webster's Dictionary). When this specification uses the phrase "adjoin with or attach to" (or slight variations thereof) the inventors envision that the structural members the phrase references can be assembled together and mechanically retained in place; or alternately can be assembled together and retained in place with a process such as welding, brazing, or soldering; or alternately, can be manufactured together as an integral structure through a process such as three-dimensional printing (additive manufacturing) or investment casting.

Preferably, the vanes 48 in (or at least partially within) the first radial space 56A are circumferentially spaced from each other and circumferentially distributed around the first turning guide 44A, the vanes 48 dividing the first radial space 56A into a plurality of flow channels 58 that turn/curve in generally the same at least one direction as the inner surface 38. If desired, the vanes 48 may be equally spaced in the circumferential direction, but if desired for the added benefit provided, the vanes 48 may be unequally spaced in the circumferential direction.

Preferably, some of the vanes 48 that are in (or at least partially within) the second radial space 56B, are oriented generally radially between and adjoin with or attach to the first turning guide 44A and the second turning guide 44B, and locate the second turning guide 44B relative to the pipe elbow 22. Preferably, the vanes 48 in (or at least partially within) the second radial space 56B are circumferentially spaced from each other and circumferentially distributed around the second turning guide 44B, the vanes 48 dividing the second radial space 56B into a plurality of flow channels 58 that turn/curve in generally the same at least one direction as the inner surface 38. If desired, the vanes 48 may be equally spaced in the circumferential direction, but if desired for the added benefit provided, the vanes 48 may be unequally spaced in the circumferential direction.

Preferably, some of the vanes 48 that are in (or at least partially within) the third radial space 56C, are oriented generally radially between and adjoin with or attach to the second turning guide 44B and the third turning guide 44C, and locate the third turning guide 44C relative to the pipe elbow 22. Preferably, the vanes 48 in (or at least partially within) the third radial space 56C are circumferentially spaced from each other and circumferentially distributed around the third turning guide 44C, the vanes 48 dividing the third radial space 56C into a plurality of flow channels 58 that turn/curve in generally the same at least one direction as the inner surface 38. If desired, the vanes 48 may be equally spaced in the circumferential direction, but if desired for the added benefit provided, the vanes 48 may be unequally spaced in the circumferential direction.

The vanes 48 in the first radial space 56A, second radial space 56B, and third radial space 56C have a first thickness 60A, second thickness 60B, and third thickness 60C, respectively. These thicknesses can vary if desired, and need not all be the same. Preferably, the vanes 48 have at least two side surfaces 62 facing in generally opposite, generally circumferential directions. The first thickness 60A is the distance between the side surfaces 62 of the vanes 48 in the first radial space 56A. The second thickness 60B is the distance between the side surfaces 62 of the vanes 48 in the second radial space 56B. The third thickness 60C is the distance between the side surfaces 62 of the vanes 48 in the third radial space 56C. The side surfaces 62 contact the fluid 12. The vanes 48 with their side surfaces 62 in conjunction with the inner guide surface 52 and the outer guide surface 54 of the first turning guide 44A, second turning guide 44B, and third turning guide 44C, form multiple flow channels 58 which provide conduits for the fluid 12.

The first thickness 60A, second thickness 60B, and third thickness 60C of the vanes 48 may vary from the first thickness 50A, second thickness 50B, and third thickness 50C of the turning guides 44A-C. The first radial space 56A, second radial space 56B, and third radial space 56C have a plurality of vanes 48, respectively. If desired, the number of vanes 48 in the first radial space 56A, second radial space 56B, and third radial space 56C may vary.

The intersections of the vanes 48 with the outer guide surfaces 54 of the first turning guide 44A, second turning guide 44B, and third turning guide 44C produce vane inner corners 64 that are inside corners and may be sharp or filleted. The intersections of the vanes 48 with the inner surface 38 and with the inner guide surfaces 52 of the first turning guide 44A and the second turning guide 44B produce vane outer corners 66 that are inside corners and may be sharp or filleted.

FIG. 2F

Figure 2F:
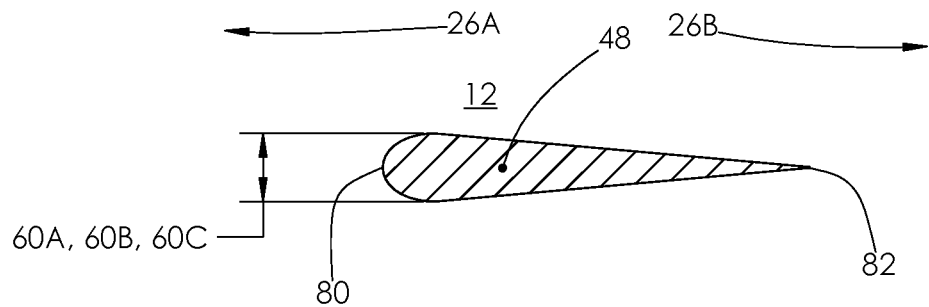
FIG. 2F is a cross-section of one of the vanes that is representative of the cutting plane 2F-2F shown in FIG. 2D.

FIG. 2F is a cross-section of one of the vanes 48 that is representative of the cutting plane 2F-2F shown in FIG. 2D. If desired, the vanes 48 may have a foil shape wherein the vane leading edge 80 is thicker and more rounded than the vane trailing edge 82 and the vane trailing edge 82 is more pointed (narrower, slenderer, thinner) than the vane leading edge 80. Another way of describing the foil shape is that the vane leading edge 80 is rounded and the thickness (i.e., first thickness 60A, second thickness 60B, third thickness 60C) of the vanes 48 gradually increases along the axial length of the vanes 48 from the vane leading edge 80 toward the vane trailing edge 82 until it reaches a location of maximum thickness near the vane leading edge 80, followed by a continuously narrowing thickness toward the vane trailing edge 82, and defining a vane trailing edge 82 that can be sharp or blunt or rounded or chamfered, but in any case is smaller in thickness than the location of maximum thickness near the vane leading edge 80.

Figure 3A:
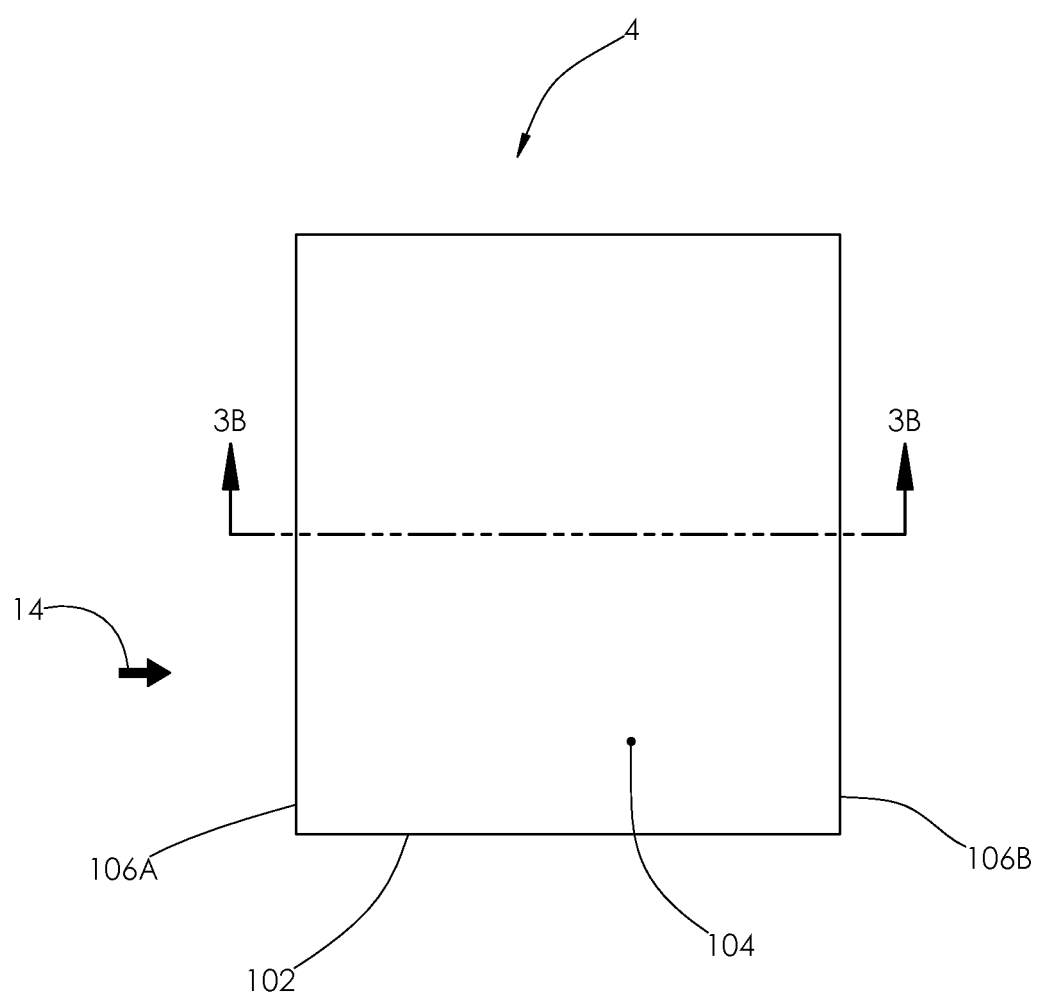
FIG. 3A is a top view of a downstream flow conditioner according to an embodiment of the present invention.
Figure 3B:
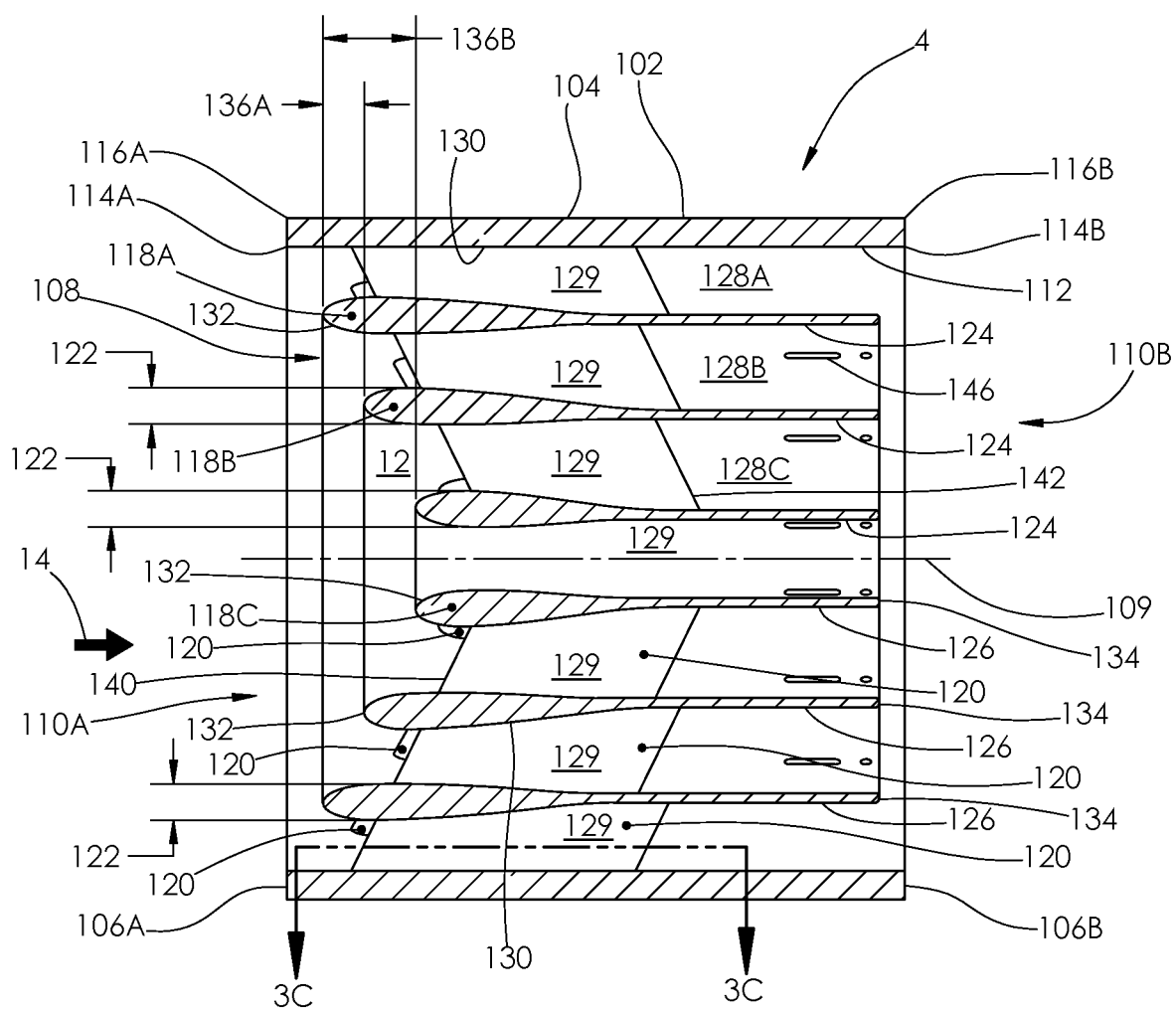
FIG. 3B is a section view taken along lines 3B-3B in FIG. 3A.
Figure 3C:
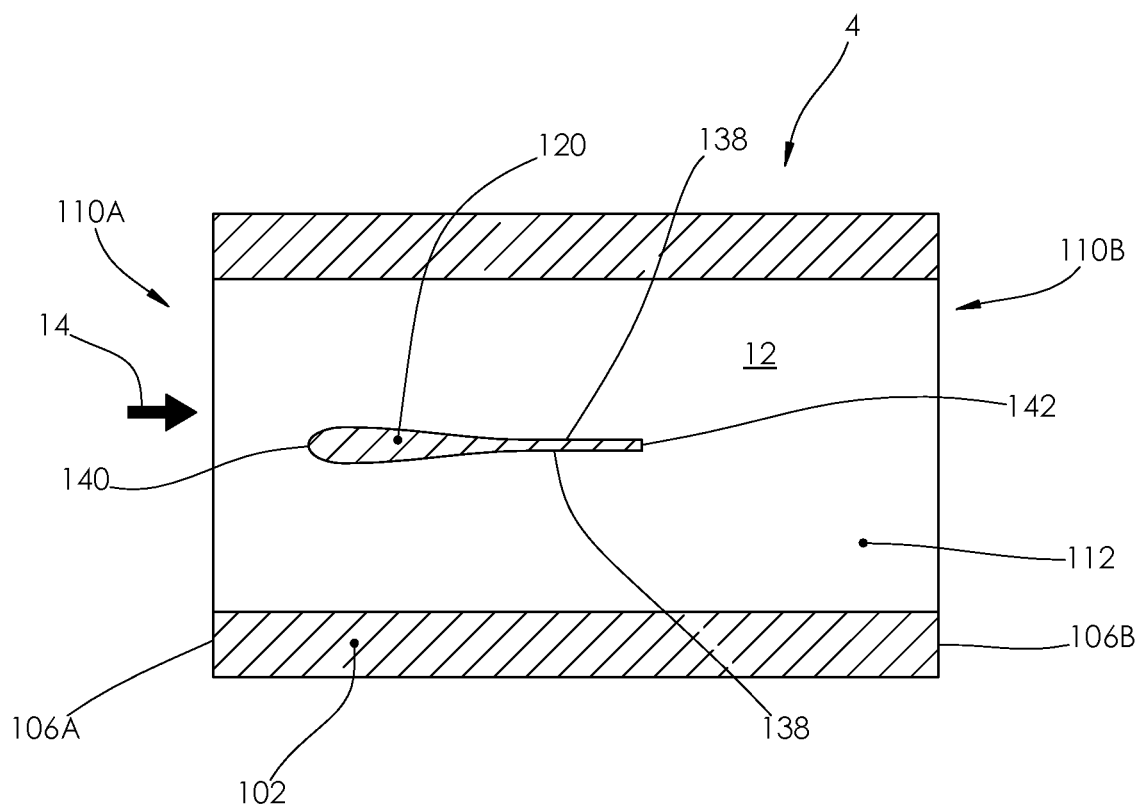
FIG. 3C is a section view taken along lines 3C-3C in FIG. 3B showing a cross-section of a support vane.

FIGS. 3A to 3C are different views of the same embodiment of a downstream flow conditioner.

FIG. 3A

Referring now to FIG. 3A, the downstream flow conditioner is shown generally at 4. FIG. 3A is a top view of the downstream flow conditioner 4. The downstream flow conditioner 4 comprises a pipe element 102. The pipe element 102 has an outer peripheral surface 104 that is annular and faces generally radially outward and preferably is cylindrical. Preferably, the pipe element 102 has a first axial end 106A and a second axial end 106B that face in generally axial and generally opposite directions away from each other. The first axial end 106A and the second axial end 106B are preferably annular, flat, and perpendicular to the flow direction 14 of the fluid. Preferably, the first axial end 106A is substantially parallel to the second axial end 106B. It should be understood that, in service, the first axial end 106A and the second axial end 106B may be welded to or otherwise connected to other piping elements, such as a pipe, a valve, a pipe tee, or an elbow. For example, the components could be flanged together. Preferably, the outer peripheral surface 104 is positioned in intermediate location to and adjoins the first axial end 106A and the second axial end 106B.

FIG. 3B

FIG. 3B is a longitudinal cross-section view of the downstream flow conditioner 4 that corresponds to the cutting plane 3B-3B that is shown in FIG. 3A. Referring now to FIG. 3B, the downstream flow conditioner 4, the pipe element 102, the outer peripheral surface 104, the first axial end 106A and the second axial end 106B are labeled for orientation purposes. The downstream flow conditioner 4 includes at least one flow conditioning structure, shown generally at 108, that is located at least partially within the pipe element 102. Preferably, the outer peripheral surface 104 of the pipe element 102 faces radially outward away from the flow conditioning structure 108. The axis of the pipe element 102 is shown at 109.

The pipe element 102 is an annular conduit for conducting the fluid 12. The pipe element 102 has a first end opening that is shown generally at 110A and a second end opening that is shown generally at 110B. Preferably, the first end opening 110A and the second end opening 110B face in generally axial and generally opposite directions away from each other.

Preferably, the fluid 12 enters the downstream flow conditioner 4 via the first end opening 110A and is conducted through the downstream flow conditioner 4 and exits the downstream flow conditioner 4 via the second end opening 110B. In other words, preferably, the fluid 12 has a flow direction 14 from the first end opening 110A to and through the second end opening 110B.

Preferably, the flow conditioning structure 108 is positioned wholly within the pipe element 102 and is positioned in intermediate location to the first axial end 106A and the second axial end 106B and is positioned in intermediate location to the first end opening 110A and the second end opening 110B.

The pipe element 102 has an inner peripheral surface 112 that faces radially inward, away from the outer peripheral surface 104. The inner peripheral surface 112 is exposed to the fluid 12. Preferably, the inner peripheral surface 112 forms at least a portion of an axially oriented fluid passageway extending from the first end opening 110A to the second end opening 110B. The inner peripheral surface 112 is preferably smooth and preferably generally cylindrical. Preferably, the flow conditioning structure 108 terminates radially at and adjoins with or attaches to the inner peripheral surface 112. Preferably, the inner peripheral surface 112 and the outer peripheral surface 104 face in generally opposite radial directions, away from one another. Preferably, the inner peripheral surface 112 is positioned in intermediate location to and adjoins the first axial end 106A and the second axial end 106B.

Preferably, the inner peripheral surface 112 intersects the first axial end 106A to form a first inward corner 114A and intersects the second axial end 106B to form a second inward corner 114B. The first inward corner 114A and the second inward corner 114B are external corners and are preferably generally circular. Preferably, the first inward corner 114A and the second inward corner 114B are located at the inner peripheral edges of the first axial end 106A and the second axial end 106B, respectively. Preferably, the first inward corner 114A and the second inward corner 114B are located at the axial extremities of the inner peripheral surface 112.

Preferably, the outer peripheral surface 104 intersects the first axial end 106A to form a first outward corner 116A and intersects the second axial end 106B to form a second outward corner 116B. The first outward corner 116A and the second outward corner 116B are external corners and are preferably generally circular. Preferably, the first outward corner 116A and the second outward corner 116B are located at the outer peripheral edges of the first axial end 106A and the second axial end 106B, respectively. Preferably, the first outward corner 116A and the second outward corner 116B are located at the axial extremities of the outer peripheral surface 104.

The first axial end 106A is preferably positioned in an intermediate location to the first inward corner 114A and the first outward corner 116A. The second axial end 106B is preferably positioned in an intermediate location to the second inward corner 114B and the second outward corner 116B. The first axial end 106A and the second axial end 106B are in an intermediate location to the inner peripheral surface 112 and outer peripheral surface 104 of the pipe element 102.

In the downstream flow conditioner 4, the flow conditioning structure 108 has at least a first flow guide 118A. Also shown in this embodiment are a second flow guide 118B and a third flow guide 118C. The first flow guide 118A, second flow guide 118B, and third flow guide 118C of the downstream flow conditioner 4 have the function of smoothing and conditioning the flow of the fluid 12. Although a first flow guide 118A, a second flow guide 118B, and a third flow guide 118C are shown, the quantity of these elements can be more or less than three to suit the size of the pipe element 102. For example, if the pipe element 102 is small, it may only benefit from a first flow guide 118A, and may not benefit from a second flow guide 118B and a third flow guide 118C. For another example, if the pipe element 102 is large, it may benefit from more than just a first flow guide 118A, second flow guide 118B, and third flow guide 118C.

Preferably, the outer peripheral surface 104 is located radially outward from and encircles the fluid 12, the inner peripheral surface 112, and the flow conditioning structure 108. Preferably, the fluid 12, the inner peripheral surface 112, and the flow conditioning structure 108 are located radially inward from and encircled by the outer peripheral surface 104. Preferably, the flow conditioning structure 108 is recessed axially relative to the first axial end 106A.

Preferably, the first axial end 106A and a second axial end 106B of the pipe element 102 are perpendicular to the axis 109 of the pipe element 102. Preferably the outer peripheral surface 104 of the pipe element 102 is smooth, annular and generally circular at any given cross-section that is perpendicular to the axis 109 of the pipe element 102. The outer peripheral surface 104 faces radially outward and away from the axis 109.

The flow conditioning structure 108 also includes a plurality of support vanes 120 that position and support the first flow guide 118A, second flow guide 118B, and third flow guide 118C and locate them relative to the pipe element 102. Section 3-4.2.1 of ANSI Y14.3-1975 has been interpreted to mean that the first flow guide 118A, second flow guide 118B, and third flow guide 118C of the downstream flow conditioner 4 should be crosshatched in sectional view, while the support vanes 120 that are at the cutting plane should be drawn in outline form without crosshatch lines to avoid conveying a false impression of circumferential solidity.

Some of the support vanes 120 are located radially between and adjoin with or attach to the pipe element 102 and the first flow guide 118A, and may generally be referred to as a first plurality of support vanes 120, and locate, bear the weight of, and bear the hydraulic forces acting on, the first flow guide 118A, second flow guide 118B, and third flow guide 118C. Some of the support vanes 120 are located radially between and adjoin with or attach to the first flow guide 118A and the second flow guide 118B, and may generally be referred to as a second plurality of support vanes 120, and bear the weight of, and the hydraulic forces acting on, the second flow guide 118B and the third flow guide 118C. Some of the support vanes 120 are located radially between and adjoin with or attach to the second flow guide 118B and the third flow guide 118C, and may generally be referred to as a third plurality of support vanes 120, and bear the weight of, and the hydraulic forces acting on, the third flow guide 118C. It should be understood that although a specific number of support vanes 120 are illustrated, such is not intended to limit the invention, which admits to the use of a quantity of support vanes 120 that are different than shown.

Preferably, the first flow guide 118A, second flow guide 118B, and third flow guide 118C are generally circular when viewed in transverse cross-section. The first flow guide 118A, second flow guide 118B, and third flow guide 118C, each have a radial thickness 122. The radial thickness 122 of the first flow guide 118A, second flow guide 118B, and third flow guide 118C need not be the same.

The first flow guide 118A, second flow guide 118B, and third flow guide 118C each have a guide inner surface 124 that faces in a generally radially inward direction toward the axis 109 and generally away from the inner peripheral surface 112 of the pipe element 102 and has generally the same axial orientation as the inner peripheral surface 112.

The first flow guide 118A, second flow guide 118B, and third flow guide 118C each have a guide outer surface 126 that faces in a generally radially outward direction toward the inner peripheral surface 112 of the pipe element 102 and generally away from the axis 109. Preferably, on each of the first flow guide 118A, second flow guide 118B, and third flow guide 118C, the guide inner surface 124 and the guide outer surface 126 face generally away from one another. Preferably, on each of the first flow guide 118A, second flow guide 118B, and third flow guide 118C, the guide inner surface 124 and the guide outer surface 126 are generally concentric with each other. Preferably, on each of the first flow guide 118A, second flow guide 118B, and third flow guide 118C, the guide inner surface 124 and the guide outer surface 126 are generally concentric with the inner peripheral surface 112 of the pipe element 102. Preferably, the first flow guide 118A, second flow guide 118B, and third flow guide 118C are concentric with each other and with the pipe element 102. Preferably, the first flow guide 118A, second flow guide 118B, and third flow guide 118C have generally the same axial orientation as the inner peripheral surface 112 of the pipe element 102.

Preferably, the first flow guide 118A, second flow guide 118B, and third flow guide 118C are at least partially within the pipe element 102. Preferably, the third flow guide 118C is radially inward of, encircled by, and wholly within the second flow guide 118B. Preferably, the second flow guide 118B is radially inward of, encircled by, and wholly within the first flow guide 118A. Preferably, the first flow guide 118A, second flow guide 118B, and third flow guide 118C are radially inward of, encircled by, and wholly within the pipe element 102.

The radial thickness 122 of the first flow guide 118A is the radial distance between the guide inner surface 124 and the guide outer surface 126 of the first flow guide 118A. The radial thickness 122 of the second flow guide 118B is the radial distance between the guide inner surface 124 and the guide outer surface 126 of the second flow guide 118B. The radial thickness 122 of the third flow guide 118C is the radial distance between the guide inner surface 124 and the guide outer surface 126 of the third flow guide 118C. On the first flow guide 118A, second flow guide 118B, and third flow guide 118C, the guide inner surface 124 faces radially away from the inner peripheral surface 112 and radially inward toward the axis 109 and contacts and guides the fluid 12. On the first flow guide 118A, second flow guide 118B, and third flow guide 118C, the guide outer surface 126 faces in a generally radially outward direction toward the inner peripheral surface 112 of the pipe element 102 and contacts and guides the fluid 12.

Preferably, there is a first conditioner region 128A that is an annular region that is located radially between the first flow guide 118A and the inner peripheral surface 112. Preferably, the first flow guide 118A is radially spaced from the pipe element 102 by the first conditioner region 128A. Preferably, the first conditioner region 128A is generally circular.

Preferably, there is a second conditioner region 128B that is an annular region that is located radially between the first flow guide 118A and the second flow guide 118B. Preferably, the second flow guide 118B is radially spaced from the first flow guide 118A by the second conditioner region 128B. Preferably, the second conditioner region 128B is generally circular.

Preferably, there is a third conditioner region 128C that is the annular region that is located radially between the second flow guide 118B and the third flow guide 118C. Preferably, the third conditioner region 128C is generally circular. Preferably, the third flow guide 118C is radially spaced from the second flow guide 118B by the third conditioner region 128C.

Preferably, the first conditioner region 128A, second conditioner region 128B, and third conditioner region 128C are each subdivided into discrete flow passages 129 by the support vanes 120 that are located at least partially within the first conditioner region 128A, second conditioner region 128B, and third conditioner region 128C. Preferably, the region radially inward from the third flow guide 118C also serves as one of the flow passages 129. The flow passages 129 defined by the first flow guide 118A, second flow guide 118B, third flow guide 118C and the support vanes 120 conduct and direct the fluid 12 to substantially reduce secondary flow of the fluid 12 inside the pipe element 102. The flow passages 129 have an open end facing upstream and an open end facing downstream. Preferably, the upstream open end of the flow passages 129 face toward and in the same general direction as the first end opening 110A, and the downstream open end of the flow passages 129 face toward and in the same general direction as the second end opening 110B.

Each of the plurality of support vanes 120 have a thickness in a generally circumferentially oriented direction. The thickness of the support vanes 120 is not to achieve strength, but to cause area blockage to build a pressure gradient to redirect the flow of the fluid 12. The quantity of and thickness of the support vanes 120 can vary as desired.

Preferably, the support vanes 120 in the first conditioner region 128A are located and oriented generally radially between the first flow guide 118A and the inner peripheral surface 112 and are circumferentially spaced from each other and circumferentially distributed around the first flow guide 118A.

Preferably, the support vanes 120 in the second conditioner region 128B are located and oriented generally radially between the first flow guide 118A and the second flow guide 118B and are circumferentially spaced from each other and circumferentially distributed around the second flow guide 118B.

Preferably, the support vanes 120 in the third conditioner region 128C are located and oriented generally radially between the second flow guide 118B and the third flow guide 118C and are circumferentially spaced from each other and circumferentially distributed around the third flow guide 118C.

The intersections between the support vanes 120 and the first flow guide 118A, second flow guide 118B, and third flow guide 118C, and inner peripheral surface 112 produce conditioner corners 130 that are inside corners and may be sharp or filleted.

Preferably, the pipe element 102 is located radially outward of and encircles the first flow guide 118A, second flow guide 118B, and third flow guide 118C, and the support vanes 120. Preferably, the first flow guide 118A is located radially outward of and encircles the second flow guide 118B and the third flow guide 118C. Preferably, the second flow guide 118B is located radially outward of and encircles the third flow guide 118C. Preferably, the first flow guide 118A is positioned in radially intermediate location to the pipe element 102 and the second flow guide 118B. Preferably, the second flow guide 118B is positioned in radially intermediate location to the first flow guide 118A and the third flow guide 118C.

If desired, the first flow guide 118A, second flow guide 118B, and third flow guide 118C can have a generally foil shaped cross-section as shown. The first flow guide 118A, second flow guide 118B, and third flow guide 118C have an upstream guide end 132 and a downstream guide end 134, with the terms "upstream" and "downstream" referencing the preferred flow direction 14 of the fluid 12. The upstream guide end 132 of the first flow guide 118A is closer than the downstream guide end 134 of the first flow guide 118A to the first end opening 110A and the upstream guide end 132 of the second flow guide 118B is closer than the downstream guide end 134 of the second flow guide 118B to the first end opening 110A, and the upstream guide end 132 of the third flow guide 118C is closer than the downstream guide end 134 of the third flow guide 118C to the first end opening 110A.

By the term "foil shaped" what is meant herein is that the upstream guide end 132 has a rounded streamlined shape and the downstream guide end 134 is thinner (slenderer) and more pointed. This is most easily understood when viewing the flow guides (i.e., first flow guide 118A, second flow guide 118B, third flow guide 118C, collectively 118A-C) in longitudinal cross-section. The purpose of the foil shape of the flow guides 118A-C is to reduce drag, turbulence, and associated noise. If desired, the flow guides 118A-C can be adjusted in their shape and "angle of attack" with respect to the flow direction 14 of the fluid 12 in order to sculpt the flow by exploiting Bernoulli's principle.

It should be understood that, as simplifications, the cross-sectional shapes of the flow guides 118A-C can be something other than a foil shape. For example, as a simplification, the guide inner surface 124 and guide outer surface 126 of the flow guides 118A-C could be generally parallel, and the upstream guide end 132 and downstream guide end 134 could be generally flat, chamfered, or generally convex.

If desired, the upstream guide end 132 of the first flow guide 118A and the second flow guide 118B can be axially offset by guide offset dimension 136A, and the upstream guide end 132 of the first flow guide 118A and the third flow guide 118C can be axially offset by guide offset dimension 136B, with guide offset dimension 136B being greater than guide offset dimension 136A, such that the second flow guide 118B is axially more distant from the first axial end 106A of the pipe element 102 compared to the first flow guide 118A, and such that the third flow guide 118C is axially more distant from the first axial end 106A of the pipe element 102 compared to the second flow guide 118B. This is referred to as a delayed start configuration.

Another way to describe the delayed start configuration follows. The upstream guide end 132 of the first flow guide 118A is axially offset from the upstream guide end 132 of the second flow guide 118B, the upstream guide end 132 of the second flow guide 118B being more recessed than the upstream guide end 132 of the first flow guide 118A relative to the first axial end 106A, or relative to the first end opening 110A.

Another way to describe the delayed start configuration follows. The upstream guide end 132 of the first flow guide 118A is closer than the upstream guide end 132 of the second flow guide 118B to the first end opening 110A, and the upstream guide end 132 of the second flow guide 118B is closer than the upstream guide end 132 of the third flow guide 118C to the first end opening 110A.

If desired, as a simplification, guide offset dimension 136A and guide offset dimension 136B can be substantially zero, such that the first flow guide 118A, second flow guide 118B, and third flow guide 118C are the same axial distance from the first axial end 106A of the pipe element 102, and such that the upstream guide end 132 of the first flow guide 118A, second flow guide 118B, and third flow guide 118C are located substantially on the same plane.

Preferably, the axial lengths of the support vanes 120 are less than (i.e., shorter than) the axial lengths of the first flow guide 118A, second flow guide 118B, and third flow guide 118C, to facilitate circumferential balancing of the pressure of the fluid 12. For example, the support vanes 120 that locate the first flow guide 118A have an axial length between the vane upstream end 140 and the vane downstream end 142 and the first flow guide 118A has an axial length between its upstream guide end 132 and its downstream guide end 134, and the axial length of the first flow guide 118A is longer than the axial length of the support vanes 120 that locate the first flow guide 118A, and the axial length of the support vanes 120 that locate the first flow guide 118A is shorter than the axial length of the first flow guide 118A.

If desired, the upstream guide end 132 of the first flow guide 118A can be closer than the downstream guide end 134 of the first flow guide 118A to the pipe element 102. If desired, the upstream guide end 132 of the second flow guide 118B can be closer than the downstream guide end 134 of the second flow guide 118B to the pipe element 102. If desired, the upstream guide end 132 of the third flow guide 118C can be closer than the downstream guide end 134 of the third flow guide 118C to the pipe element 102.

Preferably, the upstream guide end 132 of the first flow guide 118A is closer to the first end opening 110A than the vane upstream ends 140 of the support vanes 120 that support and locate the first flow guide 118A. Preferably, the upstream guide end 132 of the second flow guide 118B is closer to the first end opening 110A than the vane upstream ends 140 of the support vanes 120 that support and locate the second flow guide 118B. Preferably, the upstream guide end 132 of the third flow guide 118C is closer to the first end opening 110A than the vane upstream ends 140 of the support vanes 120 that support and locate the third flow guide 118C.

Preferably, the downstream guide end 134 of the first flow guide 118A is closer to the second end opening 110B than the vane downstream ends 142 of the support vanes 120 that support and locate the first flow guide 118A. Preferably, the downstream guide end 134 of the second flow guide 118B is closer to the second end opening 110B than the vane downstream ends 142 of the support vanes 120 that support and locate the second flow guide 118B. Preferably, the downstream guide end 134 of the third flow guide 118C is closer to the second end opening 110B than the vane downstream ends 142 of the support vanes 120 that support and locate the third flow guide 118C.

Preferably, the vane upstream end 140 of at least one of the support vanes 120 locating the first flow guide 118A is farther than the upstream guide end 132 of the first flow guide 118A from the first end opening 110A. Preferably, the vane upstream end 140 of at least one of the support vanes 120 locating the second flow guide 118B is farther than the upstream guide end 132 of the second flow guide 118B from the first end opening 110A. Preferably, the vane upstream end 140 of at least one of the support vanes 120 locating the third flow guide 118C is farther than the upstream guide end 132 of the third flow guide 118C from the first end opening 110A.

Preferably, the vane downstream end 142 of at least one of the support vanes 120 locating the first flow guide 118A is farther than the downstream guide end 134 of the first flow guide 118A from the second end opening 110B. Preferably, the vane downstream end 142 of at least one of the support vanes 120 locating the second flow guide 118B is farther than the downstream guide end 134 of the second flow guide 118B from the second end opening 110B. Preferably, the vane downstream end 142 of at least one of the support vanes 120 locating the third flow guide 118C is farther than the downstream guide end 134 of the third flow guide 118C from the second end opening 110B.

If desired, the first flow guide 118A, second flow guide 118B, and third flow guide 118C may incorporate flow guide vents 146 that form holes which penetrate the first flow guide 118A, second flow guide 118B, and third flow guide 118C in a generally radial direction. For example, a flow guide vent 146 in the first flow guide 118A forms a hole in the first flow guide 118A passing in a generally radial direction through the first flow guide 118A from a guide inner surface 124 to a guide outer surface 126. The flow guide vents 146 can be any desired shape, such as the obround and round holes that are shown, or other slot shapes, such as holes that extend generally circumferentially from one of the support vanes 120 to another. The flow guide vents 146 enable the pressure of the fluid 12 to somewhat equalize radially between adjacent flow passages 129. If desired, the flow guide vents 146 can also be one or more axial slots that extend completely through the axial length of one or more of the flow guides 118A-C such that the flow guides are C-shaped or segmented, rather than annular in form.

FIG. 3C

FIG. 3C is a cross-section of the downstream flow conditioner 4 that is representative of the cutting plane 3C-3C shown in FIG. 3B and illustrates a preferred cross-sectional shape of one of the support vanes 120. The pipe element 102, first axial end 106A, second axial end 106B, and inner peripheral surface 112 are labeled for orientation purposes. Preferably, the support vanes 120 have at least two vane flank surfaces 138 facing in generally opposite, generally circumferential directions that contact the fluid 12. The support vanes 120 have a vane upstream end 140 and a vane downstream end 142, the vane upstream end 140 being closer than the vane downstream end 142 to the first end opening 110A and the vane downstream end 142 being closer than the vane upstream end 140 to the second end opening 110B. The terms "upstream" and "downstream" reference the preferred flow direction 14 of the fluid 12.

If desired, the support vanes 120 may have a streamlined foil shape wherein the vane upstream end 140 is thicker and more rounded than the vane downstream end 142 and the vane downstream end 142 is slenderer (narrower, thinner) and pointed than the vane upstream end 140. In FIG. 3C, beginning at the vane upstream end 140 and working downstream toward the vane downstream end 142, the vane flank surfaces 138 curve away from one another and then curve toward one another causing the vane flank surfaces 138 to have a locally convex shape, and then continue to curve toward one another causing the vane flank surfaces 138 to have a locally concave shape, and then the remainder of the vane flank surfaces 138 are substantially parallel.

The purpose of the foil shape of the support vanes 120 is to reduce drag, turbulence, and associated noise. If desired, the support vanes 120 can be adjusted in their shape and "angle of attack" with respect to the flow direction 14 of the fluid 12 in order to sculpt the flow by exploiting Bernoulli's principle.

It should be understood that, as simplifications, the cross-sectional shapes of the support vanes 120 can be something other than a foil shape. For example, as a simplification, the vane flank surfaces 138 of the support vanes 120 could be generally parallel, and the vane upstream end 140 and vane downstream end 142 could be generally flat, chamfered, or generally convex.

Preferably, the vane flank surfaces 138 face in generally circumferential directions. Preferably, the vane flank surfaces 138 of the support vanes 120 face in generally opposite directions, away from each other.

Figure 4A:
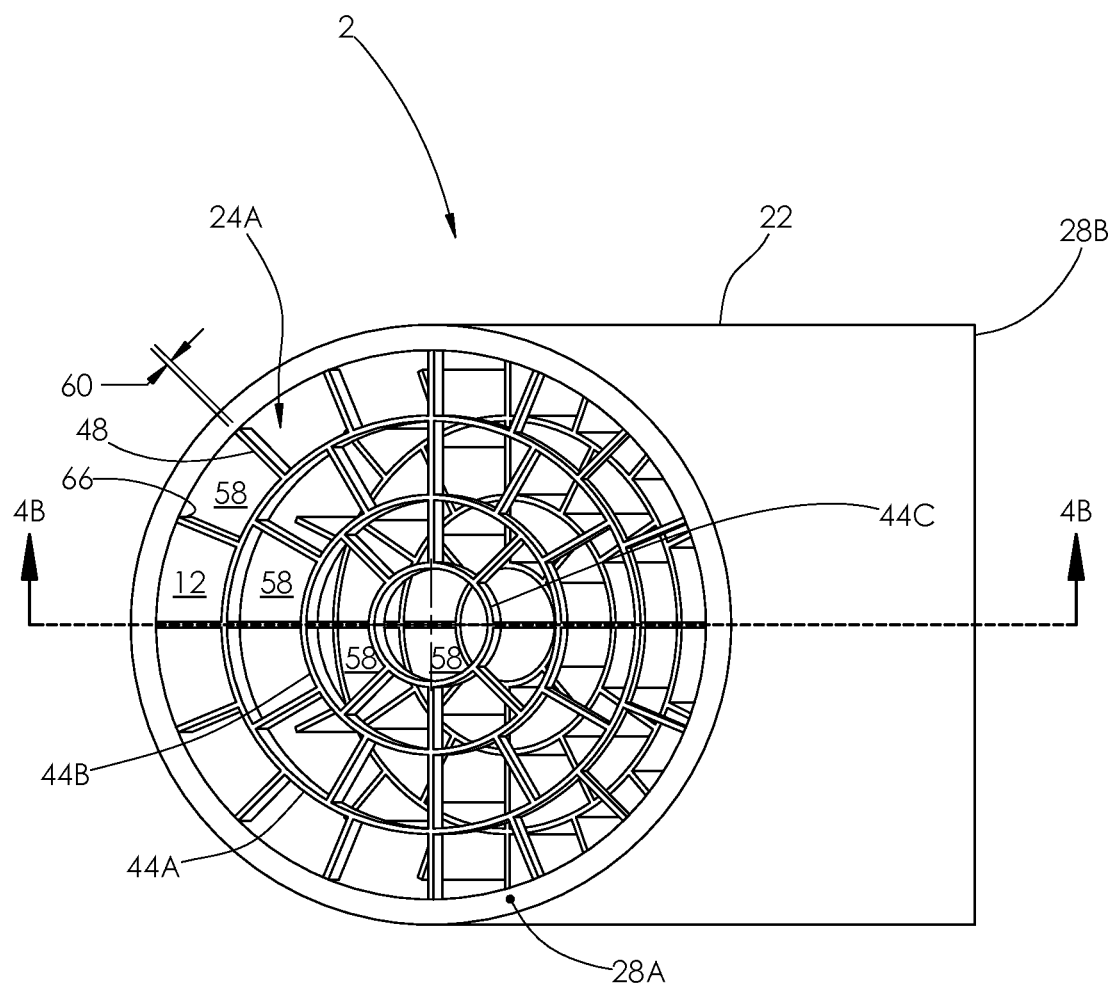
FIG. 4A is a front view of another embodiment of the integral elbow flow conditioner.
Figure 4B:
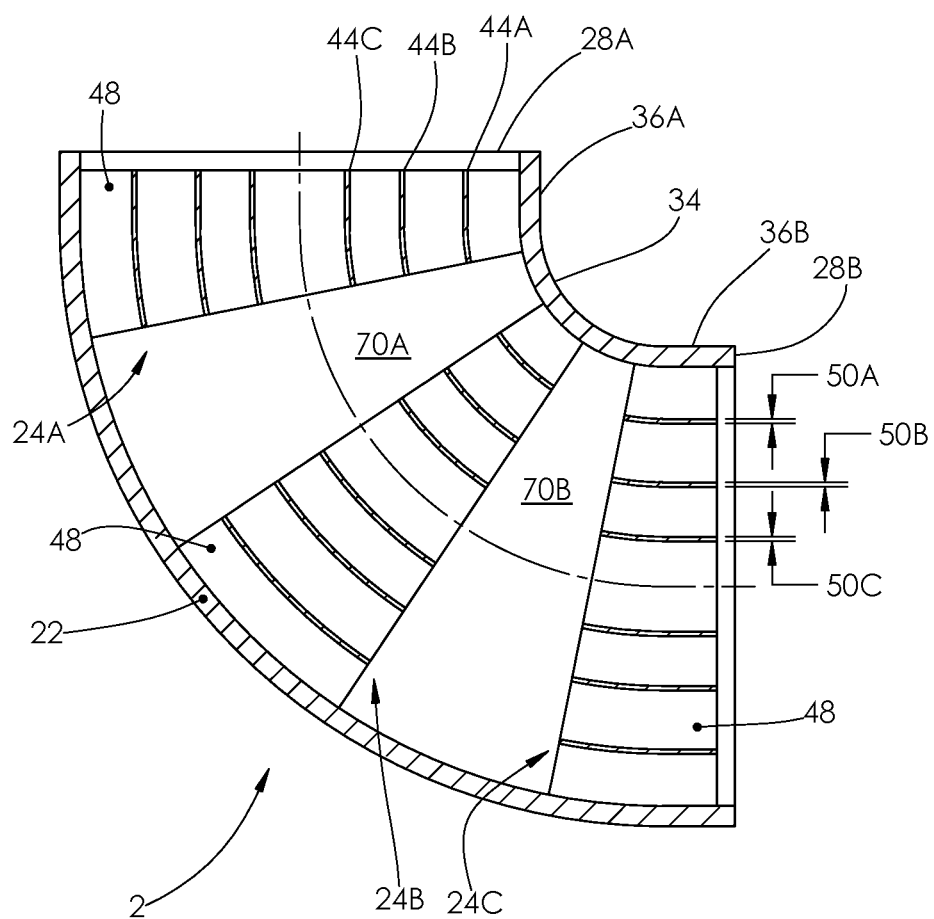
FIG. 4B is a section view taken along lines 4B-4B in FIG. 4A.

FIGS. 4A and 4B are different views of a simplified embodiment of an integral elbow flow conditioner wherein the foil shape has been omitted as a simplification.

FIG. 4A

FIG. 4A is a front view of the simplified integral elbow flow conditioner 2. The integral elbow flow conditioner 2 comprises a pipe elbow 22 and at least a first flow conditioning element 24A that is preferably contained within the pipe elbow 22. The first end surface 28A, second end surface 28B, and vane outer corners 66 are labeled for orientation purposes.

The at least one first flow conditioning element 24A comprises a plurality of vanes 48 and at least a first turning guide 44A, and in this embodiment a second turning guide 44B, and a third turning guide 44C are also incorporated.

The radial space between the first turning guide 44A, second turning guide 44B, and third turning guide 44C is subdivided into flow channels 58 by the vanes 48. There is also a flow channel 58 created by and radially inward of the third turning guide 44C. The flow channels 58 are conduits for the fluid 12.

The vanes 48 have a thickness 60. In this embodiment, the thickness 60 remains constant along the length of the vanes 48, rather than the vanes 48 having a foil shape.

FIG. 4B

FIG. 4B is a longitudinal cross-section view of the integral elbow flow conditioner 2 which represents the cutting plane 4B-4B of FIG. 4A. The first flow conditioning element 24A, second flow conditioning element 24B, and third flow conditioning element 24C, first end surface 28A and second end surface 28B are labeled for orientation purposes.

The pipe elbow 22 has a curved section 34 that is positioned in an intermediate location to the first end surface 28A and second end surface 28B. If desired, the pipe elbow 22 may also have a first straight section 36A and a second straight section 36B.

The first flow conditioning element 24A, second flow conditioning element 24B, and third flow conditioning element 24C are each composed of a first turning guide 44A, second turning guide 44B, third turning guide 44C, and vanes 48. There is a first fluid settling chamber 70A between the first flow conditioning element 24A and the second flow conditioning element 24B, and a second fluid settling chamber 70B between the second flow conditioning element 24B and the third flow conditioning element 24C.

The first turning guide 44A, second turning guide 44B, and third turning guide 44C have a first thickness 50A, second thickness 50B, and third thickness 50C, respectively. As shown, the first thickness 50A, second thickness 50B, and third thickness 50C can remain substantially constant throughout the length of the first turning guide 44A, second turning guide 44B, and third turning guide 44C.

FIG. 5

Figure 5:
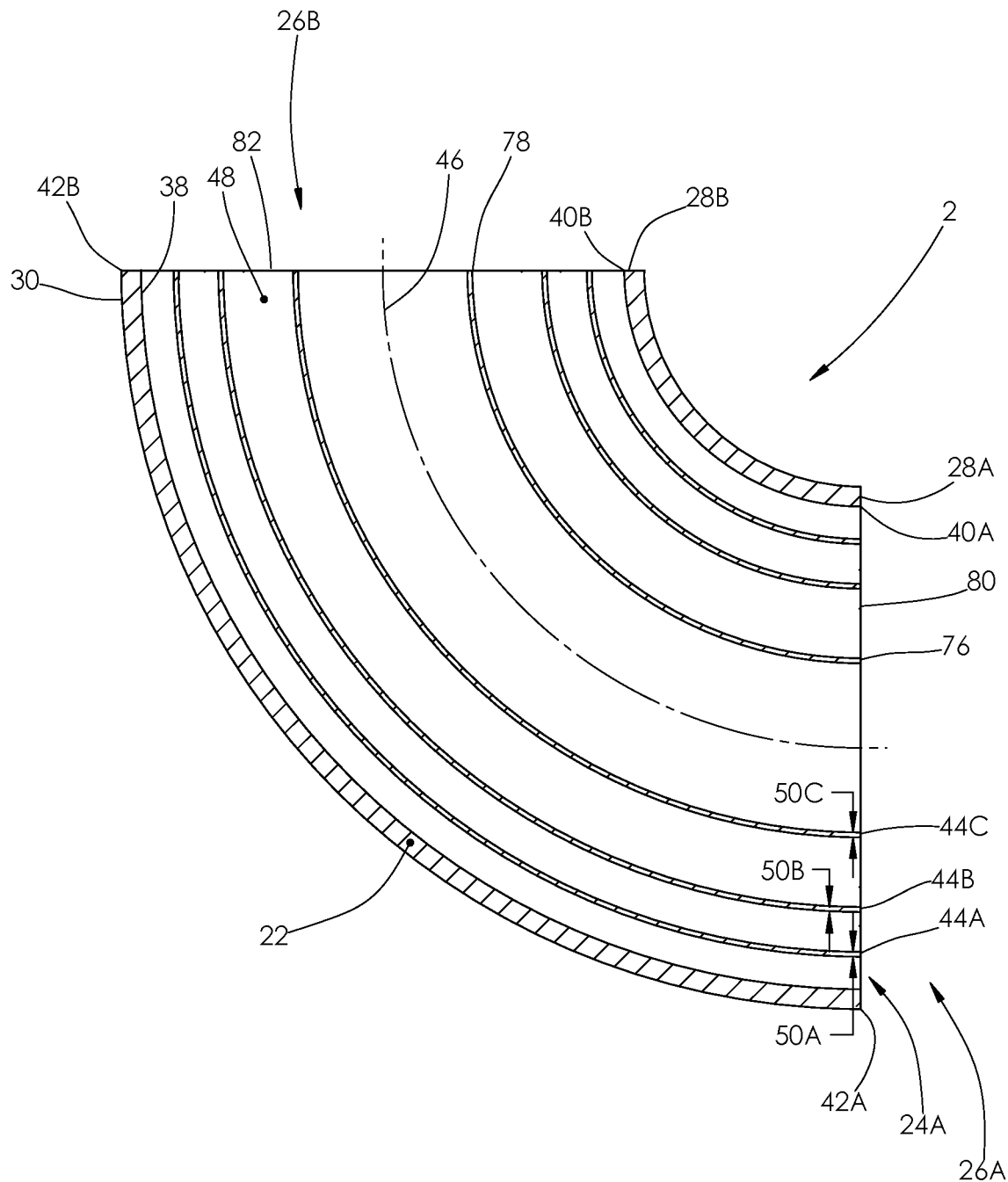
FIG. 5 is cross-sectional view of yet another embodiment of the integral elbow flow conditioner.

FIG. 5 is a longitudinal cross-section view of a simplified embodiment of an integral elbow flow conditioner 2 wherein the foil shape, the second and third flow conditioning elements, the first and second straight sections of the pipe elbow, vane vents, guide vents, and the first and second fluid settling chambers that were shown in previous figures have been omitted as a simplification. The pipe elbow 22, first flow conditioning element 24A, first opening 26A, second opening 26B, first end surface 28A, second end surface 28B, outer surface 30, inner surface 38, first inner corner 40A, second inner corner 40B, first outer corner 42A, second outer corner 42B, first turning guide 44A, second turning guide 44B, third turning guide 44C, axis 46, vanes 48, first thickness 50A, second thickness 50B, third thickness 50C, guide leading edges 76, guide trailing edges 78, vane leading edge 80, and vane trailing edge 82 are labeled for orientation purposes.

As shown, the first flow conditioning element 24A can, if desired, extend from at or near the first end surface 28A to at or near the second end surface 28B. In this embodiment, the first flow conditioning element 24A comprises a first turning guide 44A, second turning guide 44B, and third turning guide 44C, and a plurality of vanes 48. As shown, the first thickness 50A of the first turning guide 44A can, if desired, be constant throughout the length of the first turning guide 44A. As shown, the second thickness 50B of the second turning guide 44B can, if desired, be constant throughout the length of the second turning guide 44B. As shown, the third thickness 50C of the third turning guide 44C can, if desired, be constant throughout the length of the third turning guide 44C. As shown, the guide leading edges 76 and vane leading edges 80 can be even with the first end surface 28A if desired. As shown, the guide trailing edges 78 and vane trailing edges 82 can be even with the second end surface 28B if desired.

FIGS. 6-A to 6-C are different views of a simplified embodiment of a downstream flow conditioner that does not have the delayed start that was depicted in FIGS. 3A and 3B.

FIG. 6A

Figure 6B:
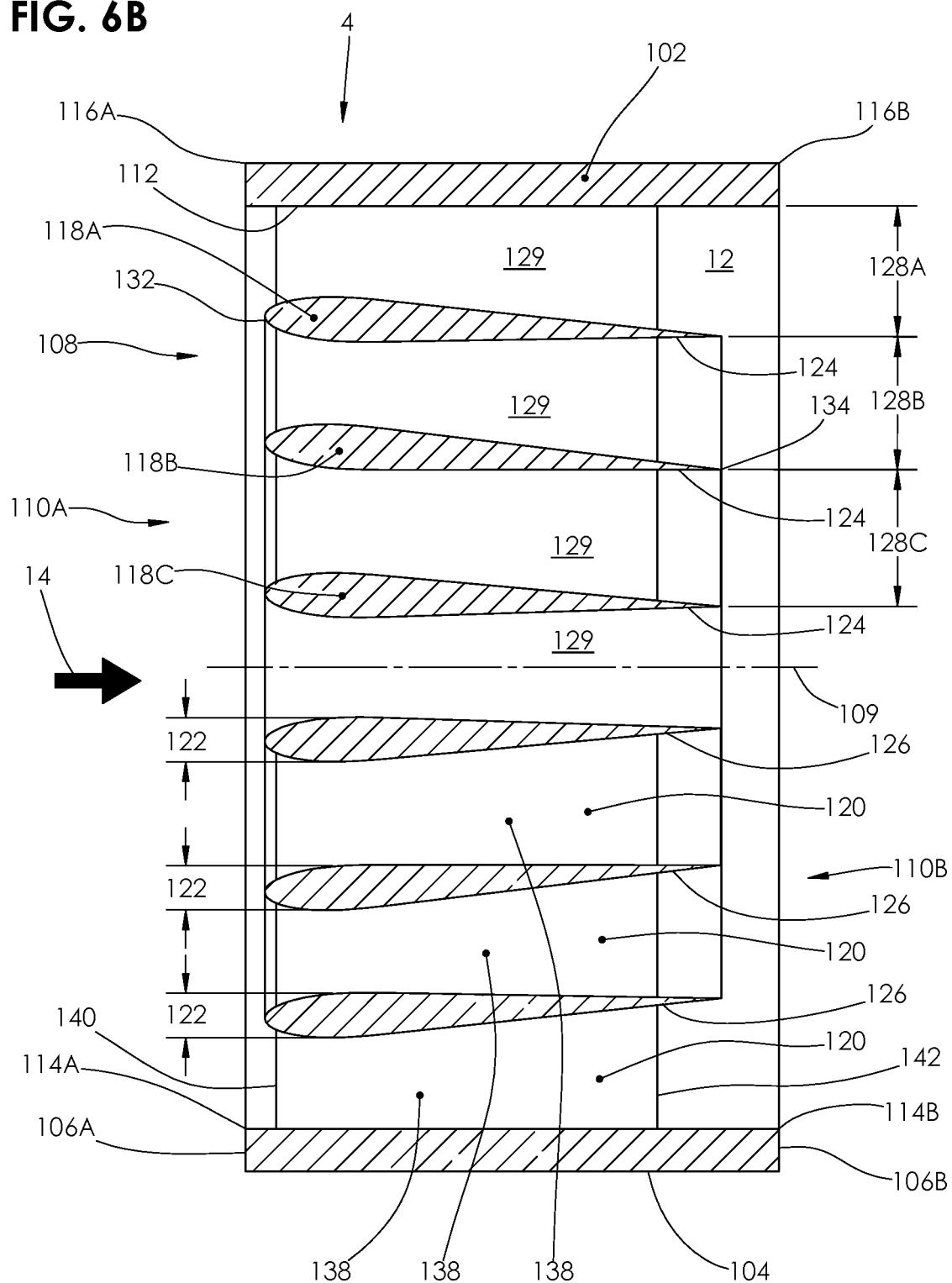
FIG. 6B is a section view taken along lines 6B-6B in FIG. 6A.
Figure 6C:
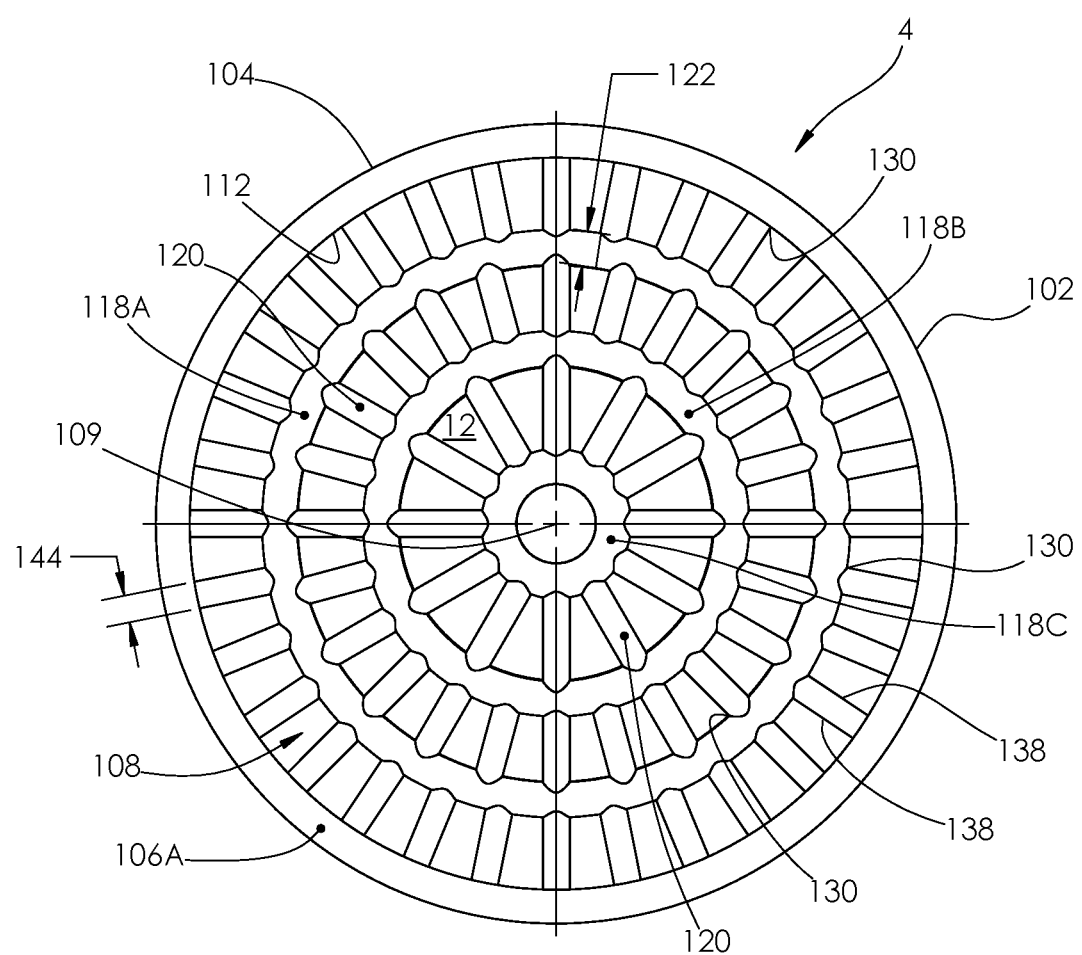
FIG. 6C is an end view taken along lines 6C-6C in FIG. 6A.

Referring now to FIG. 6A, a top view of a simplified downstream flow conditioner is shown generally at 4. FIG. 6A includes a cutting plane 6B-6B and a view plane 6C-6C. FIG. 6B represents the cross-section at cutting plane 6B-6B and FIG. 6C represents the end view at view plane 6C-6C.

The downstream flow conditioner 4 includes a pipe element 102 with an outer peripheral surface 104 that is annular and preferably cylindrical and faces generally radially outward. Preferably, the pipe element 102 has a first axial end 106A and a second axial end 106B that face in generally axial and generally opposite directions away from each other and are substantially parallel to each other.

FIG. 6B

FIG. 6B is a longitudinal cross-section view of the simplified downstream flow conditioner 4 that corresponds to cutting plane 6B-6B in FIG. 6A. The fluid 12, pipe element 102, outer peripheral surface 104, first axial end 106A, second axial end 106B, flow conditioning structure 108, pipe axis 109, first end opening 110A, second end opening 110B, inner peripheral surface 112, first inward corner 114A, second inward corner 114B, first outward corner 116A, and second outward corner 116B are labeled for orientation purposes. The first axial end 106A and second axial end 106B are preferably annular, flat, and perpendicular to the preferred flow direction 14 of the fluid 12 and may be connected to other piping elements in service.

Preferably, the outer peripheral surface 104 of the pipe element 102 faces radially outward away from the flow conditioning structure 108 and is positioned in intermediate location to and adjoins the first axial end 106A and the second axial end 106B.

Preferably, the fluid 12 enters the downstream flow conditioner 4 via the first end opening 110A and is conducted through the downstream flow conditioner 4 and exits the downstream flow conditioner 4 via the second end opening 110B.

Preferably, the flow conditioning structure 108 is positioned wholly within the pipe element 102 in intermediate location to the first axial end 106A and the second axial end 106B and in intermediate location to the first end opening 110A and the second end opening 110B. Preferably, the flow conditioning structure 108 terminates at and adjoins with or attaches to the inner peripheral surface 112.

The flow conditioning structure 108 has at least a first flow guide 118A. Also shown in this embodiment are a second flow guide 118B and a third flow guide 118C. The first flow guide 118A, second flow guide 118B, and third flow guide 118C smooth and condition the flow of the fluid 12. Although a first flow guide 118A, second flow guide 118B, and third flow guide 118C are shown, the quantity of these elements can be more or less than three to suit the size of the pipe element 102. Preferably, the flow conditioning structure 108 is recessed axially (offset axially) relative to the first axial end 106A.

The flow conditioning structure 108 also includes a plurality of support vanes 120 that position and support the first flow guide 118A, second flow guide 118B, and third flow guide 118C. Some of the support vanes 120 are located radially between and adjoin with or attach to the pipe element 102 and the first flow guide 118A and locate, bear the weight of, and resist the hydraulic forces acting on, the first flow guide 118A, second flow guide 118B, and third flow guide 118C. Some of the support vanes 120 are located radially between and adjoin with or attach to the first flow guide 118A and the second flow guide 118B and locate, bear the weight of, and resist the hydraulic forces acting on, the second flow guide 118B and the third flow guide 118C. Some of the support vanes 120 are located radially between and adjoin with or attach to the second flow guide 118B and the third flow guide 118C and locate, bear the weight of, and resist the hydraulic forces acting on, the third flow guide 118C.

Preferably, the first flow guide 118A, second flow guide 118B, and third flow guide 118C are generally circular when viewed in transverse cross-section and have a radial thickness 122 that varies in a streamlined foil cross-sectional shape, becoming thinner (narrower, slenderer) toward the second end opening 110B and becoming wider/thicker toward the first end opening 110A.

The first flow guide 118A, second flow guide 118B, and third flow guide 118C each have a guide inner surface 124 that faces in a generally radially inward direction toward the axis 109 and radially away from the inner peripheral surface 112, and each have a guide outer surface 126 that faces in a generally radially outward direction toward the inner peripheral surface 112 of the pipe element 102 and away from the axis 109. Preferably, with each of the first flow guide 118A, second flow guide 118B and third flow guide 118C, the guide inner surface 124 and the guide outer surface 126 face generally away from one another, are generally concentric with each other, and are generally concentric with the inner peripheral surface 112 of the pipe element 102 (i.e. preferably the axes are generally collinear). Preferably, the first flow guide 118A, second flow guide 118B, and third flow guide 118C are concentric with each other and with the pipe element 102 and are wholly inside the pipe element 102. If desired, the flow guides can be located eccentric to one another to address flow conditioning requirements. Preferably, the third flow guide 118C is radially inward of, encircled by, and at least partially within the second flow guide 118B. Preferably, the second flow guide 118B is radially inward of, encircled by, and at least partially within the first flow guide 118A. Preferably, the first flow guide 118A, second flow guide 118B, and third flow guide 118C are radially inward of, encircled by, and wholly within the pipe element 102. The first flow guide 118A, second flow guide 118B, and third flow guide 118C contact and guide the fluid 12.

There is a first conditioner region 128A that is an annular region located radially between the inner peripheral surface 112 and the first flow guide 118A and preferably is generally circular. There is a second conditioner region 128B that is an annular region located radially between the first flow guide 118A and the second flow guide 118B and preferably is generally circular. There is a third conditioner region 128C that is an annular region located radially between the second flow guide 118B and the third flow guide 118C and preferably is generally circular.

Preferably, portions of the first conditioner region 128A, second conditioner region 128B, and third conditioner region 128C are subdivided into discrete flow passages 129 by the support vanes 120. Preferably, at least some of the support vanes 120 have generally the same axial orientation as the inner peripheral surface 112. The area within the guide inner surface 124 of the third flow guide 118C also serves as a flow passage 129 for the fluid 12. The flow passages 129 defined by the inner peripheral surface 112, first flow guide 118A, second flow guide 118B, third flow guide 118C and the support vanes 120 conduct and direct the fluid 12 and substantially reduce secondary flow of the fluid 12 inside the pipe element 102. Secondary flow, the creation of Dean vortices in an elbow for example, is when some of the flow velocity is no longer in the direction of the pipe axis 109.

Preferably, the support vanes 120 in the first conditioner region 128A are located and oriented generally radially between the first flow guide 118A and the inner peripheral surface 112. Preferably, the support vanes 120 in the second conditioner region 128B are located and oriented generally radially between the first flow guide 118A and the second flow guide 118B. Preferably, the support vanes 120 in the third conditioner region 128C are located and oriented generally radially between the second flow guide 118B and the third flow guide 118C.

Preferably, the pipe element 102 is located radially outward of and encircles the first flow guide 118A, second flow guide 118B, and third flow guide 118C, and the support vanes 120. Preferably, the first flow guide 118A is located radially outward of and encircles the second flow guide 118B and the third flow guide 118C. Preferably, the second flow guide 118B is located radially outward of and encircles the third flow guide 118C. Preferably, the first flow guide 118A is positioned in a radially intermediate location to the pipe element 102 and the second flow guide 118B. Preferably, the second flow guide 118B is positioned in a radially intermediate location to the first flow guide 118A and the third flow guide 118C.

Preferably, the first flow guide 118A, second flow guide 118B, and third flow guide 118C have a generally foil shaped cross-section as shown. The first flow guide 118A, second flow guide 118B, and third flow guide 118C have an upstream guide end 132 and a downstream guide end 134, with the terms "upstream" and "downstream" referencing the preferred flow direction 14 of the fluid 12. By the term "foil shaped" what is meant herein is that the upstream guide ends 132 have a rounded streamlined shape and the downstream guide ends 134 are narrower (slenderer, thinner) and more pointed. The purpose of the foil shape of the first flow guide 118A, second flow guide 118B, and third flow guide 118C is to reduce drag, turbulence, and associated noise. If desired, the first flow guide 118A, second flow guide 118B, and third flow guide 118C can be adjusted in their shape and "angle of attack" (as shown) with respect to the flow direction 14 of the fluid 12 in order to sculpt the flow by exploiting Bernoulli's principle. As shown, the first flow guide 118A, second flow guide 118B, and third flow guide 118C can be slightly conical if desired. For example, if desired the upstream guide end 132 of the first flow guide 118A can be closer than the downstream guide end 134 of the first flow guide 118A to the pipe element 102; the upstream guide end 132 of the second flow guide 118B can be closer than the downstream guide end 134 of the second flow guide 118B to the pipe element 102; and the upstream guide end 132 of the third flow guide 118C can be closer than the downstream guide end 134 of the third flow guide 118C to the pipe element 102.

It should be understood that, as simplifications, the cross-sectional shapes of the first flow guide 118A, second flow guide 118B, and third flow guide 118C can be something other than a foil shape. For example, as a simplification, the guide inner surface 124 and guide outer surface 126 of the first flow guide 118A, second flow guide 118B, and third flow guide 118C could be generally parallel, and the upstream guide end 132 and downstream guide end 134 could be generally flat, chamfered, or generally convex.

If desired, the first flow guide 118A, second flow guide 118B, and third flow guide 118C can be the same axial distance from the first axial end 106A of the pipe element 102, such that the upstream guide end 132 of the first flow guide 118A, second flow guide 118B, and third flow guide 118C are located substantially on the same plane.

Preferably, the axial lengths of the support vanes 120 are less than the axial lengths of the first flow guide 118A, second flow guide 118B, and third flow guide 118C, to facilitate circumferential balancing of the pressure of the fluid 12.

The support vanes 120 have a vane upstream end 140 and a vane downstream end 142. If desired, the support vanes 120 may also have a streamlined foil shape wherein the vane upstream end 140 is more rounded and a vane downstream end 142 is more pointed, as previously discussed in conjunction with FIG. 3C. It should be understood that, as simplifications, the cross-sectional shapes of the support vanes 120 can be something other than a foil shape. For example, as a simplification, the vane flank surfaces 138 of the support vanes 120 could be generally parallel, and the vane upstream end 140 and vane downstream end 142 could be generally flat, chamfered, or generally convex. Preferably, the vane flank surfaces 138 face in generally circumferential directions.

FIG. 6C

FIG. 6C is an end view of the downstream flow conditioner 4 that corresponds to the view plane 6C-6C that is shown in FIG. 6A. The fluid 12, pipe element 102, outer peripheral surface 104, first axial end 106A, flow conditioning structure 108, axis 109, inner peripheral surface 112, first flow guide 118A, second flow guide 118B, third flow guide 118C, support vanes 120, radial thickness 122, conditioner corners 130, and vane flank surfaces 138 are labeled for orientation purposes.

It should be understood that while a specific number of support vanes 120 are illustrated, such is not intended to limit the invention, which admits to the use of a quantity of support vanes 120 that are different than shown.

Each of the plurality of support vanes 120 has a vane thickness 144 in a generally circumferentially oriented direction. The vane thickness 144 of the support vanes 120 is not to achieve strength, but to cause area blockage to build a pressure gradient to redirect the flow of the fluid 12.

FIG. 7

Figure 7:
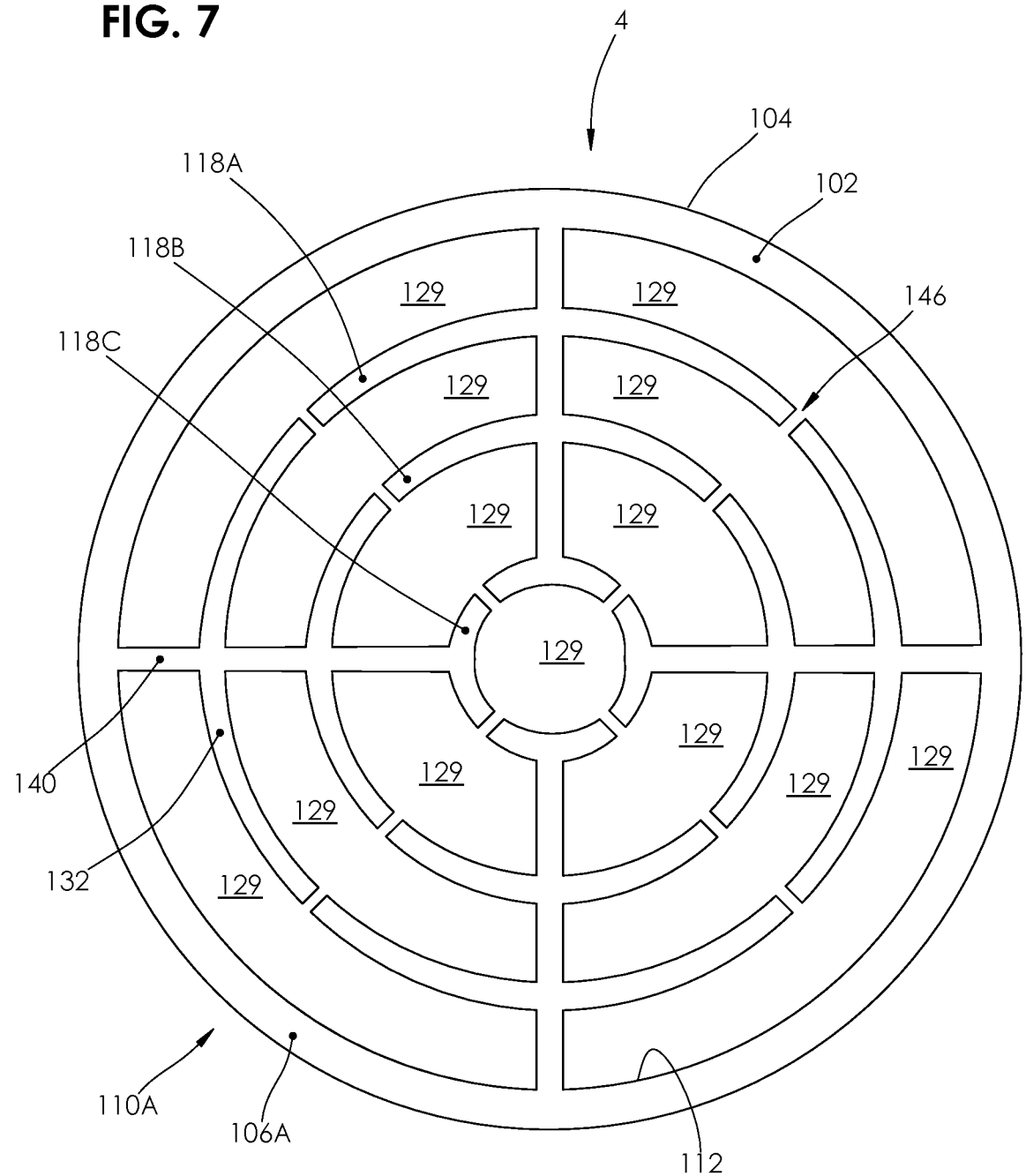
FIG. 7 is an end view of yet another embodiment of the downstream flow conditioner.

FIG. 7 is an end view of an embodiment of a downstream flow conditioner 4 that is included to show a previously described variation of the flow guide vents 146. The pipe element 102, outer peripheral surface 104, first axial end 106A, first end opening 110A, inner peripheral surface 112, first flow guide 118A, second flow guide 118B, third flow guide 118C, flow passages 129, upstream guide end 132, vane upstream end 140, and flow guide vents 146 are labeled for orientation purposes.

If desired, the flow guide vents 146 can cut/pass entirely through the axial length of the flow guides (i.e., first flow guide 118A, second flow guide 118B, third flow guide 118C) from the upstream guide end 132 to the downstream guide end. The flow guide vents 146 enable the pressure of the fluid 12 to somewhat equalize radially between adjacent flow passages 129.

FIG. 8

Figure 8:
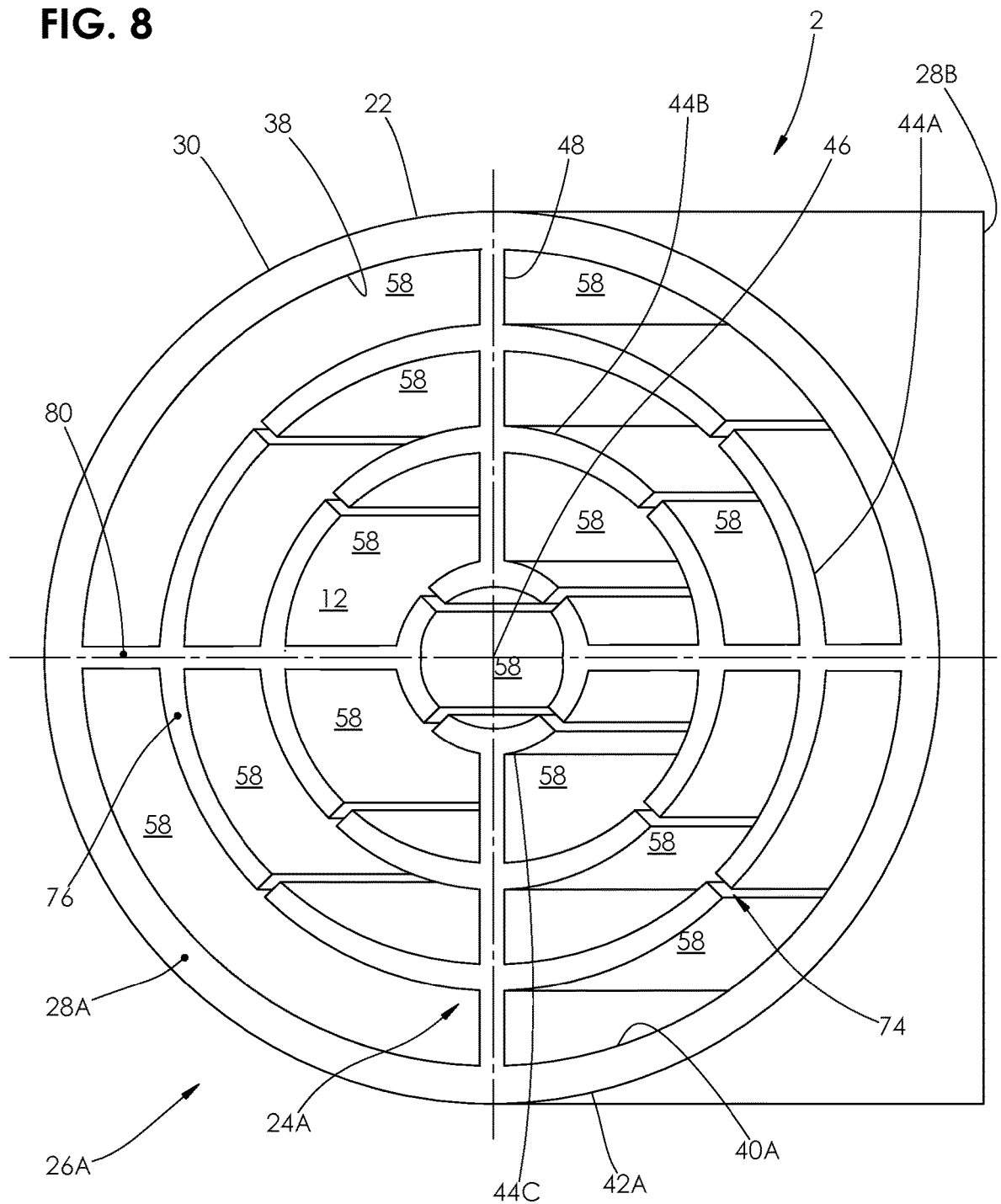
FIG. 8 is an end view of still another embodiment of the integral elbow flow conditioner.

FIG. 8 is an end view of an embodiment of an integral elbow flow conditioner 2 that is included to show a previously described variation of the guide vents 74. The pipe elbow 22, first flow conditioning element 24A, first opening 26A, first end surface 28A, second end surface 28B, outer surface 30, inner surface 38, first inner corner 40A, first outer corner 42A, first turning guide 44A, second turning guide 44B, third turning guide 44C, axis 46, vanes 48, flow channels 58, guide leading edges 76, vane leading edges 80 are labeled for orientation purposes.

If desired, the guide vents 74 can cut entirely through the length of the first turning guide 44A, second turning guide 44B, and third turning guide 44C from the guide leading edges 76 to the guide trailing edges. The guide vents 74 enable the pressure of the fluid 12 to somewhat equalize radially between adjacent flow channels 58.

FIG. 9

Figure 9:
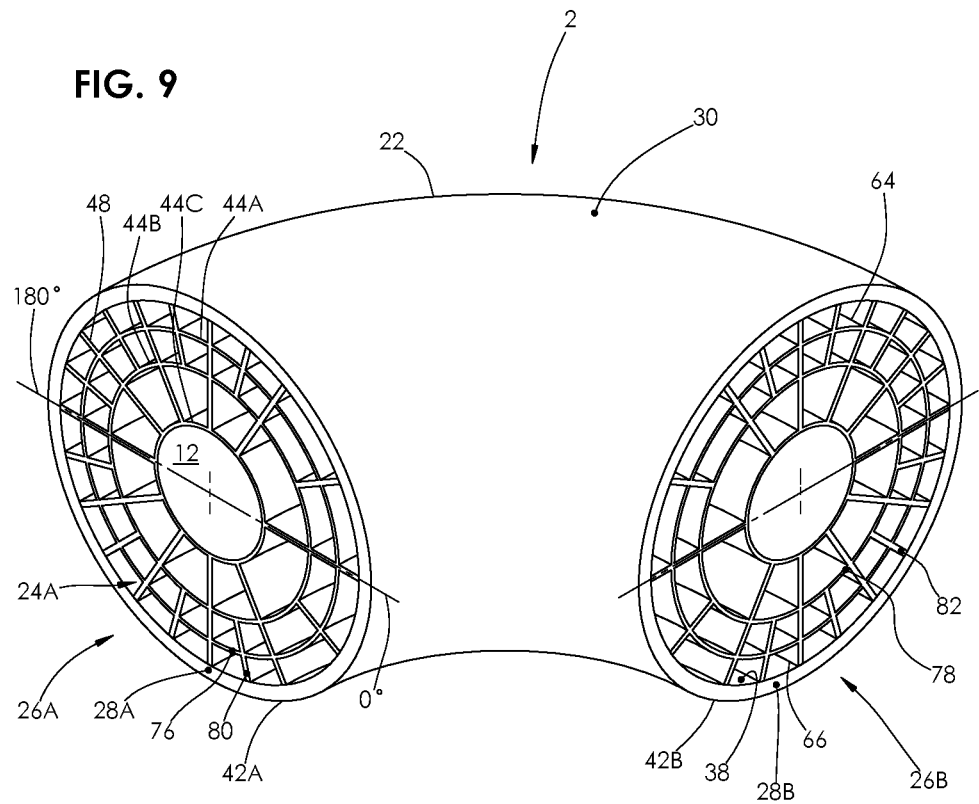
FIGS. 9, 10 and 11 are perspective views of still other embodiments of the integral elbow flow conditioner.

FIG. 9 is a perspective view of an embodiment of an integral elbow flow conditioner 2 that is included to show a previously described variation of the circumferential distribution of the vanes 48. The fluid 12, pipe elbow 22, first flow conditioning element 24A, first opening 26A, second opening 26B, first end surface 28A, second end surface 28B, outer surface 30, inner surface 38, first outer corner 42A, second outer corner 42B, first turning guide 44A, second turning guide 44B, third turning guide 44C, vane inner corners 64, vane outer corners 66, guide leading edges 76, guide trailing edges 78, vane leading edges 80, and vane trailing edge 82 are labeled for orientation purposes.

Preferably, the inner surface 38 extends from the first opening 26A to the second opening 26B. Preferably, the inner surface 38 turns/curves in at least one direction and forms at least a portion of a curved fluid passageway extending from the first opening 26A to the second opening 26B. Preferably, the first turning guide 44A, second turning guide 44B, third turning guide 44C, and vanes 48 turn/curve in generally the same at least one direction as the inner surface 38.

If desired, the radial distance between the inner surface 38 and the first turning guide 44A can be less than the radial distance between the first turning guide 44A and the second turning guide 44B. If desired, the radial distance between the first turning guide 44A and the second turning guide 44B can be less than the radial distance between the second turning guide 44B and the third turning guide 44C.

The vane inner corners 64 of the vanes 48 have a curved length that extends from the vane leading edge 80 to the vane trailing edge 82. Because of the bend in the turning guides (i.e., first turning guide 44A, second turning guide 44B, third turning guide 44C), the curved length of the vane inner corners 64 varies depending on the location of the vane inner corners 64 on a particular turning guide.

For the purpose of improved understanding, the first opening 26A has been assigned a 0-degree location and a 180-degree location. The curved length of the vane inner corners 64 that are nearer to the 180-degree location are longer than the curved length of the vane inner corners 64 that are nearer to the 0-degree location. The closer the vane inner corners 64 are to the 180-degree location, the longer their curved length. The closer the vane inner corners 64 are to the 0-degree location, the shorter their curved length.

With the vanes 48 that are located radially between the inner surface 38 and the first turning guide 44A, the circumferential spacing distance between some of the vanes 48 with a longer curved length is less than the circumferential spacing distance between some of the vanes with a shorter curved length. In other words, some of the vanes nearer the 180-degree location are spaced closer together than some of the vanes nearer the 0-degree location.

With the vanes 48 that are located radially between the first turning guide 44A and the second turning guide 44B, the circumferential spacing distance between some of the vanes 48 with a longer curved length is less than the circumferential spacing distance between some of the vanes with a shorter curved length. In other words, some of the vanes nearer the 180-degree location are spaced closer together than some of the vanes nearer the 0-degree location.

With the vanes 48 that are located radially between the second turning guide 44B and the third turning guide 44C, the circumferential spacing distance between some of the vanes 48 with a longer curved length is less than the circumferential spacing distance between some of the vanes with a shorter curved length. This uneven distribution of the vanes 48 beneficially increases flow resistance to the fluid 12 near the 180-degree location. In other words, some of the vanes nearer the 180-degree location are spaced closer together than some of the vanes nearer the 0-degree location.

One other way to describe the uneven distribution of the vanes follows. Junctures between the vanes 48 and a specific turning guide (i.e., first turning guide 44A, second turning guide 44B, or third turning guide 44C) form vane inner corners 64 that are inside corners and have a curved length that extends from the vane leading edge 80 to the vane trailing edge 82, and at least some vanes 48 with vane inner corners 64 having a longer curved length are spaced closer together than at least some vanes 48 that have vane inner corners 64 which have a shorter curved length.

One other way to describe the uneven distribution of the vanes follows. The vane leading edge 80 and the vane trailing edge 82 of each of the vanes 48 that locate a specific turning guide (i.e., first turning guide 44A, second turning guide 44B, or third turning guide 44C) are separated by a straight line distance, at least some of the vanes 48 having a longer straight line distance separating the vane leading edge 80 of a vane 48 from its vane trailing edge 82 compared to other of the vanes 48 having a shorter straight line distance between the vane leading edge 80 and the vane trailing edge 82, and at least some of the vanes having the longer straight line distance separating the vane leading edge 80 from the vane trailing edge 82 are spaced closer together than some of the vanes 48 having the shorter straight line distance between the vane leading edge 80 and the vane trailing edge 82.

With automobile racetracks, it is common to use the language "inside of the turn" and "outside of the turn". Adopting this language to reference locations on the turn of the inner surface 38, the 0-degree location would represent the inside of the turn of the inner surface 38 and the 180-degree location would represent the outside of the turn of the inner surface 38. Using this terminology, some of the vanes 48 nearer the outside of the turn of the inner surface 38 are spaced closer together than some of the vanes 48 nearer the inside of the turn of the inner surface 38.

FIG. 10

Figure 10:
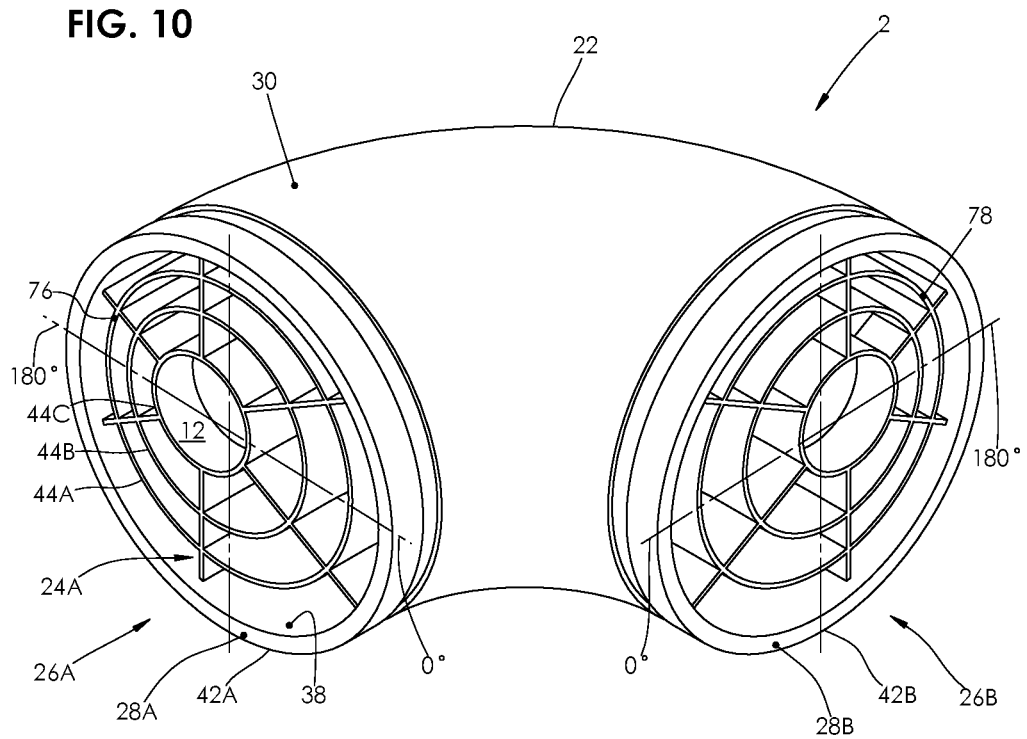

FIG. 10 is a perspective view of an embodiment of an integral elbow flow conditioner 2 that is included to show a previously described variation in the location of the turning guides. The pipe elbow 22, first flow conditioning element 24A, first opening 26A, second opening 26B, first end surface 28A, second end surface 28B, outer surface 30, inner surface 38, first outer corner 42A, second outer corner 42B, first turning guide 44A, second turning guide 44B, third turning guide 44C, guide leading edges 76, and guide trailing edges 78 are labeled for orientation purposes.

The inner surface 38 turns/curves in at least one direction and forms at least a portion of a curved fluid passageway extending from the first opening 26A to the second opening 26B. For the purpose of improved understanding, the first opening 26A and second opening 26B have each been assigned a 0-degree location and a 180-degree location. The 0-degree location represents the inside of the turn of the inner surface 38 and the 180-degree location represents the outside of the turn of the inner surface 38.

As can be seen in the illustration, the first turning guide 44A, second turning guide 44B, and third turning guide 44C are not concentric with the inner surface 38 of the pipe elbow 22. Instead, the first turning guide 44A, second turning guide 44B, and third turning guide 44C are eccentric with the inner surface 38 of the pipe elbow 22, and biased toward the 180-degree location. In other words, the first turning guide 44A, second turning guide 44B, and third turning guide 44C are biased toward the outside of the turn of the inner surface 38.

The radial space between the first turning guide 44A and the inner surface 38 of the pipe elbow 22 at the 180-degree location is less than the radial space between the first turning guide 44A and the inner surface 38 at the 0-degree location. The radial space between the first turning guide 44A and the second turning guide 44B at the 180-degree location is less than the radial space between the first turning guide 44A and the second turning guide 44B at the 0-degree location. The radial space between the second turning guide 44B and the third turning guide 44C at the 180-degree location is less than the radial space between the second turning guide 44B and the third turning guide 44C at the 0-degree location. This eccentric distribution of the turning guides 44A-C beneficially increases flow resistance to the fluid 12 near the 180-degree location. This is beneficial because it causes a better flow balance across a plane normal to the axis of the elbow 22.

FIG. 11

Figure 11:
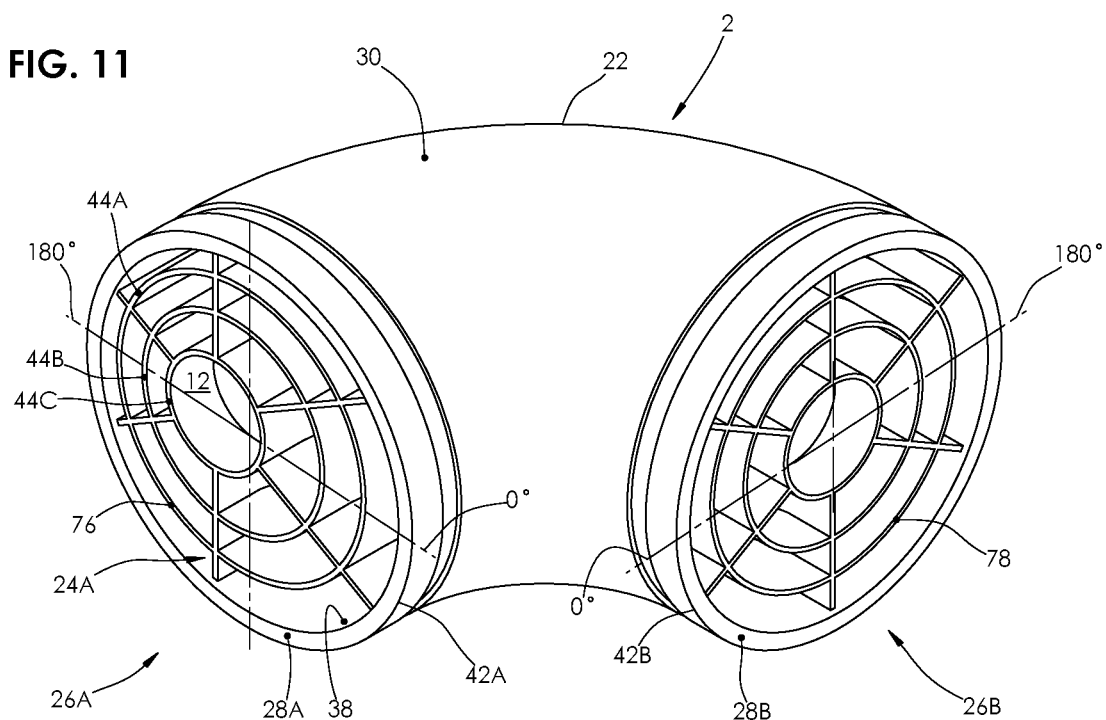

FIG. 11 is a perspective view of an embodiment of an integral elbow flow conditioner 2 that is included to show a previously described variation in the location of the turning guides. The pipe elbow 22, first flow conditioning element 24A, first opening 26A, second opening 26B, first end surface 28A, second end surface 28B, outer surface 30, inner surface 38, first outer corner 42A, second outer corner 42B, first turning guide 44A, second turning guide 44B, third turning guide 44C, guide leading edges 76, and guide trailing edges 78 are labeled for orientation purposes.

The inner surface 38 turns/curves in at least one direction and forms at least a portion of a curved fluid passageway extending from the first opening 26A to the second opening 26B. For the purpose of improved understanding, the first opening 26A and second opening 26B have each been assigned a 0-degree location and a 180-degree location. The 0-degree location represents the inside of the turn of the inner surface 38 and the 180-degree location represents the outside of the turn of the inner surface 38.

As can be seen in the illustration, the first turning guide 44A, second turning guide 44B, and third turning guide 44C are eccentric with the inner surface 38 of the pipe elbow 22 at the first opening 26A (being biased toward the 180-degree location; i.e., biased toward the outside of the turn of the inner surface 38), and are substantially concentric with the inner surface 38 of the pipe elbow 2 at the second opening 26B.

At the first opening 26A, the radial space between the first turning guide 44A and the inner surface 38 of the pipe elbow 22 at the 180-degree location is less than the radial space between the first turning guide 44A and the inner surface 38 at the 0-degree location. At the first opening 26A, the radial space between the first turning guide 44A and the second turning guide 44B at the 180-degree location is less than the radial space between the first turning guide 44A and the second turning guide 44B at the 0-degree location. At the first opening 26A, the radial space between the second turning guide 44B and the third turning guide 44C at the 180-degree location is less than the radial space between the second turning guide 44 and the third turning guide 44C at the 0-degree location. This eccentric distribution of the turning guides at the first opening 26A beneficially increases flow resistance to the fluid 12 near the 180-degree location.

Another way of describing FIG. 11 is that the first turning guide 44A has a guide leading edge 76 and a guide trailing edge 78 and the guide leading edge 76 is eccentric to the inner surface 38 of the pipe elbow 22 and the guide trailing edge 78 is less eccentric or substantially concentric to the inner surface 38 of the pipe elbow 22.

NOMENCLATURE LIST flow conditioning assembly 1
downstream flow conditioner 4
pipe section 6
downstream flow conditioner 8
pipe section 10
fluid 12 flow direction 14
upstream piping component 18
downstream piping component 20
pipe elbow 22
first flow conditioning element 24A
second flow conditioning element 24B
third flow conditioning element 24C
first opening 26A
second opening 26B
first end surface 28A
second end surface 28B
outer surface 30
curved section 34
first straight section 36A
second straight section 36B
inner surface 38
first inner corner 40A
second inner corner 40B
first outer corner 42A
second outer corner 42B
first turning guide 44A
second turning guide 44B
third turning guide 44C
axis 46
vanes 48
first thickness 50A
second thickness 50B
third thickness 50C
inner guide surface 52
outer guide surface 54
first radial space 56A
second radial space 56B
flow channels 58
thickness 60
first thickness 60A
second thickness 60B
third thickness 60C
side surfaces 62
vane inner corners 64
vane outer corners 66
first location 68A
second location 68B
third location 68C
first fluid settling chamber 70A
second fluid settling chamber 70B
vane vents 72
guide vents 74
guide leading edges 76
guide trailing edges 78
vane leading edge 80
vane trailing edge 82
pipe element 102
outer peripheral surface 104
first axial end 106A
second axial end 106B
flow conditioning structure 108
axis 109
first end opening 110A
second end opening 110B
inner peripheral surface 112
first inward corner 114A
second inward corner 114B
first flow guide 118A
second flow guide 118B
third flow guide 118C
support vanes 120
radial thickness 122
guide inner surface 124
guide outer surface 126
first conditioner region 128A
second conditioner region 128B
third conditioner region 128C
flow passages 129
conditioner corners 130
upstream guide end 132
downstream guide end 134
guide offset dimension 136A
guide offset dimension 136B
vane flank surfaces 138
vane upstream end 140
vane downstream end 142
vane thickness 144
flow guide vents 146

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A flow conditioning assembly (1), comprising:
an integral elbow flow conditioner (2) comprising:
a) a pipe elbow (22) for conducting and turning the flow of a fluid, said pipe elbow (22) being an annular conduit having a first opening (26A) and a second opening (26B) and defining a radially inwardly-facing inner surface (38) in intermediate location to said first opening (26A) and said second opening (26B), said radially inwardly-facing inner surface (38) turning in at least one direction and forming at least a portion of a curved fluid passageway extending through said pipe elbow (22);
b) at least a first flow conditioning element (24A) comprising:
1) a first turning guide (44A) of generally circular form when viewed in transverse cross-section and located at least partially within said pipe elbow (22) and radially spaced from said pipe elbow (22) by a radial space, said first turning guide (44A) having a guide leading edge (76) and a guide trailing edge (78), said guide leading edge (76)

being closer than said guide trailing edge (78) to said first opening (26A), said first turning guide (44A) turning in generally the same at least one direction as said inner surface (38) of said pipe elbow (22);

2) a second turning guide (44B) of generally circular form when viewed in transverse cross-section and located at least partially within said first turning guide (44A), said second turning guide (44B) radially spaced from said first turning guide (44A) by a radial space, said second turning guide (44B) turning in generally the same at least one direction as said inner surface (38); and 3) a plurality of vanes (48) comprising a first plurality of vanes and a second plurality of vanes, wherein:

i) said first plurality of vanes (48) situated at least partially within said radial space between said pipe elbow (22) and said first turning guide (44A) and locating said first turning guide (44A) relative to said pipe elbow (22), said first plurality of vanes (48) having a vane leading edge (80) and a vane trailing edge (82), said vane leading edge (80) being closer than said vane trailing edge (82) to said first opening (26A) and said vane trailing edge (82) being closer than said vane leading edge (80) to said second opening (26B), said first plurality of vanes (48) circumferentially spaced from each other and circumferentially distributed around said first turning guide (44A), said first plurality of vanes (48) dividing said radial space between said pipe elbow (22) and said first turning guide (44A) into a plurality of flow channels (58) that turn in generally the same at least one direction as said inner surface (38); and ii) said second plurality of vanes (48) situated at least partially within said radial space between said first turning guide (44A) and said second turning guide (44B) and locating said second turning guide (44B), said second plurality of vanes (48) circumferentially spaced from each other and circumferentially distributed around said second turning guide (44B), said second plurality of vanes (48) dividing said radial space between said first turning guide (44A) and said second turning guide (44B) into a plurality of flow channels (58) that turn in generally the same at least one direction as said inner surface (38); and at least one downstream flow conditioner (4), comprising:

a) a pipe element (102) for conducting the flow of the fluid, being an annular conduit having a first axial end (106A) and a second axial end (106B) and defining a radially inwardly-facing inner peripheral surface (112) forming at least a portion of an axially-oriented fluid passageway extending generally axially through said pipe element (102) from a first end opening (110A) to a second end opening (110B), said first axial end (106A) facing generally toward said second opening (26B) of said pipe elbow (22) and said second axial end (106B) facing away from said second opening (26B) of said pipe elbow (22) and facing away from said first axial end (106A);

b) a first flow guide (118A) of generally circular form when viewed in transverse cross-section and located at least partially within said pipe element (102) and radially spaced from said pipe element (102) by a radial space, c) a second flow guide (118B) of generally circular form when viewed in transverse cross-section and located at least partially within said first flow guide (118A), said second flow guide (118B) radially spaced from said first flow guide (118A) by a radial space, wherein each of said first and second flow guides (118A, 118B) having an upstream guide end (132) and a downstream guide end (134), said upstream guide end (132) being closer than said downstream guide end (134) to said first axial end (106A) and said downstream guide end (134) being closer than said upstream guide end (132) to said second axial end (106B), said first and second flow guides (118A, 118B) having generally the same axial orientation as said inner peripheral surface (112) of said pipe element (102);

d) a plurality of support vanes (120) comprising a first plurality of support vanes and a second plurality of support vanes, wherein i) said first plurality of support vanes (120) situated at least partially within said radial space between said pipe element (102) and said first flow guide (118A) and locating said first flow guide (118A) relative to said pipe element (102), said first plurality of support vanes (120) circumferentially spaced from each other and circumferentially distributed around said first flow guide (118A), said first plurality of support vanes (120) having a vane upstream end (140) and a vane downstream end (142), said vane upstream end (140) being closer than said vane downstream end (142) to said first axial end (106A) and said vane downstream end (142) being closer than said vane upstream end (140) to said second axial end (106B); and ii) said second plurality of support vanes (120) situated at least partially within said radial space between said first flow guide (118A) and said second flow guide (118B) and locating said second flow guide (118B), said second plurality of support vanes (120) circumferentially spaced from each other and circumferentially distributed around said second flow guide (118B).

2. The flow conditioning assembly (1) of claim 1, wherein said at least a first flow conditioning element (24A) further comprising:

a third turning guide (44C) of generally circular form when viewed in transverse cross-section located at least partially within said second turning guide (44B) and radially spaced from said second turning guide (44B) by a radial space, said third turning guide (44C) turning in generally the same at least one direction as said inner surface (38), and said plurality of vanes (48) comprising a third plurality of vanes situated at least partially within said radial space between said second turning guide (44B) and said third turning guide (44C) and locating said third turning guide (44C), said third plurality of vanes (48) circumferentially spaced from each other and circumferentially distributed around said third turning guide (44C), said third plurality of vanes (48) dividing said radial space between said second turning guide (44B) and said third turning guide (44C) into a plurality of flow channels (58) that turn in generally the same at least one direction as said inner surface (38).

3. The flow conditioning assembly (1) of claim 2, wherein said third turning guide (44C) has an inner guide surface (52) facing generally radially-inward and turning in generally the same at least one direction as said inner surface (38).

4. The flow conditioning assembly (1) of claim 1, wherein said first turning guide (44A) has a foil shape.

5. The flow conditioning assembly (1) of claim 1, wherein said guide leading edge (76) of said first turning guide (44A) is more rounded than said guide trailing edge (78) of said first turning guide (44A).

6. The flow conditioning assembly (1) of claim 1, wherein said guide trailing edge (78) of said first turning guide (44A) is more pointed than said guide leading edge (76) of said first turning guide (44A).

7. The flow conditioning assembly (1) of claim 1, wherein said plurality of vanes (48) have a foil shape.

8. The flow conditioning assembly (1) of claim 1, wherein said vane leading edge (80) of said first plurality of vanes (48) is thicker than said vane trailing edge (82) of said first plurality of vanes (48).

9. The flow conditioning assembly (1) of claim 1, wherein said vane trailing edge (82) of said first plurality of vanes (48) is thinner than said vane leading edge (80) of said first plurality of vanes (48).

10. The flow conditioning assembly (1) of claim 1, wherein at least some of said plurality of vanes (48) turn in generally the same at least one direction as said inner surface (38).

11. The flow conditioning assembly (1) of claim 1, wherein said first turning guide (44A) has an inner guide surface (52) facing generally radially-inward away from said pipe elbow (22) and has an outer guide surface (54) facing generally radially-outward toward said pipe elbow (22), and said first turning guide (44A) has at least one guide vent (74) forming a passage in said first turning guide (44A) passing in a generally radial direction through said first turning guide (44A) from said inner guide surface (52) to said outer guide surface (54).

12. The flow conditioning assembly (1) of claim 1, further comprising at least one guide vent (74) formed through said first turning guide (44A) from said guide leading edge (76) to said guide trailing edge (78) of said first turning guide (44A).

13. The flow conditioning assembly (1) of claim 1, wherein at least one of said plurality of vanes (48) having at least one vane vent (72) forming a hole passing in a generally circumferential direction through said at least one of said plurality of vanes (48).

14. The flow conditioning assembly (1) of claim 1, wherein said first flow guide (118A) has a foil shape when viewed in longitudinal cross-section, said downstream guide end (134) of said first flow guide (118A) being thinner than said upstream guide end (132) of said first flow guide (118A).

15. The flow conditioning assembly (1) of claim 1, wherein said second flow guide (118B) has a foil shape when viewed in longitudinal cross-section, said downstream guide end (134) of said second flow guide (118B) being more pointed than said upstream guide end (132) of said second flow guide (118B).

16. The flow conditioning assembly (1) of claim 1, wherein at least some of said plurality of support vanes (120) have a foil shape.

17. The flow conditioning assembly (1) of claim 1, wherein said vane upstream end (140) of at least one of said plurality of support vanes (120) is thicker than said vane downstream end (142).

18. The flow conditioning assembly (1) of claim 1, wherein said vane downstream end (142) of at least one of said plurality of support vanes (120) is thinner than said vane upstream end (140).

19. The flow conditioning assembly (1) of claim 1, wherein said downstream flow conditioner further comprises a third flow guide (118C) of generally circular form when viewed in transverse cross-section, said third flow guide (118C) located at least partially within said second flow guide (118B) and radially spaced from said second flow guide (118B) by a radial space, said third flow guide (118C) having generally the same axial orientation as said inner peripheral surface (112) and having an upstream guide end (132) and a downstream guide end (134), said upstream guide end (132) of said third flow guide (118C) being closer than said downstream guide end (134) of said third flow guide (118C) to said first axial end (106A), and said downstream guide end (134) of said third flow guide (118C) being thinner than said upstream guide end (132) of said third flow guide (118C).

20. The flow conditioning assembly (1) of claim 19, wherein said third flow guide (118C) has a guide inner surface (124) facing generally radially inward and has generally the same axial orientation as said inner peripheral surface (112).

21. The flow conditioning assembly (1) of claim 1, wherein said first flow guide (118A) and said second flow guide (118B) are generally conical.

22. The flow conditioning assembly (1) of claim 1, wherein said upstream guide end (132) of said first flow guide (118A) is closer than said downstream guide end (134) of said first flow guide (118A) to said pipe element (102).

23. The flow conditioning assembly (1) of claim 1, wherein said upstream guide end (132) of said second flow guide (118B) is closer than said downstream guide end (134) of said second flow guide (118B) to said pipe element (102).

24. The flow conditioning assembly (1) of claim 1, wherein at least some of said plurality of support vanes (120) have generally the same axial orientation as said inner peripheral surface (112).

25. The flow conditioning assembly (1) of claim 1, wherein said first flow guide (118A) has a guide inner surface (124) facing generally radially inward and has a guide outer surface (126) facing generally radially outward, said first flow guide (118A) has at least one flow guide vent (146) forming a passage in said first flow guide (118A) passing in a generally radial direction through said first flow guide (118A) from said guide outer surface (126) to said guide inner surface (124).

26. The flow conditioning assembly (1) of claim 25, wherein said first flow guide (118A) has an axial length between said upstream guide end (132) and said downstream guide end (134), and said at least one flow guide vent (146) forms a passage in a generally axial direction through said first flow guide (118A) from said upstream guide end (132) to said downstream guide end (134).

27. The flow conditioning assembly (1) of claim 1, wherein said upstream guide end (132) of said first flow guide (118A) is axially offset from said upstream guide end (132) of said second flow guide (118B), and said upstream guide end (132) of said second flow guide (118B) is more recessed than said upstream guide end (132) of said first flow guide (118A) relative to said first axial end (106A).

28. The flow conditioning assembly (1) of claim 1, wherein:
said first plurality of support vanes (120) locating said first flow guide (118A) have an axial length between said vane upstream end (140) and said vane downstream end (142); and
said first flow guide (118A) has an axial length between said upstream guide end (132) and said downstream guide end (134), said axial length of said first flow guide (118A) is longer than said axial length of said first plurality of support vanes (120).

29. The flow conditioning assembly (1) of claim 1, wherein said first turning guide (44A) and said second turning guide (44B) are substantially concentric to said inner surface (38) of said pipe elbow (22).

30. The flow conditioning assembly (1) of claim 1, wherein said first turning guide (44A) is eccentric to said inner surface (38) of said pipe elbow (22).

31. The flow conditioning assembly (1) of claim 1, wherein said guide leading edge (76) of said first turning guide (44A) is eccentric to said inner surface (38) of said pipe elbow (22) and said guide trailing edge (78) of said first turning guide (44A) is less eccentric to said inner surface (38) of said pipe elbow (22).

32. The flow conditioning assembly (1) of claim 1, wherein said guide leading edge (76) of said first turning guide (44A) is eccentric to said inner surface (38) of said pipe elbow (22) and said guide trailing edge (78) of said first turning guide (44A) is substantially concentric to said inner surface (38) of said pipe elbow (22).

33. The flow conditioning assembly (1) of claim 1, wherein junctures between said first plurality of vanes (48) and said first turning guide (44A) form vane inner corners (64) that are inside corners and have a curved length that extends from said vane leading edge (80) to said vane trailing edge (82), and at least some of said first plurality of vanes (48) with said vane inner corners (64) have a longer curved length being spaced closer together than at least some of said first plurality of vanes (48) with said vane inner corners (64) having a shorter curved length.

34. The flow conditioning assembly (1) of claim 1, wherein said vane leading edge (80) and said vane trailing edge (82) of each of said first plurality of vanes (48) locating said first turning guide (44A) are separated by a straight line distance, at least some of said first plurality of vanes (48) having a longer straight line distance separating said vane leading edge (80) from said vane trailing edge (82) compared to other of said first plurality of vanes (48) having a shorter straight line distance between said vane leading edge (80) and said vane trailing edge (82), and at least some of said first plurality of vanes having said longer straight line distance separating said vane leading edge (80) from said vane trailing edge (82) are spaced closer together than some of said first plurality of vanes (48) having said shorter straight line distance between said vane leading edge (80) and said vane trailing edge (82).

35. The flow conditioning assembly (1) of claim 1, wherein said integral elbow flow conditioner (2) further comprises:
a second flow conditioning element (24B) located at least partially within said pipe elbow (22) and comprising:
1) a first turning guide (44A) of generally circular form when viewed in transverse cross-section, located at least partially within said pipe elbow (22), radially spaced from said pipe elbow (22), and turning in generally the same at least one direction as said inner surface (38) of said pipe elbow (22);
2) a second turning guide (44B) of generally circular form when viewed in transverse cross-section, located at least partially within and radially spaced from said first turning guide (44A) of said second flow conditioning element (24B), and turning in generally the same at least one direction as said inner surface (38);
3) a plurality of vanes (48) of said second flow conditioning element (24B) comprising a first plurality of vanes (48) and a second plurality of vanes (48) wherein:
i) said first plurality of vanes of said second flow conditioning element (24B) situated between said pipe elbow (22) and said first turning guide (44A) of said second flow conditioning element (24B) and locating said first turning guide (44A) of said second flow conditioning element (24B) relative to said pipe elbow (22), said first plurality of vanes (48) of said second flow conditioning element (24B) being circumferentially spaced from each other and circumferentially distributed around said first turning guide (44A) of said second flow conditioning element (24B), said first plurality of vanes (48) of said second flow conditioning element (24B) dividing said radial space between said pipe elbow (22) and said first turning guide (44A) of said second flow conditioning element (24B) into a plurality of flow channels (58) that turn in generally the same at least one direction as said inner surface (38); and
ii) said second plurality of vanes (48) situated between said first and second turning guides (44A, 44B) of said second flow conditioning element (24B) and locating said second turning guide (44B) of said second flow conditioning element (24B), said second plurality of vanes (48) of said second flow conditioning element (24B) being circumferentially spaced from each other and circumferentially distributed around said second turning guide (44B) of said second flow conditioning element (24B), said second plurality of vanes (48) of said second flow conditioning element (24B) dividing said radial space between said first and second turning guides (44A, 44B) of said second flow conditioning element (24B) into a plurality of flow channels (58) that turn in generally the same at least one direction as said inner surface (38).

36. The flow conditioning assembly (1) of claim 35, further comprising a fluid settling chamber (70A) located between said first and second flow conditioning elements (24A, 24B) within said pipe elbow (22).

37. The flow conditioning assembly (1) of claim 1, wherein said vane upstream end (140) of at least one of said first plurality of support vanes (120) locating said first flow guide (118A) being farther than said upstream guide end (132) of said first flow guide (118A) from said first end opening (110A).

38. The flow conditioning assembly (1) of claim 1, wherein said vane downstream end (142) of at least one of said first plurality of support vanes (120) locating said first flow guide (118A) being farther than said downstream guide end (134) of said first flow guide (118A) from said second end opening (110B).

39. An integral elbow flow conditioner (2), comprising:
a pipe elbow (22) for conducting and turning the flow of a fluid, being an annular conduit defining a radially inwardly facing inner surface (38) that turns in at least one direction and forms at least a portion of a curved fluid passageway extending through said pipe elbow (22) from a first opening (26A) to a second opening (26B);

a first flow conditioning element (24A) located at least partially within said pipe elbow (22) and comprising:

a) a first turning guide (44A) of generally circular form when viewed in transverse cross-section and located at least partially within and radially spaced from said pipe elbow (22) by a radial space, said first turning guide (44A) turning in generally the same at least one direction as said inner surface (38) of said pipe elbow (22);

b) a second turning guide (44B) of generally circular form when viewed in transverse cross-section and located at least partially within said first turning guide (44A), said second turning guide (44B) being radially spaced from said first turning guide (44A) by a radial space, said second turning guide (44B) turning in generally the same at least one direction as said inner surface (38);

c) a first plurality of vanes (48) situated at least partially between said pipe elbow (22) and said first turning guide (44A) and locating said first turning guide (44A) relative to said pipe elbow (22), said first plurality of vanes (48) having a vane leading edge (80) and a vane trailing edge (82), said vane leading edge (80) being closer than said vane trailing edge (82) to said first opening (26A) and said vane trailing edge (82) being closer than said vane leading edge (80) to said second opening (26B), said first plurality of vanes (48) being circumferentially spaced from each other and circumferentially distributed around said first turning guide (44A), said first plurality of vanes (48) dividing said radial space between said first turning guide (44A) and said pipe elbow (22) into a plurality of flow channels (58) that turn in generally the same at least one direction as said inner surface (38); and d) a second plurality of vanes (48) situated at least partially between said first turning guide (44A) and said second turning guide (44B) and locating said second turning guide (44B), said second plurality of vanes (48) being circumferentially spaced from each other and circumferentially distributed around said second turning guide (44B), said second plurality of vanes (48) dividing said radial space between said first turning guide (44A) and said second turning guide (44B) into a plurality of flow channels (58) that turn in generally the same at least one direction as said inner surface (38).

40. The integral elbow flow conditioner (2) of claim 39, wherein said first flow conditioning element (24A) further comprises:

a third turning guide (44C) of generally circular form when viewed in transverse cross-section and located at least partially within said second turning guide (44B) and radially spaced from said second turning guide (44B) by a radial space, said third turning guide (44C) turning in generally the same at least one direction as said inner surface (38); and a third plurality of vanes (48) situated at least partially between said second turning guide (44B) and said third turning guide (44C) and locating said third turning guide (44C), said third plurality of vanes (48) being circumferentially spaced from each other and circumferentially distributed around said third turning guide (44C), said third plurality of vanes (48) dividing said radial space between said second turning guide (44B) and said third turning guide (44C) into a plurality of flow channels (58) that turn in generally the same at least one direction as said inner surface (38).

41. The integral elbow flow conditioner (2) of claim 39, wherein said first turning guide (44A) has an inner guide surface (52) facing generally radially inward and an outer guide surface (54) facing generally radially outward toward said pipe elbow (22), said inner and outer guide surfaces (52, 54) turning in generally the same at least one direction as said inner surface (38).

42. The integral elbow flow conditioner (2) of claim 39, wherein said first turning guide (44A) has a foil shape.

43. The integral elbow flow conditioner (2) of claim 39, wherein said first turning guide (44A) has a guide leading edge (76) and a guide trailing edge (78), said guide leading edge (76) being closer than said guide trailing edge (78) to said first opening (26A) and said guide leading edge (76) being thicker than said guide trailing edge (78) when viewed in longitudinal cross-section.

44. The integral elbow flow conditioner (2) of claim 39, wherein said first turning guide (44A) has a guide leading edge (76) and a guide trailing edge (78), said guide leading edge (76) being closer than said guide trailing edge (78) to said first opening (26A) and said guide trailing edge (78) being more slender than said guide leading edge (76) when viewed in longitudinal cross-section.

45. The integral elbow flow conditioner (2) of claim 39, wherein said first plurality of vanes (48) have a foil shape.

46. The integral elbow flow conditioner (2) of claim 39, wherein said vane leading edge (80) is thicker than said vane trailing edge (82).

47. The integral elbow flow conditioner (2) of claim 39, wherein said vane trailing edge (82) is more slender than said vane leading edge (80).

48. The integral elbow flow conditioner (2) of claim 39, wherein at least some of said first plurality of vanes (48) turn in generally the same at least one direction as said inner surface (38).

49. The integral elbow flow conditioner (2) of claim 39, wherein said first turning guide (44A) has an inner guide surface (52) facing generally radially inward and an outer guide surface (54) facing generally radially outward toward said pipe elbow (22), and has at least one guide vent (74) comprising a hole passing in a generally radial direction through said first turning guide (44A) from said inner guide surface (52) to said outer guide surface (54).

50. The integral elbow flow conditioner (2) of claim 49, wherein said first turning guide (44A) has a guide leading edge (76) and a guide trailing edge (78) and said at least one guide vent (74) cutting through said first turning guide (44A) from said guide leading edge (76) to said guide trailing edge (78).

51. The integral elbow flow conditioner (2) of claim 39, wherein at least one of said first plurality of vanes (48) having at least one vane vent (72) comprising a hole passing in a generally circumferential direction through said at least one of said first plurality of vanes (48).

52. The integral elbow flow conditioner (2) of claim 39, further comprising a second flow conditioning element (24B) spaced apart from said first flow conditioning element (24A) and located at least partially within said pipe elbow (22) and having a plurality of flow channels (58) that turn in generally the same at least one direction as said inner surface (38) of said pipe elbow (22).

53. The integral elbow flow conditioner (2) of claim 52, further comprising a fluid settling chamber (70A) located between said first and second flow conditioning elements (24A, 24B) within said pipe elbow (22).

54. The integral elbow flow conditioner (2) of claim 39, wherein said first turning guide (44A) and said second turning guide (44B) are substantially concentric to said inner surface (38) of said pipe elbow (22).

55. The integral elbow flow conditioner (2) of claim 39, wherein said first turning guide (44A) has a guide leading edge (76) and a guide trailing edge (78), said guide leading edge (76) being eccentric to said inner surface (38) of said pipe elbow (22) and said guide trailing edge (78) being less eccentric to said inner surface (38) of said pipe elbow (22).

56. The integral elbow flow conditioner (2) of claim 39, wherein said first turning guide (44A) has a guide leading edge (76) and a guide trailing edge (78), said guide leading edge (76) being eccentric to said inner surface (38) of said pipe elbow (22) and said guide trailing edge (78) being substantially concentric to said inner surface (38) of said pipe elbow (22).

57. The integral elbow flow conditioner (2) of claim 39, wherein junctures between the first plurality of vanes (48) and said first turning guide (44A) form vane inner corners (64) that are inside corners and have a curved length that extends from said vane leading edge (80) to said vane trailing edge (82), and at least some of said first plurality of vanes (48) with vane inner corners (64) having a longer curved length being spaced closer together than at least some of said first plurality of vanes (48) with vane inner corners (64) having a shorter curved length.

58. The integral elbow flow conditioner (2) of claim 39, wherein said vane leading edge (80) and said vane trailing edge (82) of each of said first plurality of vanes (48) are separated by a straight line distance, at least some of said first plurality of vanes (48) having a longer straight line distance separating said vane leading edge (80) from said vane trailing edge (82) compared to other of said first plurality of vanes (48), and at least some of said first plurality of vanes having a longer straight line distance separating said vane leading edge (80) from said vane trailing edge (82) are spaced closer together than some of said first plurality of vanes having a shorter straight line distance between said vane leading edge (80) and said vane trailing edge (82).

59. The integral elbow flow conditioner (2) of claim 39, wherein said first turning guide (44A) and said second turning guide (44B) are eccentric to said inner surface (38) of said pipe elbow (22).

60. An integral elbow flow conditioner (2), comprising:
a pipe elbow (22) for conducting and turning the flow of a fluid, being an annular conduit defining a radially inwardly facing inner surface (38) that turns in at least one direction and forms at least a portion of a curved fluid passageway extending through said pipe elbow (22) from a first opening (26A) to a second opening (26B);
a first flow conditioning element (24A) located at least partially within said pipe elbow (22) and comprising:
a) a first turning guide (44A) of generally circular form when viewed in transverse cross-section and located at least partially within and radially spaced from said pipe elbow (22) by a radial space, said first turning guide (44A) having a guide leading edge (76) and a guide trailing edge (78), said guide leading edge (76) being eccentric to said inner surface (38) of said pipe elbow (22) and said guide trailing edge (78) being less eccentric to said inner surface (38) of said pipe elbow (22), said first turning guide (44A) turning in generally the same at least one direction as said inner surface (38) of said pipe elbow (22); and
b) a first plurality of vanes (48) situated at least partially between said pipe elbow (22) and said first turning guide (44A) and locating said first turning guide (44A) relative to said pipe elbow (22), said first plurality of vanes (48) having a vane leading edge (80) and a vane trailing edge (82), said vane leading edge (80) being closer than said vane trailing edge (82) to said first opening (26A) and said vane trailing edge (82) being closer than said vane leading edge (80) to said second opening (26B), said first plurality of vanes (48) being circumferentially spaced from each other and circumferentially distributed around said first turning guide (44A), said first plurality of vanes (48) dividing said radial space between said first turning guide (44A) and said pipe elbow (22) into a plurality of flow channels (58) that turn in generally the same at least one direction as said inner surface (38).

61. The integral elbow flow conditioner (2) of claim 60, wherein said first turning guide (44A) has an inner guide surface (52) facing generally radially inward and an outer guide surface (54) facing generally radially outward toward said pipe elbow (22), said inner and outer guide surfaces (52, 54) turning in generally the same at least one direction as said inner surface (38).

62. The integral elbow flow conditioner (2) of claim 60, wherein said first turning guide (44A) has a foil shape.

63. The integral elbow flow conditioner (2) of claim 60, wherein said guide leading edge (76) is closer than said guide trailing edge (78) to said first opening (26A) and said guide leading edge (76) is thicker than said guide trailing edge (78) when viewed in longitudinal cross-section.

64. The integral elbow flow conditioner (2) of claim 60, wherein said guide leading edge (76) is closer than said guide trailing edge (78) to said first opening (26A) and said guide trailing edge (78) is more slender than said guide leading edge (76) when viewed in longitudinal cross-section.

65. The integral elbow flow conditioner (2) of claim 60, wherein said first plurality of vanes (48) have a foil shape.

66. The integral elbow flow conditioner (2) of claim 60, wherein said vane leading edge (80) is thicker than said vane trailing edge (82).

67. The integral elbow flow conditioner (2) of claim 60, wherein said vane trailing edge (82) is more slender than said vane leading edge (80).

68. The integral elbow flow conditioner (2) of claim 60, wherein at least some of said first plurality of vanes (48) turn in generally the same at least one direction as said inner surface (38).

69. The integral elbow flow conditioner (2) of claim 60, wherein said first turning guide (44A) has an inner guide surface (52) facing generally radially inward and an outer guide surface (54) facing generally radially outward toward said pipe elbow (22), and has at least one guide vent (74) comprising a hole passing in a generally radial direction through said first turning guide (44A) from said inner guide surface (52) to said outer guide surface (54).

70. The integral elbow flow conditioner (2) of claim 69, wherein said at least one guide vent (74) cuts through said first turning guide (44A) from said guide leading edge (76) to said guide trailing edge (78).

71. The integral elbow flow conditioner (2) of claim 60, wherein at least one of said first plurality of vanes (48) having at least one vane vent (72) comprising a hole passing in a generally circumferential direction through said at least one of said first plurality of vanes (48).

72. The integral elbow flow conditioner (2) of claim 60, further comprising a second flow conditioning element (24B) spaced apart from said first flow conditioning element (24A) and located at least partially within said pipe elbow (22) and having a plurality of flow channels (58) that turn in generally the same at least one direction as said inner surface (38) of said pipe elbow (22).

73. The integral elbow flow conditioner (2) of claim 72, further comprising a fluid settling chamber (70A) located between said first and second flow conditioning elements (24A, 24B) within said pipe elbow (22).

74. The integral elbow flow conditioner (2) of claim 60, wherein junctures between the first plurality of vanes (48) and said first turning guide (44A) form vane inner corners (64) that are inside corners and have a curved length that extends from said vane leading edge (80) to said vane trailing edge (82), and at least some of said first plurality of vanes (48) with vane inner corners (64) having a longer curved length being spaced closer together than at least some of said first plurality of vanes (48) with vane inner corners (64) having a shorter curved length.

75. The integral elbow flow conditioner (2) of claim 60, wherein said vane leading edge (80) and said vane trailing edge (82) of each of said first plurality of vanes (48) are separated by a straight line distance, at least some of said first plurality of vanes (48) having a longer straight line distance separating said vane leading edge (80) from said vane trailing edge (82) compared to other of said first plurality of vanes (48), and at least some of said first plurality of vanes having a longer straight line distance separating said vane leading edge (80) from said vane trailing edge (82) are spaced closer together than some of said first plurality of vanes having a shorter straight line distance between said vane leading edge (80) and said vane trailing edge (82).

76. An integral elbow flow conditioner (2), comprising:
a pipe elbow (22) for conducting and turning the flow of a fluid, being an annular conduit defining a radially inwardly facing inner surface (38) that turns in at least one direction and forms at least a portion of a curved fluid passageway extending through said pipe elbow (22) from a first opening (26A) to a second opening (26B);
a first flow conditioning element (24A) located at least partially within said pipe elbow (22) and comprising:
a) a first turning guide (44A) of generally circular form when viewed in transverse cross-section and located at least partially within and radially spaced from said pipe elbow (22) by a radial space, said first turning guide (44A) having a guide leading edge (76) and a guide trailing edge (78), said guide leading edge (76) being eccentric to said inner surface (38) of said pipe elbow (22) and said guide trailing edge (78) being substantially concentric to said inner surface (38) of said pipe elbow (22), said first turning guide (44A) turning in generally the same at least one direction as said inner surface (38) of said pipe elbow (22); and
b) a first plurality of vanes (48) situated at least partially between said pipe elbow (22) and said first turning guide (44A) and locating said first turning guide (44A) relative to said pipe elbow (22), said first plurality of vanes (48) having a vane leading edge (80) and a vane trailing edge (82), said vane leading edge (80) being closer than said vane trailing edge (82) to said first opening (26A) and said vane trailing edge (82) being closer than said vane leading edge (80) to said second opening (26B), said first plurality of vanes (48) being circumferentially spaced from each other and circumferentially distributed around said first turning guide (44A), said first plurality of vanes (48) dividing said radial space between said first turning guide (44A) and said pipe elbow (22) into a plurality of flow channels (58) that turn in generally the same at least one direction as said inner surface (38).

77. The integral elbow flow conditioner (2) of claim 76, wherein said first turning guide (44A) has an inner guide surface (52) facing generally radially inward and an outer guide surface (54) facing generally radially outward toward said pipe elbow (22), said inner and outer guide surfaces (52, 54) turning in generally the same at least one direction as said inner surface (38).

78. The integral elbow flow conditioner (2) of claim 76, wherein said first turning guide (44A) has a foil shape.

79. The integral elbow flow conditioner (2) of claim 76, wherein said guide leading edge (76) is closer than said guide trailing edge (78) to said first opening (26A) and said guide leading edge (76) is thicker than said guide trailing edge (78) when viewed in longitudinal cross-section.

80. The integral elbow flow conditioner (2) of claim 76, wherein said guide leading edge (76) is closer than said guide trailing edge (78) to said first opening (26A) and said guide trailing edge (78) is more slender than said guide leading edge (76) when viewed in longitudinal cross-section.

81. The integral elbow flow conditioner (2) of claim 76, wherein said first plurality of vanes (48) have a foil shape.

82. The integral elbow flow conditioner (2) of claim 76, wherein said vane leading edge (80) is thicker than said vane trailing edge (82).

83. The integral elbow flow conditioner (2) of claim 76, wherein said vane trailing edge (82) is more slender than said vane leading edge (80).

84. The integral elbow flow conditioner (2) of claim 76, wherein at least some of said first plurality of vanes (48) turn in generally the same at least one direction as said inner surface (38).

85. The integral elbow flow conditioner (2) of claim 76, wherein said first turning guide (44A) has an inner guide surface (52) facing generally radially inward and an outer guide surface (54) facing generally radially outward toward said pipe elbow (22), and has at least one guide vent (74) comprising a hole passing in a generally radial direction through said first turning guide (44A) from said inner guide surface (52) to said outer guide surface (54).

86. The integral elbow flow conditioner (2) of claim 85, wherein said at least one guide vent (74) cuts through said first turning guide (44A) from said guide leading edge (76) to said guide trailing edge (78).

87. The integral elbow flow conditioner (2) of claim 76, wherein at least one of said first plurality of vanes (48) having at least one vane vent (72) comprising a hole passing in a generally circumferential direction through said at least one of said first plurality of vanes (48).

88. The integral elbow flow conditioner (2) of claim 76, further comprising a second flow conditioning element (24B) spaced apart from said first flow conditioning element (24A) and located at least partially within said pipe elbow

(22) and having a plurality of flow channels (58) that turn in generally the same at least one direction as said inner surface (38) of said pipe elbow (22).

89. The integral elbow flow conditioner (2) of claim 88, further comprising a fluid settling chamber (70A) located between said first and second flow conditioning elements (24A, 24B) within said pipe elbow (22).

90. The integral elbow flow conditioner (2) of claim 76, wherein junctures between the first plurality of vanes (48) and said first turning guide (44A) form vane inner corners (64) that are inside corners and have a curved length that extends from said vane leading edge (80) to said vane trailing edge (82), and at least some of said first plurality of vanes (48) with vane inner corners (64) having a longer curved length being spaced closer together than at least some of said first plurality of vanes (48) with vane inner corners (64) having a shorter curved length.

91. The integral elbow flow conditioner (2) of claim 76, wherein said vane leading edge (80) and said vane trailing edge (82) of each of said first plurality of vanes (48) are separated by a straight line distance, at least some of said first plurality of vanes (48) having a longer straight line distance separating said vane leading edge (80) from said vane trailing edge (82) compared to other of said first plurality of vanes (48), and at least some of said first plurality of vanes having a longer straight line distance separating said vane leading edge (80) from said vane trailing edge (82) are spaced closer together than some of said first plurality of vanes having a shorter straight line distance between said vane leading edge (80) and said vane trailing edge (82).

92. An integral elbow flow conditioner (2), comprising:
a pipe elbow (22) for conducting and turning the flow of a fluid, being an annular conduit defining a radially inwardly facing inner surface (38) that turns in at least one direction and forms at least a portion of a curved fluid passageway extending through said pipe elbow (22) from a first opening (26A) to a second opening (26B);
a first flow conditioning element (24A) located at least partially within said pipe elbow (22) and comprising:
a) a first turning guide (44A) of generally circular form when viewed in transverse cross-section and located at least partially within and radially spaced from said pipe elbow (22) by a radial space, said first turning guide (44A) turning in generally the same at least one direction as said inner surface (38) of said pipe elbow (22); and
b) a first plurality of vanes (48) situated at least partially between said pipe elbow (22) and said first turning guide (44A) and locating said first turning guide (44A) relative to said pipe elbow (22), said first plurality of vanes (48) having a vane leading edge (80) and a vane trailing edge (82), said vane leading edge (80) being closer than said vane trailing edge (82) to said first opening (26A) and said vane trailing edge (82) being closer than said vane leading edge (80) to said second opening (26B), said first plurality of vanes (48) being circumferentially spaced from each other and circumferentially distributed around said first turning guide (44A), said first plurality of vanes (48) dividing said radial space between said first turning guide (44A) and said pipe elbow (22) into a plurality of flow channels (58) that turn in generally the same at least one direction as said inner surface (38); and a second flow conditioning element (24B) spaced apart from said first flow conditioning element (24A) and located at least partially within said pipe elbow (22) and having a plurality of flow channels (58) that turn in generally the same at least one direction as said inner surface (38) of said pipe elbow (22).

93. The integral elbow flow conditioner (2) of claim 92, wherein said first turning guide (44A) has an inner guide surface (52) facing generally radially inward and an outer guide surface (54) facing generally radially outward toward said pipe elbow (22), said inner and outer guide surfaces (52, 54) turning in generally the same at least one direction as said inner surface (38).

94. The integral elbow flow conditioner (2) of claim 92, wherein said first turning guide (44A) has a foil shape.

95. The integral elbow flow conditioner (2) of claim 92, wherein said first turning guide (44A) has a guide leading edge (76) and a guide trailing edge (78), said guide leading edge (76) being closer than said guide trailing edge (78) to said first opening (26A) and said guide leading edge (76) being thicker than said guide trailing edge (78) when viewed in longitudinal cross-section.

96. The integral elbow flow conditioner (2) of claim 92, wherein said first turning guide (44A) has a guide leading edge (76) and a guide trailing edge (78), said guide leading edge (76) being closer than said guide trailing edge (78) to said first opening (26A) and said guide trailing edge (78) being more slender than said guide leading edge (76) when viewed in longitudinal cross-section.

97. The integral elbow flow conditioner (2) of claim 92, wherein said first plurality of vanes (48) have a foil shape.

98. The integral elbow flow conditioner (2) of claim 92, wherein said vane leading edge (80) is thicker than said vane trailing edge (82).

99. The integral elbow flow conditioner (2) of claim 92, wherein said vane trailing edge (82) is more slender than said vane leading edge (80).

100. The integral elbow flow conditioner (2) of claim 92, wherein at least some of said first plurality of vanes (48) turn in generally the same at least one direction as said inner surface (38).

101. The integral elbow flow conditioner (2) of claim 92, wherein said first turning guide (44A) has an inner guide surface (52) facing generally radially inward and an outer guide surface (54) facing generally radially outward toward said pipe elbow (22), and has at least one guide vent (74) comprising a hole passing in a generally radial direction through said first turning guide (44A) from said inner guide surface (52) to said outer guide surface (54).

102. The integral elbow flow conditioner (2) of claim 101, wherein said first turning guide (44A) has a guide leading edge (76) and a guide trailing edge (78) and said at least one guide vent (74) cuts through said first turning guide (44A) from said guide leading edge (76) to said guide trailing edge (78).

103. The integral elbow flow conditioner (2) of claim 92, wherein at least one of said first plurality of vanes (48) having at least one vane vent (72) comprising a hole passing in a generally circumferential direction through said at least one of said first plurality of vanes (48).

104. The integral elbow flow conditioner (2) of claim 92, further comprising a fluid settling chamber (70A) located between said first and second flow conditioning elements (24A, 24B) within said pipe elbow (22).

105. The integral elbow flow conditioner (2) of claim 92, wherein junctures between the first plurality of vanes (48) and said first turning guide (44A) form vane inner corners

(64) that are inside corners and have a curved length that extends from said vane leading edge (80) to said vane trailing edge (82), and at least some of said first plurality of vanes (48) with vane inner corners (64) having a longer curved length being spaced closer together than at least some of said first plurality of vanes (48) with vane inner corners (64) having a shorter curved length.

106. The integral elbow flow conditioner (2) of claim 92, wherein said vane leading edge (80) and said vane trailing edge (82) of each of said first plurality of vanes (48) are separated by a straight line distance, at least some of said first plurality of vanes (48) having a longer straight line distance separating said vane leading edge (80) from said vane trailing edge (82) compared to other of said first plurality of vanes (48), and at least some of said first plurality of vanes having a longer straight line distance separating said vane leading edge (80) from said vane trailing edge (82) are spaced closer together than some of said first plurality of vanes having a shorter straight line distance between said vane leading edge (80) and said vane trailing edge (82).

* * * * *